US010836866B2

(12) United States Patent
Toolis et al.

(10) Patent No.: US 10,836,866 B2
(45) Date of Patent: Nov. 17, 2020

(54) SULFUR-CONTAINING POLYMERIC PARTICLES AND COMPOSITIONS

(71) Applicant: PRC-DeSoto International, Inc., Sylmar, CA (US)

(72) Inventors: Amy Liane Toolis, Natrona Heights, PA (US); Lawrence G. Anderson, Allison Park, PA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 0 days.

(21) Appl. No.: 16/418,165

(22) Filed: May 21, 2019

(65) Prior Publication Data
US 2019/0270850 A1 Sep. 5, 2019

Related U.S. Application Data

(63) Continuation of application No. 15/785,460, filed on Oct. 17, 2017, now Pat. No. 10,351,674.

(51) Int. Cl.
C08G 75/12 (2016.01)
C09D 181/02 (2006.01)
C08G 75/00 (2006.01)
C08G 75/045 (2016.01)

(52) U.S. Cl.
CPC ............. *C08G 75/12* (2013.01); *C08G 75/00* (2013.01); *C08G 75/045* (2013.01); *C09D 181/02* (2013.01)

(58) Field of Classification Search
CPC .... C08J 9/224; C08J 2461/28; C08J 2381/02; C09K 3/1012
See application file for complete search history.

(56) References Cited

U.S. PATENT DOCUMENTS

| 4,366,307 | A | 12/1982 | Singh et al. |
| 4,609,762 | A | 9/1986 | Morris et al. |
| 4,623,711 | A | 11/1986 | Morris |
| 5,225,472 | A | 7/1993 | Cameron et al. |
| 6,172,179 | B1 | 1/2001 | Zook et al. |
| 6,509,418 | B1 | 1/2003 | Zook et al. |
| 6,525,168 | B2 | 2/2003 | Zook et al. |
| 7,009,032 | B2 | 3/2006 | Bojkova et al. |
| 7,671,145 | B2 | 3/2010 | Sawant et al. |
| 7,875,666 | B2 | 1/2011 | Gilmore et al. |
| 7,879,955 | B2 | 2/2011 | Rao et al. |
| 8,138,273 | B2 | 3/2012 | Rao et al. |
| 8,466,220 | B2 | 6/2013 | Rao et al. |
| 8,513,339 | B1 | 8/2013 | Keledjian et al. |
| 8,541,513 | B2 | 9/2013 | Hobbs et al. |

(Continued)

FOREIGN PATENT DOCUMENTS

| JP | 62-53354 | 3/1987 |
| JP | 2011-32360 | 2/2011 |
| WO | 2017/157711 | 9/2017 |

OTHER PUBLICATIONS

Chern et al., "Emulsion polymerization mechanisms and kinetics," Progress in Polymer Sciences, 2006, vol. 31, p. 443-486.

*Primary Examiner* — Shane Fang
(74) *Attorney, Agent, or Firm* — William R. Lambert

(57) ABSTRACT

Sulfur-containing polymeric particles having a high sulfur content can be prepared using emulsion polymerization. The sulfur-containing polymeric particles are useful in aerospace coatings and sealants.

34 Claims, 4 Drawing Sheets

(56) References Cited

U.S. PATENT DOCUMENTS

| | | |
|---|---|---|
| 8,729,216 B2 | 5/2014 | Hobbs et al. |
| 8,952,124 B2 | 2/2015 | Rao et al. |
| 8,993,691 B2 | 3/2015 | Anderson et al. |
| 9,079,833 B2 | 7/2015 | Klobes et al. |
| 9,422,451 B2 | 8/2016 | Rao et al. |
| 9,540,540 B2 | 1/2017 | Rao et al. |
| 9,663,619 B2 | 5/2017 | Echigoya et al. |
| 2005/0010003 A1 | 1/2005 | Sawant et al. |
| 2006/0270796 A1 | 11/2006 | Sawant et al. |
| 2009/0186988 A1* | 7/2009 | Anderson ............ C08F 283/01 525/351 |
| 2010/0010133 A1 | 1/2010 | Zook et al. |
| 2011/0319559 A1 | 12/2011 | Kania et al. |
| 2012/0040104 A1 | 2/2012 | Keledjian et al. |
| 2012/0234255 A1 | 9/2012 | Bernardini et al. |
| 2012/0238707 A1 | 9/2012 | Hobbs et al. |
| 2013/0345371 A1 | 12/2013 | Anderson et al. |
| 2015/0252230 A1 | 9/2015 | Keledjian et al. |
| 2016/0083619 A1* | 3/2016 | Anderson ............ C09K 3/1012 523/457 |
| 2016/0152775 A1 | 6/2016 | Tobis et al. |
| 2016/0311995 A1 | 10/2016 | Otsubo et al. |
| 2017/0014259 A1 | 1/2017 | Quigley et al. |
| 2017/0114208 A1 | 4/2017 | Rao et al. |

* cited by examiner

SULFUR-CONTAINING POLYMERIC PARTICLES AND COMPOSITIONS

This application is a continuation of U.S. application Ser. No. 15/785,460, now allowed, filed on Oct. 17, 2017, which is incorporated by reference in its entirety.

FIELD

The present disclosure relates to sulfur-containing polymeric particles having a high sulfur content. The sulfur-containing polymeric particles are useful in aerospace coatings and sealants.

BACKGROUND

In certain applications such as in the aircraft and vehicular industries it can be desirable to reduce the overall weight of materials. For example, the weight of a polymeric composition such as an aerospace coating or sealant can be reduced by incorporating low density fillers. In aerospace applications, coatings and sealants must meet a number of demanding performance requirements including adhesion, tensile strength, elongation, and high temperature stability, and these properties must be maintained following exposure to aviation fuel and other aviation fluids. Low density fillers such as hollow polymeric microspheres can be effective in reducing the overall density of a polymeric composition but also tend to swell upon exposure to aviation fuel causing degradation in the physical properties of a cured coating or sealant. Inorganic fillers provide reinforcing effects that result in improved tensile strength and percent elongation but can also increase the density of the cured coating or sealant.

SUMMARY

The present disclosure relates to sulfur-containing polymeric particles having a high sulfur content. The sulfur-containing polymeric particles are useful in aerospace coatings and sealants.

According to the present invention sulfur-containing polymeric particles are characterized by: a density less than 2 g/cm$^3$, wherein density is determined according to ISO 787 (Part 10); a mean particle diameter no more than 10 m, wherein mean particle diameter is determined according to ASTM D422; a sulfur content greater than 5 wt %, wherein wt % is based on the total weight of the sulfur-containing polymeric particle; and a glass transition temperature less than −20° C., wherein glass transition temperature is determined using dynamic mechanical analysis according to ASTM D7028.

According to the present invention sulfur-containing polymeric particles comprise reaction products of an emulsion polymerization reaction, wherein the reactants comprise: a polythiol; and a polyalkenyl compound.

According to the present invention compositions comprise a plurality of the sulfur-containing polymeric particles according to the present invention; and a sulfur-containing prepolymer such as a thiol-terminated sulfur-containing prepolymer.

According to the present invention cured compositions are prepared from a composition according to the present invention.

According to the present invention parts comprise a cured composition according to the present invention.

According to the present invention methods of sealing a part comprise applying a composition according to the present invention to a surface of a part; and curing the applied composition to seal the part.

BRIEF DESCRIPTION OF THE DRAWINGS

Those skilled in the art will understand that the drawings described herein are for illustration purposes only. The drawings are not intended to limit the scope of the present disclosure.

DETAILED DESCRIPTION

Figure 1:
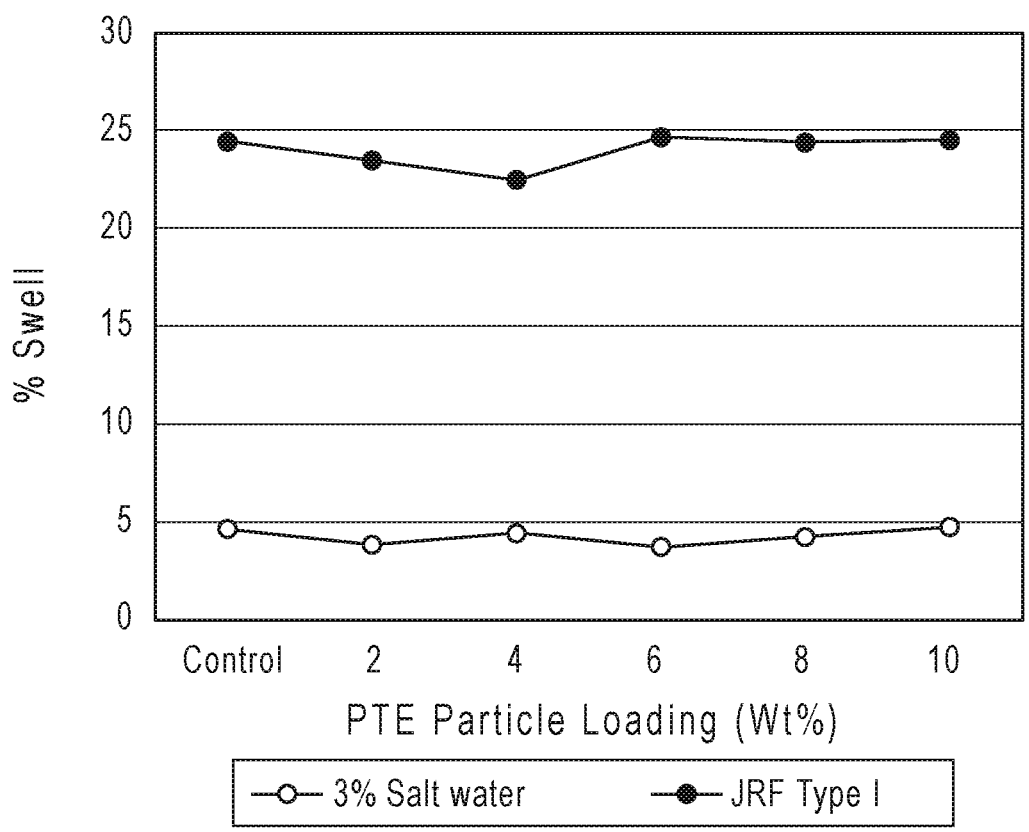
FIG. 1 is a graph showing the percent swell for cured sealants having different wt % loadings of sulfur-containing polymeric particles following immersion in 3% aqueous NaCl or Jet Reference Fluid (JRF) Type I.

Fillers that reinforce the physical properties of a coating or sealant, that exhibit enhanced fuel resistance, and that are also characterized by a low density are desired.

The physical properties and fuel resistance of aerospace coatings and sealants can be improved by incorporating high sulfur content polymeric fillers into the coating and sealant formulations. The use of high sulfur content polymeric fillers provides coatings and sealants suitable for use in aerospace applications.

For purposes of the following detailed description it is to be understood that embodiments provided by the present disclosure may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges encompassed within the range. For example, a range of "1 to 10"

is intended to include all sub-ranges between (and including) the recited minimum value of 1 and the recited maximum value of 10, that is, having a minimum value equal to or greater than 1 and a maximum value equal to or less than 10.

A dash ("-") that is not between two letters or symbols is used to indicate a point of bonding for a substituent or between two atoms. For example, —CONH$_2$ is attached to another chemical moiety through the carbon atom.

"Alkanediyl" refers to a diradical of a saturated, branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). It will be appreciated that a branched alkanediyl has a minimum of three carbon atoms. An alkanediyl can be $C_{2-14}$ alkanediyl, $C_{2-10}$ alkanediyl, $C_{2-8}$ alkanediyl, $C_{2-6}$ alkanediyl, $C_{2-4}$ alkanediyl, or $C_{2-3}$ alkanediyl. Examples of alkanediyl groups include methane-diyl (—CH$_2$—), ethane-1,2-diyl (—CH$_2$CH$_2$—), propane-1,3-diyl and iso-propane-1,2-diyl (e.g., —CH$_2$CH$_2$CH$_2$— and —CH(CH$_3$)CH$_2$—), butane-1,4-diyl (—CH$_2$CH$_2$CH$_2$CH$_2$—), pentane-1,5-diyl (—CH$_2$CH$_2$CH$_2$CH$_2$CH$_2$—), hexane-1,6-diyl (—CH$_2$CH$_2$CH$_2$CH$_2$CH$_2$CH$_2$—), heptane-1,7-diyl, octane-1,8-diyl, nonane-1,9-diyl, and decane-1,10-diyl, dodecane-1,12-diyl.

"Alkanecycloalkane" refers to a saturated hydrocarbon having one or more cycloalkyl and/or cycloalkanediyl groups and one or more alkyl and/or alkanediyl groups, where cycloalkyl, cycloalkanediyl, alkyl, and alkanediyl are defined herein. Each cycloalkyl and/or cycloalkanediyl group(s) can be $C_{3-6}$, $C_{5-6}$, cyclohexyl or cyclohexanediyl. Each alkyl and/or alkanediyl group can be $C_{1-6}$, $C_{1-4}$, $C_{1-3}$, methyl, methanediyl, ethyl, or ethane-1,2-diyl. An alkanecycloalkane can be $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, or $C_{6-9}$ alkanecycloalkane. Examples of alkanecycloalkanes include 1,1,3,3-tetramethylcyclohexane and cyclohexylmethane.

"Alkanecycloalkanediyl" refers to a diradical of an alkanecycloalkane group. An alkanecycloalkanediyl group can be $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, or $C_{6-9}$ alkanecycloalkanediyl. Examples of alkanecycloalkanediyl groups include 1,1,3,3-tetramethylcyclohexane-1,5-diyl, or cyclohexylmethane-4,4'-diyl.

"Alkenyl" group refers to the structure —CR═C(R)$_2$ where the alkenyl group is a terminal group and is bonded to a larger molecule. Each R can independently comprise, for example, hydrogen and $C_{1-3}$ alkyl. Each R can be hydrogen and an alkenyl group can have the structure —CH═CH$_2$.

"Alkyl" refers to a monoradical of a saturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. An alkyl group can be $C_{1-6}$ alkyl, $C_{1-4}$ alkyl, or $C_{1-3}$ alkyl. Examples of alkyl groups include methyl, ethyl, n-propyl, iso-propyl, n-butyl, iso-butyl, tert-butyl, n-hexyl, n-decyl, and tetradecyl. An alkyl group can be $C_{1-6}$ alkyl, $C_{1-4}$ alkyl, or $C_{1-3}$ alkyl. It will be appreciated that a branched alkyl has at least three carbon atoms.

"Arenediyl" refers to diradical monocyclic or polycyclic aromatic group. Examples of arenediyl groups include benzene-diyl and naphthalene-diyl. An arenediyl group can be $C_{6-12}$ arenediyl, $C_{6-10}$ arenediyl, $C_{6-9}$ arenediyl, or benzene-diyl.

"Cycloalkanediyl" refers to a diradical saturated monocyclic or polycyclic hydrocarbon group. A cycloalkanediyl group can be $C_{3-12}$ cycloalkanediyl, $C_{3-8}$ cycloalkanediyl, $C_{3-6}$ cycloalkanediyl, or $C_{5-6}$ cycloalkanediyl. Examples of cycloalkanediyl groups include cyclohexane-1,4-diyl, cyclohexane-1,3-diyl, or cyclohexane-1,2-diyl.

"Heteroalkanediyl" refers to an alkanediyl group in which one or more of the carbon atoms are replaced with a heteroatom, such as N, O, S, or P. In a heteroalkanediyl, the one or more heteroatoms can be selected from N and O.

"Heterocycloalkanediyl" refers to a cycloalkanediyl group in which one or more of the carbon atoms are replaced with a heteroatom, such as N, O, S, or P. In a heterocycloalkanediyl, the one or more heteroatoms can be selected from N and O.

"Heteroarenediyl" refers to an arenediyl group in which one or more of the carbon atoms are replaced with a heteroatom, such as N, O, S, or P. In a heteroarenediyl, the one or more heteroatoms can be selected from N and O.

"Heterocycloalkanediyl" refers to a cycloalkanediyl group in which one or more of the carbon atoms are replaced with a heteroatom, such as N, O, S, or P. In a heterocycloalkanediyl, the one or more heteroatoms can be selected from N and O.

"Oxyalkanediyl" refers to an alkanediyl group in which one or more of the carbon atoms and certain atoms or groups bonded to the one or more carbon atom are replaced with an oxygen atom. In certain oxyalkanediyls, the oxygen atoms are not adjacent to other oxygen atoms. An oxyalkanediyl can be, for example, $C_{2-10}$ oxyalkanediyl, $C_{2-8}$ oxyalkanediyl, $C_{2-6}$ oxyalkanediyl, or $C_{2-4}$ oxyalkanediyl.

"Substituted" refers to a group in which one or more hydrogen atoms are each independently replaced with the same or different substituent(s). A substituent can comprise, for example, halogen, S(O)$_2$OH, —S(O)$_2$, —SH, —SR where R is $C_{1-6}$ alkyl, —COOH, —NO$_2$, —NR$_2$ where each R independently comprises hydrogen and $C_{1-3}$ alkyl, —CN, ═O, $C_{1-6}$ alkyl, —CF$_3$, —OH, phenyl, $C_{2-6}$ heteroalkyl, $C_{5-6}$ heteroaryl, $C_{1-6}$ alkoxy, or —COR where R is $C_{1-6}$ alkyl. A substituent can be, for example, —OH, —NH$_2$, or $C_{1-3}$ alkyl.

"Formed from" or "prepared from" denotes open, e.g., comprising, claim language. As such, it is intended that a composition "formed from" or "prepared from" a list of recited components be a composition comprising at least the recited components or the reaction product of at least the recited components, and can further comprise other, non-recited components used to form or prepare the composition.

"Reaction product of" means chemical reaction product(s) of at least the recited reactants, and can include partial reaction products as well as fully reacted products and other reaction products that are present in a lesser amount.

As used herein, the term "cure" or "cured" as used in connection with a composition, e.g., "composition when cured" or a "cured composition," means that any curable or crosslinkable components of the composition are at least partially reacted or crosslinked.

The term "equivalent" refers to the number of functional reactive groups of the substance. "Equivalent weight" is effectively equal to the molecular weight of a substance, divided by the valence or number of functional reactive groups of the substance.

"Prepolymer" refers to oligomers, homopolymers, and copolymers. For thiol-terminated prepolymers, molecular weights are number average molecular weights "Mn" as determined by end group analysis using iodine titration. For prepolymers that are not thiol-terminated, the number average molecular weights are determined by gel permeation chromatography using polystyrene standards. A prepolymer such as a thiol-terminated sulfur-containing prepolymer provided by the present disclosure can be combined with a curing agent to provide a curable composition, which can cure to provide a cured polymer network. Prepolymers are liquid at room temperature (23° C.) and pressure (760 torr; 101 kPa).

A "curable composition" refers to a composition that comprises at least two reactants capable of reacting to form a cured composition. For example, a curable composition can comprise a thiol-terminated polythioether prepolymer and a polyepoxide capable of reacting to form a cured polymer. A curable composition may include a catalyst for the curing reaction and other components such as, for example, fillers, pigments, and adhesion promoters. A curable composition may be curable at room temperature, or may require exposure to elevated temperature such as a temperature above room temperature or other condition(s) to initiate and/or to accelerate the curing reaction. A curable composition may initially be provided as a two-part composition including, for example, a separate base component and an accelerator component. The base composition can contain one of the reactants participating in the curing reaction such as a thiol-terminated polythioether prepolymer and the accelerator component can contain the other reactant such as a polyepoxide. The two components can be mixed shortly before use to provide a curable composition. A curable composition can exhibit a viscosity suitable for a particular method of application. For example, a Class A sealant composition, which is suitable for brush-on applications, can be characterized by a viscosity from 1 poise to 500 poise (0.1 Pa-sec to 50 Pa-sec). A Class B sealant composition, which is suitable for fillet seal applications, can be characterized by a viscosity from 4,500 poise to 20,000 poise (450 Pa-sec to 2,000 Pa-sec). A Class C sealant composition, which is suitable for fay seal applications, can be characterized by a viscosity from 500 poise to 4,500 poise (50 Pa-sec to 450 Pa-sec). The viscosity of the compositions is measured as described herein. After the two components of a sealant system are combined and mixed, the curing reaction can proceed and the viscosity of the curable composition can increase and at some point will no longer be workable, as described herein. The duration between when the two components are mixed to form the curable composition and when the curable composition can no longer be reasonably or practically applied to a surface for its intended purpose can be referred to as the working time. As can be appreciated, the working time can depend on a number of factors including, for example, the curing chemistry, the catalyst used, the application method, and the temperature. Once a curable composition is applied to a surface (and during application), the curing reaction can proceed to provide a cured composition. A cured composition develops a tack-free surface, cures, and then fully cures over a period of time. A curable composition can be considered to be cured when the hardness of the surface is at least 30 Shore A for a Class B sealant or a Class C sealant. After a sealant has cured to a hardness of 30 Shore A it can take from several days to several weeks for a curable composition fully cure. A composition is considered fully cured when the hardness no longer increases. Depending on the formulation, a fully cured sealant can exhibit, for example, a hardness from 40 Shore A to 70 Shore A, determined according to ASTM D2240.

"Derived from" as in "a moiety derived from a compound" refers to a moiety that is generated upon reaction of a parent compound with a reactant. For example, a bis (alkenyl) compound $CH_2=CH-R-CH=CH_2$ can react with another compound such as two compounds having thiol groups to produce the moiety $-(CH_2)_2-R-(CH_2)_2-$ derived from the reaction.

"Derived from the reaction of —V with a thiol" refers to a moiety —V'— that results from the reaction of a thiol group with a moiety comprising a terminal group reactive with a thiol group. For example, a group —V can comprise $CH_2=CH-CH_2-O-$, where the terminal alkenyl group $CH_2=CH-$ is reactive with a thiol group —SH. Upon reaction with a thiol group, the moiety —V'— is $-CH_2-CH_2-CH_2-O-$.

A "core" of a compound or a polymer refers to the segment between the reactive terminal groups. For example, the core of a polythiol HS—R—SH will be —R—. A core of a compound or prepolymer can also be referred to as a backbone of a compound or a backbone of a prepolymer.

A "core" of a polyfunctionalizing agent $B(-V)_z$ refers to the moiety B. B can include the the polyfunctionalizing agent with the terminal funciotnal group V.

"Specific gravity" refers to the ratio of the density of a substance to the density of water at room temperature (23° C.) and pressure (760 torr; 101 kPa). For purposes of the present disclosure, specific gravity and density of a sealant are measured according to ASTM D792 Method A, and specific gravity and density of particles are measured according to ISO 787 (Part 10)

For purposes of the present disclosure, viscosity is determined according to ASTM D2849 § 79-90 using a Brookfield CAP 2000 viscometer at a temperature of 23° C., and a pressure of 760 torr (101 kPa), using a #6 spindle at 300 rpm.

Mean particle diameter is determined according to ASTM D422.

Glass transition temperature $T_g$ is determined using dynamic mechanical analysis according to ASTM D7028.

Sulfur-containing prepolymers can have a viscosity from 20 poise to 500 poise (2 Pa-sec to 50 Pa-sec), from 20 poise to 200 poise (2 Pa-sec to 20 Pa-sec) or from 40 poise to 140 poise (4 Pa-sec to 14 Pa-sec).

Sulfur content refers to the wt % sulfur in a compound based on the total theoretical weight of the compound.

Reference is now made in detail to certain embodiments of compounds, compositions, and methods. The disclosed embodiments are not intended to be limiting of the claims. To the contrary, the claims are intended to cover all alternatives, modifications, and equivalents Sulfur-containing polymeric particles provided by the present disclosure have a low specific gravity, a high sulfur content, and a low glass transition temperature $T_g$. The sulfur-containing polymeric particles can be used in aerospace coatings and sealants. The sulfur-containing polymeric particles can exhibit a low glass transition temperature $T_g$ such as less than −20° C., or less than −30° C., a low density such as less than 2.0 g/cm$^3$, or less than 1.5 g/cm$^3$, and a high sulfur content such as greater than 5 wt %, greater than 10 wt %, or greater than 15 wt %. The sulfur-containing polymeric particles can be characterized by a spherical morphology and can have an average particle diameter less than 10 μm. When used in an aerospace coating or sealant composition, the sulfur-containing polymeric particles can reduce the weight of the composition, maintain fuel resistance by virtue of the high sulfur content such as a sulfur content greater than 5 wt %, and can deform under an applied load or stress as reflected in the low glass transition temperature $T_g$ such as a glass transition temperature $T_g$ less than −20° C. or less than −30° C. Specific gravity and density are determined according to ISO 787 (Part 10) and the glass transition temperature is determined according to ASTM D7028.

When used in coatings and sealants, sulfur-containing polymeric particles of the present disclosure can provide a reinforcing effect. A reinforcing effect refers to an increase in tensile strength of a cured composition comprising the sulfur-containing polymeric particles.

Sulfur-containing polymeric particles provided by the present disclosure can comprise solid particles prepared by reacting thiol-terminated and alkenyl-terminated precursors. For example, sulfur-containing polymeric particles provided by the present disclosure can comprise solid particles prepared by reacting thiol-terminated and Michael acceptor-terminated precursors. Sulfur-containing polymeric particles provided by the present disclosure exhibit a low density, a high sulfur content, and a low glass transition temperature $T_g$, such as a density less than 2 g/cm$^3$, a sulfur content greater than 5 wt %, and a glass transition temperature $T_g$ less than −20° C.

Sulfur-containing polymeric particles can have a mean particle diameter, for example, less than 100 m, less than 50 m, less than 25 m, less than 10 m, or less than 2 m. Sulfur-containing polymeric particles can have a mean particle diameter, for example, within a range from 1 m to 100 m, from 1 m to 50 m, from 1 m to 25 m, from 1 μm to 10 μm, from 1 μm to 5 m, or within a range from 2 μm to 4 μm. The sulfur-containing polymeric particles can be characterized by a spherical morphology.

Sulfur-containing polymeric particles provided by the present disclosure can exhibit a density, for example, less than 4 g/cm$^3$, less than 2 g/cm$^3$, less than 1.6 g/cm$^3$, less than 1.4 g/cm$^3$, or less than 1.2 g/cm$^3$. Sulfur-containing polymeric particles provided by the present disclosure can exhibit a density, for example, from 1.1 g/cm$^3$ to 4 g/cm$^3$, from 1.1 g/cm$^3$ to 2 g/cm$^3$, from 1.1 g/cm$^3$ to 1.8 g/cm$^3$, from 1.2 g/cm$^3$ to 1.6 g/cm$^3$, or from 1.2 g/cm$^3$ to 1.4 g/cm$^3$. Sulfur-containing polymeric particles can be characterized by a density less than the density of the prepolymers, crosslinking compounds, and/or inorganic filler included in a coating or sealant composition into which the sulfur-containing polymeric particles are incorporated.

The sulfur-containing polymeric particles can be used to reduce the density of an aerospace coating or sealant in which the prepolymer comprises a sulfur-containing prepolymer such as, for example, a polythioether prepolymer, a polysulfide prepolymer, a sulfur-containing polyformal prepolymer, a monosulfide prepolymer, or a combination of any of the foregoing. The density of such sulfur-containing prepolymers, which can constitute part of the weight of a composition, can be greater than 2 g/cm$^3$. Therefore, to reduce the density of the coating or sealant composition it is desirable that a sulfur-containing polymeric particle exhibit a density less than 2 g/cm$^3$ or less than 1.5 g/cm$^3$. Also, an aerospace composition can comprise inorganic filler where the density of the inorganic filler can be, for example, greater than 2 g/cm$^3$. To reduce the density of the composition and maintain desired physical and chemical properties of a cured sealant under use conditions it can be desirable that some or all of the inorganic filler can be replaced with sulfur-containing polymeric particles that exhibit a density less than 2 g/cm$^3$ or less than 1.5 g/cm$^3$.

Sulfur-containing polymeric particles provided by the present disclosure can exhibit a glass transition temperature $T_g$, for example, less than −10° C., less than −20° C., less than −30° C., or less than −40° C. Sulfur-containing polymeric particles can exhibit a glass transition temperature $T_g$, for example, within a range from −10° C. to −50° C., or within a range from −20° C. to −40° C. Sulfur-containing polymeric particles can have glass transition temperature $T_g$ similar to the glass transition temperature $T_g$ of the cured polymeric coating or sealant material in which the sulfur-containing polymeric particles are incorporated. For example, sulfur-containing polymeric particles can have a glass transition temperature $T_g$ that is ±20° C. the glass transition temperature of the coating or sealant composition of which the sulfur-containing polymeric particles are a part. By having a glass transition temperature $T_g$ similar to that of the cured coating or sealant composition, the sulfur-containing polymeric particles are better able to accommodate deformation of the cured coating or sealant composition of which they are a part and thereby can relieve stress and improve physical properties of the cured coating or sealant such as tensile strength, % elongation, and/or adhesion. Sulfur-containing polymeric particles within the cured polymeric matrix can deform in response to stress thereby increasing the flexibility of the cured coating or sealant.

Sulfur-containing polymeric particles provided by the present disclosure can be solid and do not have a hollow core. Sulfur-containing polymeric particles can comprise on outer surface having unreacted thiol and/or alkenyl groups. Unreacted thiol and/or alkenyl groups can react with the constituents of a prepolymer such as thiol-terminated sulfur-containing prepolymers, polyalkenyl-terminated sulfur-containing prepolymers, polythiols, and/or polyalkenyl compounds. For example, unreacted alkenyl groups on the surface of a sulfur-containing polymeric particle can react with thiol groups of a thiol-terminated sulfur-containing prepolymer; and unreacted surface thiol groups can react with alkenyl terminal groups or epoxy terminal groups of a polyepoxide curing agent.

Sulfur-containing polymeric particles provided by the present disclosure can comprise a high sulfur content such as, for example, a sulfur content greater than 5 wt %, greater than 10 wt %, greater than 15 wt %, greater than 20 wt %, or greater than 25 wt %, or greater than 30 wt %, where wt % is based on the total weight of the sulfur-containing polymeric particles. Sulfur-containing polymeric particles can have a sulfur content, for example, within a range from 5 wt % to 25 wt %, from 5 wt % to 20 wt %, from 5 wt % to 15 wt %, from 5 wt % to 10 wt %, from 10 wt % to 15 wt %, from 10 wt % to 25 wt %, from 10 wt % to 30 wt %, from 10 wt % to 40 wt %, or within a range from 20 wt % to 40 wt %, where wt % is based on the total weight of the sulfur-containing polymeric particles. Theoretical sulfur content can be estimated by determining the wt % sulfur of the reactants used to synthesize the sulfur-containing polymeric particles. The high sulfur content can improve the fuel and solvent resistance of compositions comprising the sulfur-containing polymeric particles.

Sulfur-containing polymeric particles provided by the present disclosure can be characterized by a density, for example, less than 2 g/cm$^3$, less than 1.5 g/cm$^3$, or less than 1.25 g/cm$^3$; an average particle size less than 50 μm, less than 10 m, less than 5 m, or less than 2 μm; a sulfur content greater than 5 wt %, greater than 10 wt %, greater than 15 wt %, or greater than 20 wt %, where wt % is based on the total weight of the particles; and/or a glass transition temperature less than −20° C., less than −30° C., or less than −40° C.

Sulfur-containing polymeric particles provided by the present disclosure can be prepared using emulsion polymerization. For example, sulfur-containing polymeric particles can be prepared by reacting a thiol-terminated monomer and an alkenyl-terminated monomer using emulsion polymerization synthetic methods.

Emulsion polymerization is a well-known method used to produce microparticles. The method can involve combining relatively hydrophobic reactants in an aqueous solvent in the presence of an emulsion stabilizer and exposing the mixture to high shear to produce a suspension of microcapsules containing the hydrophobic reactants that then react to form a polymeric particle. For the purposes of the present invention, the reactants can include a polythiol monomer and a polyalkenyl monomer, such as sulfur-containing polythiol monomers and/or polyalkenyl monomers. Alternatively, the reactants can include a polythiol monomer and a polyalkenyl monomer such as sulfur-containing polythiol monomers and/or polyfunctional Michael acceptor monomers. A thiol-terminated monomer for use in preparing sulfur-containing polymeric particles can be any suitable thiol-terminated monomer. Suitable thiol-terminated monomers can include thiol-terminated monomers having a thiol functionality from 2 to 6 and combinations thereof. For example, a thiol-terminated monomer can be difunctional (with two terminal thiol groups), trifunctional, tetrafunctional, pentafunctional, hexafunctional, or a combination of any of the foregoing.

Suitable thiol-terminated monomers can be characterized, for example, by a molecular weight less than 2,000 Daltons, less than 1,500 Daltons, less than 1,000 Daltons, less than 500 Daltons, or less than 250 Daltons. Suitable thiol-terminated monomers can be characterized, for example, by a number average molecular weight within a range, for example, from 200 Daltons to 2,000 Daltons, from 200 Daltons to 1,500 Daltons, from 200 Daltons to 1,000 Daltons, from 500 Daltons to 2,000 Daltons, or from 500 Daltons to 1,500 Daltons.

Suitable thiol-terminated monomers can have, for example, a sulfur content within a range from 4 wt % to 50 wt %, from 5 wt % to 40 wt %, from 10 wt % to 40 wt % or from 20 wt % to 40 wt %, where wt % is based on the total weight of the polythiol monomer. A polythiol monomer can be selected such that when reacted with a polyalkenyl compound, the product, i.e., the sulfur-containing polymeric particle, can have a sulfur content greater than 5 wt %, greater than 10 wt %, greater than 15 wt %, or greater than 20 wt %, where wt % is based on the total weight of the sulfur-containing polymeric particle. For example, the product can have a sulfur content within a range from 5 wt % to 50 wt %, from 10 wt % to 40 wt %, from 15 wt % to 30 wt %, from 10 wt % to 20 wt %, or from 20 wt % to 40 wt %, where wt % is based on the total weight of the sulfur-containing polymeric particle.

Suitable thiol-terminated monomers for use in synthesizing sulfur-containing polymeric particles include, for example, mercapto-propionates, mercapto-acetates, mercapto-acrylates, and combinations of any of the foregoing.

Examples of suitable mercapto-propionates for use in synthesizing sulfur-containing polymeric particles include pentaerythritol tetra(3-mercapto-propionate) (PETMP), trimethylol-propane tri(3-mercaptopropionate) (TMPMP), glycol di(3-mercaptopropionate) (GDMP), tris[2-(3-mercapto-propionyloxy)ethyl]isocyanurate (TEMPIC), di-pentaerythritol hexa(3-mercaptopropionate) (di-PETMP), tri(3-mercaptopropionate) pentaerythritol, triethylolethane tri-(3-mercaptopropionate), and combinations of any of the foregoing.

Examples of suitable polymeric thiols for use in synthesizing sulfur-containing polymeric particles include ethoxylated trimethylolpropane tri(3-mercaptopropionate), polycaprolactone tetra-3-mercaptopropionate, and combinations thereof.

Examples of suitable mercapto-acetates for use in synthesizing sulfur-containing polymeric particles include pentaerythritol tetramercaptoacetate (PRTMA), trimethylolpropane trimercaptoacetate (TMPMA), glycol dimercaptoacetate (GDMA), ethyleneglycol dimercaptoacetate, di-trimethylolpropane tetramercaptoacetate, and combinations of any of the foregoing.

Examples of suitable mercapto-acrylates for use in synthesizing sulfur-containing polymeric particles include pentaerythritol tetra-acrylate, tris[2-(3-mercaptopropionyloxy)ethyl]isocyanurate, 2,3-di(2-mercaptoethylthio)-1-propanethiol, dimercaptodiethylsulfide (2,2'-thiodiethanethiol), dimercaptodioxaoctane (2,2'-(ethylenedioxy)diethanethiol, 1,8-dimercapto-3,6-dioxaoctane, and combinations of any of the foregoing.

Suitable thiol-terminated monomers for use in synthesizing sulfur-containing polymeric particles are commercially available, for example, from Bruno Bock Thiochemicals under the Thiocure® tradename.

A thiol-terminated monomer can have the structure of Formula (1):

$$HS-R^1-SH \qquad (1)$$

where,
$R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, substituted $C_{2-6}$ alkanediyl, substituted $C_{6-8}$ cycloalkanediyl, substituted $C_{6-10}$ alkanecycloalkanediyl, substituted $C_{5-8}$ heterocycloalkanediyl and $-[(CHR^3)_p-X]_q-(CHR^3)_r-$; where,
each $R^3$ is selected from hydrogen and methyl;
each X is independently selected from O, S, S—S, NH, and N(—$CH_3$);
p is an integer from 2 to 6;
q is an integer from 1 to 5; and
r is an integer from 2 to 10.

A dithiol of Formula (1) can have a sulfur content, for example, greater than 5 wt %, greater than 10 wt %, greater than 15 wt %, or greater than 25 wt %, where wt % is based on the total weight of the dithiol.

In a dithiol of Formula (1), $R^1$ can be $-[(CHR^3)_p-X]_q-(CHR^3)_r-$.

In a dithiol of Formula (1), X can is selected from O, S, and S—S, and thus $-[(CHR^3)_p-X]_q-(CHR^3)_r$ in Formula (1) can be $-[(CHR^3)_p-O]_q-(CHR^3)_r-$, $-[(CHR^3)_p-S]_q-(CHR^3)_r-$, $-[(CH_2)_p-O]_q-(CH_2)_r-$, or $-[(CH_2)_p-S]_q-(CH_2)_r-$. In a dithiol of Formula (1), p and r can be equal, such as where p and r can be both two.

In a dithiol of Formula (1), $R^1$ can is selected from $C_{2-6}$ alkanediyl and $-[(CHR^3)_p-X]_q-(CHR^3)_r-$.

In a dithiol of Formula (1), $R^1$ can be $-[(CHR^3)_p-X]_q-(CHR^3)_r-$, where X can be O, X can be S, or X can be S—S. In a dithiol of Formula (1), $R^1$ can be $-[(CH_2)_p-X]_q-(CH_2)_r-$, and X can be O, X can be S, or X can be S—S.

In a dithiol of Formula (1) where $R^1$ can be $-[(CHR^3)_p-X]_q-(CHR^3)_r-$, p can be 2, r can be 2, q is 1, and X can be S; p can be 2, q can be 2, r can be 2, and X is O; or p can be 2, r can be 2, q can be 1, and X can be O; p can be 2, q can be 2, r can be 2, and X is S—S; or p can be 2, r can be 2, q can be 1, and X can be S—S.

In a dithiol of Formula (1) where $R^1$ can be —$[(CH_2)_p$—$X]_q$—$(CH_2)_r$—, p can be 2, r can be 2, q can be 1, and X can be S; p can be 2, q can be 2, r can be 2, and X can be O; or p can be 2, r can be 2, q can be 1, and X can be O; p can be 2, q can be 2, r can be 2, and X is S—S; or p can be 2, r can be 2, q can be 1, and X can be S—S.

In a dithiol of Formula (1) where $R^1$ can be —$[(CHR^3)_p$—$X]_q$—$(CHR^3)_r$, each $R^3$ can be hydrogen, or at least one $R^3$ can be methyl.

In a dithiol of Formula (1), each $R^1$ can be derived from dimercaptodioxaoctane (DMDO) or each $R^1$ is derived from dimercaptodiethylsulfide (DMDS), or a combination thereof.

In a dithiol of Formula (1), $R^1$ can be $C_{2-6}$ alkanediyl.

In dithiols of Formula (1), each $R^1$ can be derived from 1,8-dimercapto-3,6-dioxaoctane (DMDO; 2,2-(ethane-1,2-diylbis(sulfanyl))bis(ethan-1-thiol)), or each $R^1$ can be derived from dimercaptodiethylsulfide (DMDS; 2,2'-thiobis(ethan-1-thiol)), and combinations thereof.

In dithiols of Formula (1), each p can independently be 2, 3, 4, 5, and 6. Each p can be the same and can be 2, 3, 4, 5, or 6.

In dithiols of Formula (1) each q can independently be 1, 2, 3, 4, or 5. Each q can be the same and can be 1, 2, 3, 4, or 5.

In dithiols of Formula (1), each r can independently be 2, 3, 4, 5, 6, 7, 8, 9, or 10. Each r can be the same and can be 2, 3, 4, 5, 6, 7, 8, 9, or 10.

In dithiols of Formula (1), each r can independently be an integer from 2 to 4, from 2 to 6, or from 2 to 8.

Examples of suitable dithiols include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing.

A dithiol may have one or more pendent groups comprising a $C_{1-6}$ alkyl group, a $C_{1-6}$ alkoxy group, or a hydroxyl group. Suitable alkyl pendent groups include, for example, $C_{1-6}$ linear alkyl, $C_{3-6}$ branched alkyl, cyclopentyl, and cyclohexyl. In such dithiols the substitute group can be selected from $C_{1-6}$ alkyl, $C_{1-6}$ alkoxy, hydroxyl, and $C_{5-6}$ cycloalkyl.

A dithiol can comprise a single type of dithiol or can comprise a combination of different dithiols.

Other examples of suitable dithiols include dimercaptodiethylsulfide (DMDS) (in Formula (1), $R^1$ is —$[(CH_2)_p$—$X]_q$—$(CH_2)_r$—, wherein p is 2, r is 2, q is 1, and X is S); dimercaptodioxaoctane (DMDO) (in Formula (1), $R^1$ is —$[(CH_2)_p$—$X]_q$—$(CH_2)_r$—, wherein p is 2, q is 2, r is 2, and X is O); and 1,5-dimercapto-3-oxapentane (in Formula (1), $R^1$ is —$[(CH_2)_p$—$X]_q$—$(CH_2)_r$—, wherein p is 2, r is 2, q is 1, and X is O). It is also possible to use dithiols that include both a heteroatom in the carbon backbone and a pendent alkyl group, such as a pendent methyl group. Such compounds include, for example, methyl-substituted DMDS, such as HS—$CH_2CH(CH_3)$—S—$CH_2CH_2$—SH, HS—$CH(CH_3)CH_2$—S—$CH_2CH_2$—SH and dimethyl substituted DMDS, such as HS—$CH_2CH(CH_3)$—S—$CHCH_3CH_2$—SH and HS—$CH(CH_3)CH_2$—S—$CH_2CH(CH_3)$—SH.

Examples of dithiols having a sulfide group S—S include 2-(sulfanylmethyldisulfanyl)ethanediol, bis(mercaptomethyl) persulfide, and 2-(2-sulfanylethyldisulfanyl)ethanethiol.

A polythiol can comprise a polythiol of Formula (2a):

$$B(\text{—V})_z \qquad (2a)$$

where,

B comprises a core of a z-valent polyfunctionalizing agent $B(\text{—V})_z$;

z is an integer from 3 to 6; and each —V is independently a moiety comprising a terminal thiol group.

In polythiols of Formula (2a), z can be, for example, 3, 4, 5, or 6.

In polythiols of Formula (2a), z can be 3. Suitable trifunctional polythiols include, for example, 1,2,3-propanetrithiol, 1,2,3-benzenetrithiol, 1,1,1-butanetrithiol, heptante-1,3-7-trithiol, isocyanurate-containing trithiols, and combinations thereof, as disclosed in U.S. Application Publication No. 2010/0010133, and the polythiols described in U.S. Pat. Nos. 4,366,307; 4,609,762; and 5,225,472. Mixtures of polythiols of Formula (2) may also be used.

Other examples of suitable polythiol monomers are disclosed, for example, in U.S. Application Publication No. 2010/0010133, which is incorporated by reference in its entirety, and isocyanurates as disclosed, for example, in U.S. Application Publication No. 2011/0319559, which is incorporated by reference in its entirety.

A dithiol can comprise a sulfur-containing dithiol meaning that the moiety between the two terminal thiol groups comprises at least one thioether —S— group and/or at least one sulfide —S—S— group. For example, in dithiols of Formula (1), $R^1$ in a sulfur-containing dithiol of Formula (1) can comprise at least one thioether —S— group or at least one sulfide group —S—S—.

An alkenyl-terminated monomer can include any suitable polyalkenyl compound. A polyalkenyl compound can have an alkenyl functionality, for example, an alkenyl functionality from 2 to 6 and can include a combination of polyalkenyl compounds having different alkenyl functionalities.

Suitable polyalkenyl monomers can be characterized, for example, by a molecular weight less than 2,000 Daltons, less than 1,500 Daltons, less than 1,000 Daltons, less than 500 Daltons, or less than 250 Daltons. Suitable polyalkenyl monomers can be characterized, for example, by a weight average molecular weight within a range from 200 Daltons to 2,000 Daltons, from 200 Daltons to 1,500 Daltons, from 200 Daltons to 1,000 Daltons, from 500 Daltons to 2,000 Daltons, or from 500 Daltons to 1,500 Daltons.

Suitable polyalkenyl monomers can have, for example, a sulfur content within a range from 0 wt % to 50 wt %, from 5 wt % to 40 wt %, from 10 wt % to 40 wt % or from 20 wt % to 40 wt %, where wt % is based on the total weight of the polyalkenyl monomer. A polyalkenyl monomer can be selected such that when reacted with a thiol-terminated monomer, the reaction product can have a sulfur content, for example, greater than 5 wt %, greater than 10 wt %, greater than 15 wt %, greater than 20 wt %, or greater than 25 wt %. For example, the product can have a sulfur content within a range from 5 wt % to 50 wt %, from 10 wt % to 40 wt %, from 15 wt % to 30 wt %, or from 10 wt % to 20 wt %, where wt % is based on the total weight of the product, i.e., the sulfur-containing polymeric particle. A polyalkenyl compound may or may not contain sulfur atoms.

Examples of suitable polyalkenyl monomers include divinyl ethers such as divinyl ethers having the structure of Formula (3):

$$CH_2=CH-O-(-R^2-O-)_m-CH=CH_2 \quad (3)$$

where m can be an integer from 0 to 50 and $R^2$ in Formula (3) can be selected from $C_{2-6}$ n-alkanediyl, $C_{3-6}$ branched alkanediyl, $C_{6-8}$ cycloalkanediyl, $C_{6-10}$ alkanecycloalkanediyl, substituted $C_{2-6}$ n-alkanediyl, substituted $C_{3-6}$ branched alkanediyl, substituted $C_{6-8}$ cycloalkanediyl, $C_{6-10}$ alkanecycloalkanediyl and $-[(CH_2)_p-X]_q-(CH_2)_r-$, where p can be an integer ranging from 2 to 6, q can be an integer from 1 to 5, r can be an integer from 2 to 10, and each X can independently comprise O or S.

In divinyl ethers of Formula (3), each $R^2$ can independently be selected from a $C_{2-10}$ n-alkanediyl group, a $C_{3-6}$ branched alkanediyl group, and a $-[(CH_2)_p-X-]_q(CH_2)_r-$ group.

In divinyl ethers of Formula (3), each $R^2$ can independently be a $C_{2-10}$ n-alkanediyl group.

In divinyl ethers of Formula (3), each $R^2$ can independently be a $-[(CH_2)_p-X-]_q(CH_2)_r-$ group, where each X can be O or S.

In divinyl ethers of Formula (3), each $R^2$ can independently be a $-[(CH_2)_p-X-]_q(CH_2)_r-$ group, where each X can be O or S, and each p can independently be 2, 3, 4, 5, and 6.

In divinyl ethers of Formula (3), each p can be the same and can be 2, 3, 4, 5, or 6.

In divinyl ethers of Formula (3), each $R^2$ can independently be a $-[(CH_2)_p-X-]_q(CH_2)_r-$ group, where each X can be O or S, and each q can independently be 1, 2, 3, 4, or 5.

In divinyl ethers of Formula (3), each q can be the same and can be 1, 2, 3, 4, or 5.

In divinyl ethers of Formula (3), each $R^2$ can independently be a $-[(CH_2)_p-X-]_q(CH_2)_r-$ group, where each X can be O or S, and each r can independently be 2, 3, 4, 5, 6, 7, 8, 9, or 10.

In divinyl ethers of Formula (3), each r can be the same and can be 2, 3, 4, 5, 6, 7, 8, 9, or 10. In divinyl ethers of Formula (3), each r can independently be an integer from 2 to 4, from 2 to 6, or from 2 to 8.

Suitable divinyl ethers include, for example, compounds having at least one oxyalkanediyl group, such as from 1 to 4 oxyalkanediyl groups, i.e., compounds in which m in Formula (3) can be an integer ranging from 1 to 4. In divinyl ethers of Formula (3) m can be an integer ranging from 2 to 4. It is also possible to employ commercially available divinyl ether mixtures that are characterized by a non-integral average value for the number of oxyalkanediyl units per molecule. Thus, m in Formula (3) can also be a rational number having a value within a range from 0 to 10.0, such as from 1.0 to 10.0, from 1.0 to 4.0, from 2.0 to 4.0, from 2.1 to 2.4, such as 2.2, 23, 2.4, or 2.5.

Examples of suitable vinyl ethers include, divinyl ether, ethylene glycol divinyl ether (EG-DVE) ($R^2$ in Formula (3) is ethanediyl and m is 1), butanediol divinyl ether (BD-DVE) ($R^2$ in Formula (3) is butanediyl and m is 1), hexanediol divinyl ether (HD-DVE) ($R^2$ in Formula (3) is hexanediyl and m is 1), diethylene glycol divinyl ether (DEG-DVE; $R^2$ in Formula (3) is ethanediyl and m is 2), triethylene glycol divinyl ether (TEG-DVE; $R^2$ in Formula (3) is ethanediyl and m is 3), tetraethylene glycol divinyl ether ($R^2$ in Formula (3) is ethanediyl and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such polyvinyl ether monomers. A polyvinyl ether may have one or more pendent groups comprises alkyl groups, hydroxyl groups, alkoxy groups, or amine groups. For example, a substitute can be selected from $C_{1-6}$ alkyl, $C_{1-6}$ alkoxy, hydroxyl and an amine group.

Divinyl ethers in which $R^2$ in Formula (3) is $C_{3-6}$ branched alkanediyl may be prepared, for example, by reacting a polyhydroxyl compound with acetylene. Examples of branched divinyl ethers include compounds in which $R^2$ in Formula (3) is an alkyl-substituted methanediyl group such as $-CH(-CH_3)-$, for which $R^2$ in Formula (3) is ethanediyl and m is 3 or an alkyl-substituted ethanediyl.

Other useful divinyl ethers include compounds in which $R^2$ in Formula (3) is polytetrahydrofuryl (poly-THF) or polyoxyalkanediyl, such as those having an average of about 3 monomer units.

A polyalkenyl compound can comprise a polyalkenyl of Formula (2b):

$$B(-V)_z \quad (2b)$$

wherein,

B comprises a core of a z-valent polyfunctionalizing agent $B(-V)_z$;

z is an integer from 3 to 6; and each $-V$ is independently a moiety comprising a terminal alkenyl group.

In polyalkenyls of Formula (2b), z can be, for example, 3, 4, 5, or 6.

Examples of suitable polyalkenyl monomers having an alkenyl functionality greater than two include, for example, triallyl cyanurate (TAC), triallyl isocyanurate (TAIC), trimethylolpropane trivinyl ether, 2,4,6-triallyloxy-1,3,5-triazine, 1,3,5-triacryloylhexahydro-1,3,5-triazine, tris[2-(acryloyloxy)ethyl]isocyanurate, or a combination of any of the foregoing.

A polyalkenyl of Formula (2b) can be trifunctional, that is, compounds where z is 3. Suitable trifunctionalizing polyalkenyls include, for example, triallyl cyanurate (TAC), and trimethylolpropane trivinyl ether. Combinations of polyalkenyl compounds may also be used.

Polyacrylates may also be used. Examples of suitable polyacrylates include trimethylolpropane triacrylate, pentaerythritol triacrylate, trimethylolpropane propoxylated triacrylate. triacrylate of tris-2-hydroxyethyl isocyanurate, trimethylolpropane triacrylate, and glycerol propoxylated triacrylate. Examples of tetrafunctional acrylates include pentaerythritol tetraacrylate and di(trimethylolpropane) tetraacrylate.

A divinyl ether can comprise a sulfur-containing divinyl ether. An example of a suitable sulfur-containing divinyl ether is allyl sulfide.

A sulfur-containing bis(alkenyl) ether can have the structure of Formula (4):

$$CH_2=CH-O-(CH_2)_n-Y^1-R^4-Y^1-(CH_2)_n-O-CH=CH_2 \quad (4)$$

where, each n is independently an integer from 1 to 6;

each $Y^1$ is independently selected from O and S; and $R^4$ is selected from $C_{2-6}$ n-alkanediyl, $C_{3-6}$ branched alkanediyl, $C_{6-8}$ cycloalkanediyl, $C_{6-10}$ alkanecycloalkanediyl, and $-[(CH_2)_p-X]_q-(CH_2)_r-$, wherein, each X is independently selected from O, S, and S—S;

p is an integer from 2 to 6;

q is an integer from 1 to 5; and r is an integer from 2 to 6; and at least one $Y^1$ is S, or $R^4$ is $-[(CH_2)_p-X]_q-(CH_2)_r-$ and at least one X is S or S—S.

In sulfur-containing bis(alkenyl) ethers of Formula (4), each n can be 1, 2, 3, or 4.

In sulfur-containing bis(alkenyl) ethers of Formula (4), each $Y^1$ can be O or each $Y^1$ can be S.

In sulfur-containing bis(alkenyl) ethers of Formula (4), $R^4$ can be $C_{2-6}$ n-alkanediyl, such as ethane-diyl, n-propane-diyl, n-butane-diyl, n-pentane-diyl, or n-hexane-diyl.

In sulfur-containing bis(alkenyl) ethers of Formula (4), $R^4$ can be $C_{2-6}$ n-alkanediyl; both $Y^1$ can be S or one $Y^1$ can be S and the other $Y^1$ can be O.

In sulfur-containing bis(alkenyl) ethers of Formula (4), $R^4$ can be $—[(CH_2)_p—X]_q—(CH_2)_r—$.

In sulfur-containing bis(alkenyl) ethers of Formula (4), $R^4$ can be $—[(CH_2)_p—X]_q—(CH_2)_r—$, each X can be O, or each X can be S—S, at least one X can be O, or at least one X can be S—S.

In sulfur-containing bis(alkenyl) ethers of Formula (4), $R^4$ can be $—[(CH_2)_p—X]_q—(CH_2)_r—$, where each X can be S or at least one X can be S.

In sulfur-containing bis(alkenyl) ethers of Formula (4), $R^4$ can be $—[(CH_2)_p—X]_q—(CH_2)_r—$, where each X can be S—S or at least one X can be S—S.

In sulfur-containing bis(alkenyl) ethers of Formula (4), $R^4$ can be $—[(CH_2)_p—X]_q—(CH_2)_r—$, where each p can be 2 and r can be 2.

In sulfur-containing bis(alkenyl) ethers of Formula (4), $R^4$ can be $—[(CH_2)_p—X]_q—(CH_2)_r—$, where q can be 1, 2, 3, 4, or 5.

In sulfur-containing bis(alkenyl) ethers of Formula (4), $R^4$ can be $—[(CH_2)_p—X]_q—(CH_2)_r$, where each p can be 2, r can be 2, and q can be 1, 2, 3, 4, or 5.

In sulfur-containing bis(alkenyl) ethers of Formula (4), $R^4$ can be $—[(CH_2)_p—X]_q—(CH_2)_r$, where each X can be S; each p can be 2, r can be 2, and q can be 1, 2, 3, 4, or 5.

In sulfur-containing bis(alkenyl) ethers of Formula (4), $R^4$ can be $—[(CH_2)_p—X]_q—(CH_2)_r$, where each X can be O; each p can be 2, r can be 2, and q can be 1, 2, 3, 4, or 5.

In sulfur-containing bis(alkenyl) ethers of Formula (4), $R^4$ can be $—[(CH_2)_p—X]_q—(CH_2)_r$, where each X can be O; each p can be 1 or 2, r can be 1 or 2, and q can be 1, 2, 3, 4, or 5.

In sulfur-containing bis(alkenyl) ethers of Formula (4), $R^4$ can be $—[(CH_2)_p—X]_q—(CH_2)_r—$, where each X can be O; and each $Y^1$ can be S.

In sulfur-containing bis(alkenyl) ethers of Formula (4), $R^4$ can be $—[(CH_2)_p—X]_q—(CH_2)_r—$, where each X can be S; and each $Y^1$ can be O.

In sulfur-containing bis(alkenyl) ethers of Formula (4), each n can be 2, each $Y^1$ can independently comprise O and S, and $R^4$ can be $—[(CH_2)_p—X]_q—(CH_2)_r—$, where each X can independently comprise O, S, or S—S, p can be 2, q can be 1 or 2, and r can be 2.

In sulfur-containing bis(alkenyl) ethers of Formula (4), each n can be 2, each $Y^1$ can independently comprise O or S, and $R^4$ can be $C_{2-4}$ alkanediyl, such as ethanediyl, n-propanediyl, or n-butanediyl.

Sulfur-containing bis(alkenyl) ethers can comprise a sulfur-containing bis(alkenyl) ether of Formula (4a), Formula (4b), Formula (4d), Formula (4d), Formula (4e), Formula (4f), Formula (4g), Formula (4h), or a combination of any of the foregoing:

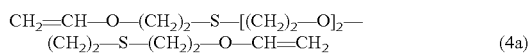

$$CH_2=CH—O—(CH_2)_2—S—[(CH_2)_2—O]_2—(CH_2)_2—S—(CH_2)_2—O—CH=CH_2 \quad (4a)$$

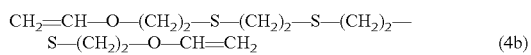

$$CH_2=CH—O—(CH_2)_2—S—(CH_2)_2—S—(CH_2)_2—S—(CH_2)_2—O—CH=CH_2 \quad (4b)$$

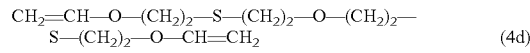

$$CH_2=CH—O—(CH_2)_2—S—(CH_2)_2—O—(CH_2)_2—S—(CH_2)_2—O—CH=CH_2 \quad (4d)$$

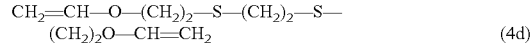

$$CH_2=CH—O—(CH_2)_2—S—(CH_2)_2—S—(CH_2)_2O—CH=CH_2 \quad (4d)$$

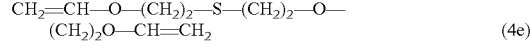

$$CH_2=CH—O—(CH_2)_2—S—(CH_2)_2—O—(CH_2)_2O—CH=CH_2 \quad (4e)$$

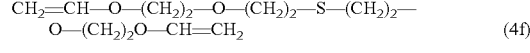

$$CH_2=CH—O—(CH_2)_2—O—(CH_2)_2—S—(CH_2)_2—O—(CH_2)_2O—CH=CH_2 \quad (4f)$$

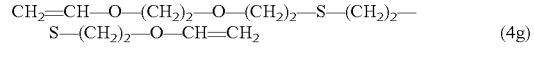

$$CH_2=CH—O—(CH_2)_2—O—(CH_2)_2—S—(CH_2)_2—S—(CH_2)_2—O—CH=CH_2 \quad (4g)$$

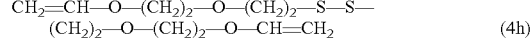

$$CH_2=CH—O—(CH_2)_2—O—(CH_2)_2—S—S—(CH_2)_2—O—(CH_2)_2—O—CH=CH_2 \quad (4h)$$

Examples of suitable sulfur-containing bis(alkenyl) ethers include 3,9,12,18-tetraoxa-6,15-dithiaicosa-1,19-diene, 3,6,15,18-tetraoxa-9,12-dithiaicosa-1,19-diene, 3,15-dioxa-6,9,12-trithiaheptadeca-1,16-diene, 3,9,15-trioxa-6,12-dithiaheptadeca-1,16-diene, 3,6,12,15-tetraoxa-9-thiaheptadeca-1,16-diene, 3,12-dioxa-6,9-dithiatetradeca-1,13-diene, 3,6,12-trioxa-9-thiatetradeca-1,13-diene, 3,6,13,16-tetraoxa-9,10-dithiaoctadeca-1,17-diene, and combinations of any of the foregoing.

A sulfur-containing bis(alkenyl) ether provided by the present disclosure can be liquid at room temperature. A sulfur-containing bis(alkenyl) ether can have a molecular weight within a range, for example, from 200 Daltons to 2,000 Daltons, from 200 Daltons to 1,500 Daltons, from 200 Daltons to 1,000 Daltons, from 200 Daltons to 800 Daltons, or from 300 Daltons to 500 Daltons.

Sulfur-containing bis(alkenyl) ethers can be prepared by reacting a dithiol, a diol, or a compound comprising both terminal thiol and hydroxyl groups with a chlorovinyl ether.

A sulfur-containing bis(alkenyl) ether can comprise reaction products of reactants comprising:

(a) a compound of Formula (5):

$$Y—R^4—Y \quad (5)$$

wherein,
each Y is independently selected from —OH and —SH;
$R^4$ is selected from $C_{2-6}$ n-alkanediyl, $C_{3-6}$ branched alkanediyl, $C_{6-8}$ cycloalkanediyl, $C_{6-10}$ alkanecycloalkanediyl, and $—[(CH_2)_p—X]_q—(CH_2)_r$, wherein,
each X is independently selected from O, S, and S—S;
each p is independently an integer from 2 to 6;
q is an integer from 1 to 5; and
r is an integer from 2 to 6; and
at least one Y is —SH, or $R^4$ is $—[(CH_2)_p—X]_q—(CH_2)_r—$ and at least one X is S or S—S; and (b) a chloro(vinyl)ether having the structure of Formula (6):

$$CH_2=CH—O—(CH_2)_t—Cl \quad (6)$$

wherein t is an integer from 1 to 6.

Compounds of Formula (5) can be dithiols in which each Y is —SH.

Compounds of Formula (5) can be diols in which each Y is —OH.

In compounds of Formula (5), one Y can be —SH and the other Y can be —OH.

In compounds of Formula (5), $R^4$ can be $C_{2-6}$ n-alkanediyl, such as ethane-diyl, n-propane-diyl, n-butane-diyl, n-pentane-diyl, or n-hexane-diyl.

In compounds of Formula (5), $R^4$ can be —[(CH$_2$)$_p$—X]$_q$—(CH$_2$)$_r$—.

In compounds of Formula (5), $R^4$ can be —[(CH$_2$)$_p$—X]$_q$—(CH$_2$)$_r$—, where each X can be O or each X can be S.

In compounds of Formula (5), $R^4$ can be —[(CH$_2$)$_p$—X]$_q$—(CH$_2$)$_r$—, where each X can be S—S.

In compounds of Formula (5), $R^4$ can be —[(CH$_2$)$_p$—X]$_q$—(CH$_2$)$_r$—, where each X can be S.

In compounds of Formula (5), $R^4$ can be —[(CH$_2$)$_p$—X]$_q$—(CH$_2$)$_r$—, where each p can be 2 and r can be 2.

In compounds of Formula (5), $R^4$ can be —[(CH$_2$)$_p$—X]$_q$—(CH$_2$)$_r$—, where q can be 1, 2, 3, 4, or 5.

In compounds of Formula (5), $R^4$ can be —[(CH$_2$)$_p$—X]$_q$—(CH$_2$)$_r$—, where each p can be 2 and r can be 2; and q can be 1, 2, 3, 4, or 5.

In compounds of Formula (5), $R^4$ can be —[(CH$_2$)$_p$—X]$_q$—(CH$_2$)$_r$—, where each X can be S; each p can be 2, r can be 2, and q can be 1, 2, 3, 4, or 5.

In compounds of Formula (5), $R^4$ can be —[(CH$_2$)$_p$—X]$_q$—(CH$_2$)$_r$—, where each X can be O; each p can be 2, r can be 2, and q can be 1, 2, 3, 4, or 5.

In compounds of Formula (5), $R^4$ can be —[(CH$_2$)$_p$—X]$_q$—(CH$_2$)$_r$—, at least one X can be O and at least one X can be S.

A compound of Formula (5) can comprise, for example, dimercaptodioxaoctane (DMDO), dimercaptodiethylsulfide (DMDS), 2,2-thiodiethanethiol, 2-mercaptoethyl ether, 1,2-ethanedithiol, mercaptoethanol, thiodiglycol, 3,6-dithia-1,8-octanediol, 2-hydroxyethyldisulfide, or a combination of any of the foregoing.

A compound of Formula (5) can comprise, for example, a compound of Formula (5a), Formula (5b), Formula (5c), Formula (5d), Formula (5e), Formula (5f), Formula (5g), Formula (5h), or a combination of any of the foregoing:

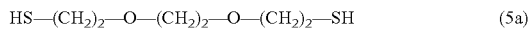 (5a)

 (5b)

 (5c)

 (5d)

 (5e)

 (5f)

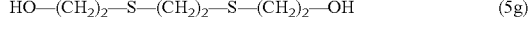 (5g)

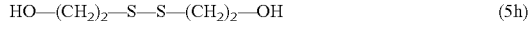 (5h)

In chlorovinyl ethers of Formula (6), t can be 1, 2, 3, 4, 5, or 6. For example, a chlorovinyl ether of Formula (6) can comprise (chloromethoxy)ethane, (2-chloroethoxy)ethane, 1-chloro-3-(vinyloxy)propane, 1-chloro-4-(vinyloxy)butane, 1-chloro-5-(vinyloxy)pentane, 1-chloro-6-(vinyloxy)hexane, or a combination of any of the foregoing.

Sulfur-containing bis(alkenyl) ethers can be prepared by reacting a dithiol, a diol, or a compound comprising both terminal thiol and terminal hydroxyl groups with a chlorovinyl ether in the presence of a catalyst such as potassium hydroxide at an elevated temperature such as 80° C.

Sulfur-containing bis(alkenyl) ethers of Formula (4) are difunctional. Sulfur-containing alkenyl ethers provided by the present disclosure can also include sulfur-containing polyalkenyl ethers having an alkenyl functionality greater than two, such as an alkenyl functionality from 3 to 6.

For example, a sulfur-containing multifunctional(alkenyl) ether can have the structure of Formula (2b):

 (2b)

where,

B comprises a core of a z-valent polyfunctionalizing agent ;

z is an integer from 3 to 6; and each —V is a moiety comprising a sulfur-containing alkenyl ether moiety having a terminal alkenyl group.

A sulfur-containing multifunctional(alkenyl) ether can be derived from a sulfur-containing bis(alkenyl) ether of Formula (4), by reacting a sulfur-containing bis(alkenyl) ether of Formula (4) with a thiol-terminated polyfunctionalizing agent or a thiol-terminated polyfunctional compound of Formula (2a).

For example, a polyfunctional sulfur-containing multifunctional(alkenyl) ether can have the structure of Formula (7):

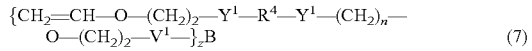 (7)

where n, $Y^1$, and $R^4$ are defined as in Formula (4), z and B are defined as in Formula (2a), and $V^1$ can be derived from the reaction of —V with an alkenyl group.

In sulfur-containing multifunctional (alkenyl) ethers of Formula (7), B(—V)$_z$ can be a polythiol such as any of those disclosed herein, such as 1,2,3-propane trithiol and isocyanurate-containing trithiols.

Sulfur-containing multifunctional(alkenyl) ethers of Formula (7) can be prepared by reacting a sulfur-containing bis(alkenyl) ether of Formula (4) with a thiol-terminated polyfunctionalizing agent or a thiol-terminated polythiol B(—V)$_z$ of Formula (2a) in the presence of a suitable catalyst such as an amine catalyst.

Sulfur-containing multifunctional(alkenyl) ethers can be used to prepare sulfur-containing multifunctional (alkenyl) ether-containing polythioether prepolymers provided by the present disclosure. For example, the reactants can include sulfur-containing multifunctional (alkenyl) ethers as part of the alkenyl component. Sulfur-containing multifunctional (alkenyl) ethers can be the only polyfunctional reactant having a functionality greater than 2 or may be used in combination with an alkenyl-terminated polyfunctionalizing agent such as triallyl cyanurate or triallylisocyanurate.

Polythioethers comprising a moiety derived from a sulfur-containing polyalkenyl ether and methods of preparing such polythioether prepolymers are disclosed in U.S. Application No. 62/417,848 filed on Nov. 4, 2016, which is incorporated by reference in its entirety.

A sulfur-containing polymeric particle can be prepared by reacting a polythiol and a polyalkenyl compound such as a poly(alkenyl) ether and/or a sulfur-containing multifunctional (alkenyl) ether. A sulfur-containing polymeric particle can comprise a polythioether particle or a combination of different types of polythioether particles.

In addition to one or more polythiol monomers and one or more polyalkenyl monomers, an emulsion for synthesizing polymeric particles provided by the present disclosure can include any suitable component used in emulsion polymerization reactions.

For example, in addition to one or more polythiol monomers and one or more polyalkenyl monomers, a polymerizable emulsion can comprise an emulsion stabilizer. An emulsion stabilizer can comprise a weight stabilizer, a Pickering emulsion stabilizer, an ionic stabilizer, a non-ionic stabilizer, or a combination of any of the foregoing.

Examples of suitable weight stabilizers include a polyurethane dispersion, poly(vinyl alcohol), or a combination thereof. A suitable poly(vinyl alcohol) can be 88% hydrolyzed.

Examples of suitable Pickering emulsion stabilizers include inorganic compounds such as calcium carbonate, silica such as nanosilica or nanosilicon dioxide particles, or a combination thereof.

Examples of suitable ionic stabilizers include sodium dodecylbenzesulfonate (anionic), sodium lauryl sulfate (anionic), phosphate ester surfactants such as Dextrol™ and Strodex™ surfactants (available from Ashland Specialty Ingredients) (anionic), dioctyl sulfosuccinate sodium salt (anionic), and a combination of any of the foregoing.

Examples of suitable non-ionic stabilizers include ethylene oxide adducts of octylphenyl such as Lutensol® OP10 (available from BASF, HLB 40), Span™ 60 (available from Croda Inc.; HLB 4.7; sorbitan stearate), Tween® 80 (HLB 15), BYK®-425 (urea-modified polyurethane), and a combination of any of the foregoing.

Other suitable emulsion stabilizers may also be used. The selection of an emulsion stabilizer or combination of emulsion stabilizers can affect the particle morphology and particle size. An emulsion stabilizer can comprise poly(vinyl alcohol), BYK®-425, nanosilica particles, or a combination of any of the foregoing.

Emulsion compositions characterized by slow initiation of the thiol-ene reaction generally produce spherical polymeric particles having a smaller diameter, such as a diameter less than 5 m or less than 2 μm. The diameter of sulfur-containing polymeric particles generally decreases when poly(vinyl alcohol) is used as the weight stabilizer, when the rate of cure is slow, when the shear rate of mixing is increased, and/or when the sulfur-containing polymeric particles remain in the emulsion for a longer time.

To prepare the sulfur-containing polymeric particles, a polythiol monomer, a polyalkenyl monomer, and an emulsion stabilizer can be combined and mixed at a high shear rate. For example, an emulsion can be mixed at a rate of 11,000 rpm using a T25 TURRAX® (IKA® Werke Staufen) dispersing instrument.

The thiol-ene reaction can be initiated using, for example, ferrous ammonium sulfate or other ferrous salt. The amount of ferrous salt initiator can be less than 0.2 wt %, less than 0.1 wt %, or less than 0.01 wt %, where wt % is based on the total weight of the emulsion. The initiator can generate free radicals. Other examples of initiators include persulfate salts such as sodium peroxymonosulfate, potassium peroxymonosulfate, sodium persulfate, ammonium persulfate, and potassium persulfate; peroxides; and hydroperoxides.

A polymerization emulsion for preparing sulfur-containing polymeric particles can comprise, for example, from 75 wt % to 98 wt % water, from 80 wt % to 96 wt %, from 82 wt % to 94 wt % or from 84 wt % to 92 wt % water, where wt % is based on the total weight of the polymerization emulsion.

A polymerization emulsion can comprise, for example, from 0.1 wt % to 4 wt % of a stabilizer or combination of stabilizers, from 0.2 wt % to 3 wt %, or from 0.5 wt % to 2 wt % of a stabilizer or combination of stabilizers, where wt % is based on the total weight of the polymerization emulsion.

A polymerization emulsion can comprise, for example, from 1 wt % to 10 wt % of a polythiol monomer, from 2 wt % to 9 wt %, or from 3 wt % to 8 wt % of a polythiol monomer, where wt % is based on the total weight of the polymerization emulsion.

A polymerization emulsion can comprise, for example, from 0.5 wt % to 8 wt % of a polyalkenyl monomer, from 1 wt % to 7 wt %, from 1.5 wt % to 6.5 wt %, or from 2 wt % to 6 wt % of a polyalkenyl monomer, where wt % is based on the total weight of the polymerization emulsion.

A polymerization emulsion can comprise, for example, from 75 wt % to 98 wt % water, from 80 wt % to 96 wt %, from 82 wt % to 94 wt % or from 84 wt % to 92 wt % water; from 0.1 wt % to 4 wt % of a stabilizer or combination of stabilizers, from 0.2 wt % to 3 wt %, or from 0.5 wt % to 2 wt % of a stabilizer or combination of stabilizers; 1 wt % to 10 wt % of a polythiol monomer, from 2 wt % to 9 wt %, or from 3 wt % to 8 wt % of a monomer 1; and from 0.5 wt % to 8 wt % of a polyalkenyl monomer, from 1 wt % to 7 wt %, from 1.5 wt % to 6.5 wt %, or from 2 wt % to 6 wt % of a polyalkenyl monomer.

Sulfur-containing polymeric particles provided by the present disclosure may also be prepared using Michael addition chemistry. For example, a thiol-terminated sulfur-containing prepolymer such as a thiol-terminated polythiol may be reacted with a compound having two or more Michael acceptor groups. Examples of Michael addition curing chemistries as applied to sulfur-containing prepolymers are disclosed, for example, in U.S. Application Publication No. 2013/0345371, which is incorporated by reference in its entirety. A Michael acceptor group can comprise, for example, an acrylate, a vinyl ketone, a vinyl sulfone, a quinone, an enamine, a ketimine, an aldimine, or an oxazolidine. A Michael acceptor group can comprise a vinyl ketone or a vinyl sulfone such as a group derived from a divinyl sulfone.

A Michael addition reaction may take place in the presence of an amine catalyst. Examples of suitable amine catalysts for Michael addition reactions include, for example, triethylenediamine (1,4-diazabicyclo[2.2.2]octane, DABCO), dimethylcyclohexylamine (DMCHA), dimethylethanolamine (DMEA), bis-(2-dimethylaminoethyl) ether, N-ethylmorpholine, triethylamine, 1,8-diazabicyclo [5.4.0]undecene-7 (DBU), pentamethyldiethylenetriamine (PMDETA), benzyldimethylamine (BDMA), N,N,N'-trimethyl-N'-hydroxyethyl-bis(aminoethyl)ether, N'-(3-(dimethylamino)propyl)-N,N-dimethyl-1,3-propanediamine, and combinations of any of the foregoing.

Polythiols, polyalkenyl compounds and polyfunctional Michael acceptors used to prepare sulfur-containing polymeric particles provided by the present disclosure can be water-soluble. Polythiols, polyalkenyl compounds and polyfunctional Michael acceptors used to prepare sulfur-containing polymeric particles provided by the present disclosure can have a solubility sufficient to partition into the aqueous phase of the emulsion. Polythiols, polyalkenyl compounds and polyfunctional Michael acceptors used to prepare sulfur-containing polymeric particles provided by the present disclosure can have a molecular weight, for example, within a range, for example, from 100 Daltons to 2,000 Daltons, from 100 Daltons to 1,500 Daltons, from 100 Daltons to 1,000 Daltons, from 100 Daltons to 800 Daltons, or from 100 Daltons to 500 Daltons.

Compositions provided by the present disclosure can comprise sulfur-containing polymeric particles provided by the present disclosure and a sulfur-containing prepolymer or combinations of sulfur-containing prepolymers.

Sulfur-containing polymeric particles can be provided as dry sifted powders (100% solids) that are directly mixed into a coating or sealant composition. Dried sulfur-containing polymeric particles can have a tendency to agglomerate.

Alternatively, a polymerization emulsion containing sulfur-containing polymeric particles can be incorporated into a coating or sealant composition. The emulsion containing sulfur-containing polymeric particles and solvents can contain, for example, from 5 wt % to 25 wt % solids, from 10 wt % to 20 wt % solids, or from 12 wt % to 18 wt % solids, where wt % is based on the total weight of the emulsion, can be added to a coating or sealant composition, and the combined resin dried at room temperature to evaporate the solvent. This process can add stabilizers into the curable polymeric composition, which can degrade the properties of the cured coating or sealant.

In another method for adding sulfur-containing polymeric particles to a coating or sealant composition, after the sulfur-containing polymeric particles are synthesized, the particles can be allowed to settle from the emulsion, and then separated from the solvent to provide a paste comprising the sulfur-containing polymeric particles. The paste, having a high solids content, for example, from 55 wt % to 75 wt %, from 60 wt % to 70 wt %, or from 62 wt % to 68 wt %, where wt % is based on the total weight of the paste, can then be added to the coating or sealant formulation. This process can minimize the introduction of stabilizers into the coating or sealant.

Compositions provided by the present disclosure can comprise, for example, less than 40 wt % of the sulfur-containing polymeric particles provided by the present disclosure, less than 30 wt %, less than 20 wt %, less than 10 wt %, less than 5 wt %, less than 2 wt %, less than 1 wt %, or less than 0.5 wt % of the sulfur-containing polymeric particles, where wt % is based on the total weight of the curable composition.

Compositions provided by the present disclosure can comprise, for example, from 0.5 wt % to 40 wt % of a sulfur-containing polymeric particles, from 0.5 wt % to 30 wt %, from 1 wt % to 30 wt %, from 0.5 wt % to 20 wt %, from 0.5 wt % to 10 wt %, from 0.5 wt % to 5 wt %, or from 0.5 wt % to 2 wt % of the sulfur-containing polymeric particles, where wt % is based on the total weight of the composition when formulated as a coating or sealant.

Sulfur-containing prepolymers are useful in aerospace coating and sealant applications in part because of the ability of the products such as coatings and sealants formed from the sulfur-containing prepolymers to retain their physical properties following exposure to aerospace fuel and other aerospace fluids. Suitable sulfur-containing prepolymers include, for example, polythioethers, polysulfides, sulfur-containing polyformals, monosulfides, and combinations of any of the foregoing. The sulfur-containing prepolymers may be terminated with suitable functional groups appropriate for a particular curing chemistry. For example, the sulfur-containing prepolymers may be thiol-terminated when using polyepoxy curing agents, in UV curable systems employing polyalkenyl compounds, or when using Michael addition curing agents. A sulfur-containing prepolymer can be amine-terminated or hydroxyl-terminated as appropriate for use with isocyanate curing agents. Sulfur-containing prepolymers may also be terminated in Michael acceptor groups, epoxy groups, hydroxyl groups, alkenyl group, polyalkoxysilyl groups, or isocyanate groups, as appropriate for a particular curing chemistry.

A sulfur-containing prepolymer may be terminated, for example, with thiol groups and/or alkenyl groups, which can react with unreacted thiol and/or alkenyl groups on the exterior surface of sulfur-containing polymeric particles provided by the present disclosure.

A sulfur-containing prepolymer can comprise, for example, a polythioether, a polysulfide, a sulfur-containing polyformal, and a combination of any of the foregoing. A sulfur-containing prepolymer can comprise a polythioether, or a sulfur-containing polymer can comprise a polysulfide. A sulfur-containing prepolymer may comprise a mixture of different polythioethers and/or polysulfides, and the polythioethers and/or polysulfides may have the same or different functionality. A sulfur-containing prepolymer can have an average functionality from 2 to 6, from 2 to 4, from 2 to 3, from 2.3 to 2.8, or from 2.05 to 2.5. For example, a sulfur-containing prepolymer can be selected from a difunctional sulfur-containing prepolymer, a trifunctional sulfur-containing prepolymer, or a combination thereof. A sulfur-containing prepolymer can comprise a sulfur-containing polyformal.

Sulfur-containing prepolymers such as thiol-terminated polythioether prepolymers can be liquid at room temperature and can have a glass transition temperature $T_g$, for example, less than −20° C., less than −30° C., or less than −40° C.

Sulfur-containing prepolymers provided by the present disclosure can be characterized by a number average molecular weight and/or a molecular weight distribution. Sulfur-containing prepolymers can exhibit a number average molecular weight within a range, for example, from 500 Daltons to 20,000 Daltons, from 2,000 Daltons to 5,000 Daltons, or from 1,000 Daltons to 4,000 Daltons. Sulfur-containing prepolymers can exhibit a polydispersity (Mw/Mn; weight average molecular weight/number average molecular weight), for example, ranging from 1 to 20, or from 1 to 5.

A sulfur-containing prepolymer can be thiol-terminated; accordingly, a sulfur-containing prepolymer may include a thiol-terminated polythioether, a thiol-terminated polysulfide, a thiol-terminated sulfur-containing polyformal, a thiol-terminated monosulfide, or a combination of any of the foregoing.

Compositions and sealant formulations provided by the present disclosure can comprise a polythioether prepolymer such as a thiol-terminated polythioether prepolymer.

Examples of thiol-terminated polythioethers are disclosed, for example, in U.S. Pat. No. 6,172,179. A thiol-terminated polythioether can comprise Permapol® P3.1E, and Permapol® L56086, or a combination of any of the foregoing, each of which is available from PPG Aerospace.

A polythioether prepolymer can comprise a polythioether comprising at least one moiety of Formula (8):

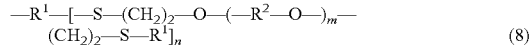

$$-R^1-[-S-(CH_2)_2-O-(-R^2-O-)_m-(CH_2)_2-S-R^1]_n- \quad (8)$$

where,
each $R^1$ is independently selected from $C_{2-10}$ n-alkanediyl, $C_{3-6}$ branched alkanediyl, $C_{6-8}$ cycloalkanediyl, $C_{6-10}$ alkanecycloalkanediyl, and —[—$(CHR^3)_p$—X—$]_q$—$(CHR^3)_r$, where each $R^3$ is selected from hydrogen and methyl;
each $R^2$ is selected from $C_{2-10}$ n-alkanediyl, $C_{3-6}$ branched alkanediyl, $C_{6-8}$ cycloalkanediyl, $C_{6-14}$ alkanecycloalkanediyl, and —[—$(CH_2)_p$—X—$]_q$—$(CH_2)_r$; and each X is independently selected from O, S, and —NR—, where R is selected from hydrogen and methyl;
m is an integer from 0 to 50;
n is an integer from 1 to 60;
p is an integer from 2 to 6;
q is an integer from 1 to 5; and
r is an integer from 2 to 10.

In polythioether prepolymers of Formula (8), $R^1$ can be $-[(CHR^3)_p-X-]_q-(CHR^3)_r-$ wherein each X can independently comprise O and S. In polythioether prepolymers of Formula (8), $R^1$ can be $-[(CHR^3)_p-X-]_q-(CHR^3)_r-$, each X can be O or each X can be S.

In polythioether prepolymers of Formula (8), $R^1$ can be $-[(CH_2)_p-X-]_q-(CH_2)_r-$ wherein each X can independently comprise O and S. In prepolymers of Formula (1), $R^1$ can be $-[(CH_2)_p-X-]_q-(CH_2)_r-$, each X can be O or each X can be S.

In polythioether prepolymers of Formula (8), $R^1$ can be $-[(CH_2)_p-X-]_q-(CH_2)_r-$, where p can be 2, X can be O, q can be 2, r can be 2, $R^2$ can be ethanediyl, m can be 2, and n can be 9.

In polythioether prepolymers of Formula (8), each $R^1$ can be derived from 1,8-dimercapto-3,6-dioxaoctane (DMDO), each $R^1$ can be derived from dimercaptodiethylsulfide (DMDS), or a combination thereof.

In polythioether prepolymers of Formula (8), each m can independently be an integer from 1 to 3. Each m can be the same and can be 1, 2, or 3.

In polythioether prepolymers of Formula (8), n can be an integer from 1 to 30, an integer from 1 to 20, an integer from 1 to 10, or an integer from 1 to 5. In addition, n may be any integer from 1 to 60.

In polythioether prepolymers of Formula (8), each p can independently be 2, 3, 4, 5, and 6. Each p can be the same and can be 2, 3, 4, 5, or 6.

In polythioether prepolymers of Formula (8), each q can independently be 1, 2, 3, 4, or 5. Each q can be the same and can be 1, 2, 3, 4, or 5.

In polythioether prepolymers of Formula (8), each r can independently be 2, 3, 4, 5, 6, 7, 8, 9, or 10.

In polythioether prepolymers of Formula (8), each r can be the same and can be 2, 3, 4, 5, 6, 7, 8, 9, or 10.

In polythioether prepolymers of Formula (8), each r can independently be an integer from 2 to 4, from 2 to 6, or from 2 to 8.

In polythioether prepolymers of Formula (1), each $R^2$ can independently comprise a $C_{2-10}$ n-alkanediyl group, a $C_{3-6}$ branched alkanediyl group, or a $-[(CH_2)_p-X-]_q-(CH_2)_r-$ group.

In polythioether prepolymers of Formula (8), each $R^2$ can independently comprise a $C_{2-10}$ n-alkanediyl group.

In polythioether prepolymers of Formula (8), each $R^2$ can independently comprise a $-[(CH_2)_p-X-]_q-(CH_2)_r-$ group, where each X can be O or S.

A thiol-terminated polythioether can comprise a thiol-terminated polythioether of Formula (8a), a thiol-terminated polythioether of Formula (8b), a thiol-terminated polythioether of Formula (8c), or a combination of any of the foregoing:

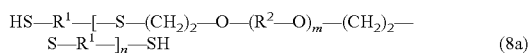

(8a)

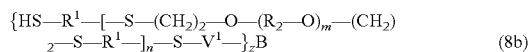

(8b)

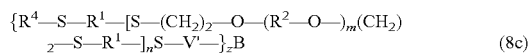

(8c)

where,
each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(CHR^3)_p-X]_q-(CHR^3)_r-$, wherein,
p is an integer from 2 to 6;
q is an integer from 1 to 5;
r is an integer from 2 to 10;
each $R^3$ is independently selected from hydrogen and methyl; and
each X is independently selected from O, S, and NR, where R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and $-[(CH_2)_p-X]_q-(CH_2)_r-$, wherein p, q, r, and X are as defined as for $R^1$;
m is an integer from 0 to 50;
n is an integer from 1 to 60;
B represents a core of a z-valent, polyfunctionalizing agent $B(-V)_z$ wherein,
z is an integer from 3 to 6; and
each V is a moiety comprising a terminal group reactive with a thiol;
each $-V^1-$ is derived from the reaction of $-V$ with a thiol; and
each $R^4$ independently comprises hydrogen and a bond to $B(-V^1-)_z$.

In polythioether prepolymers of Formula (8a)-(8c), $R^1$ can be $-[-(CH_2)_p-X-]_q-(CH_2)_r-$, where p can be 2, X can be $-O-$, q can be 2, r can be 2, $R^2$ can be ethanediyl, m can be 2, and n can be 9.

In polythioether prepolymers of Formula (8a)-(8c), $R^1$ can be $C_{2-6}$ alkanediyl or $-[(CHR^3), X]_q-(CHR^3)_r-$.

In polythioether prepolymers of Formula (8a)-(8c), $R^1$ can be $-[-(CHR^3)_p-X-]_q-(CHR^3)_r-$, or X can be $-O-$ or X can be $-S-$.

In polythioether prepolymers of Formula (8a)-(8c), $R^1$ can be $-[-(CH_2)_p-X-]_q-(CH_2)_r-$, or X can be $-O-$ or X can be $-S-$.

In polythioether prepolymers of Formula (8a)-(8c), where $R^1$ is $-[-(CHR^3)_p-X-]_q-(CHR^3)_r-$, p can be 2, r can be 2, q can be 1, and X can be $-S-$; p can be 2, q can be 2, r can be 2, and X can be $-O-$; or p can be 2, r can be 2, q can be 1, and X can be $-O-$.

In polythioether prepolymers of Formula (8a)-(8c), where $R^1$ is $-[-(CH_2)_p-X-]_q-(CH_2)_r-$, p can be 2, r can be 2, q can be 1, and X is $-S-$; p can be 2, q can be 2, r can be 2, and X can be $-O-$; or p can be 2, r can be 2, q can be 1, and X can be $-O-$.

In polythioether prepolymers of Formula (8a)-(8c), where $R^1$ is $-[-(CHR^3)_p-X-]_q-(CHR^3)_r-$, each $R^3$ can be hydrogen, or at least one $R^3$ can be methyl.

In polythioether prepolymers of Formula (8a)-(8c), each $R^1$ can be the same, or at least one $R^1$ is different.

In polythioether prepolymers of Formula (8a)-(8c), each m can be 1, 2, 3, or 4; or m can be an integer from 1 to 10, from 1 to 6, or from 1 to 4. M can be an integer from 2 to 10, from 2 to 6, or from 2 to 4. In a polythioether prepolymers of Formula (8a)-(8c), m can be 1 to 50, or 2 to 40, or 1 to 10.

In polythioether prepolymers of Formula (8a)-(8c), n can be an integer from 1 to 30, an integer from 1 to 20, an integer from 1 to 10, or an integer from 1 to 5. In addition, n may be any integer from 1 to 60.

In polythioether prepolymers of Formula (8a)-(8c), each p can independently comprise 2, 3, 4, 5, or 6. Each p can be the same and can be 2, 3, 4, 5, or 6.

In polythioether prepolymers of Formula (8a)-(8c), each r can comprise 2, 3, 4, 5, 6, 7, or 8.

In polythioether prepolymers of Formula (8a)-(8c), each q can comprise 1, 2, 3, 4, or 5.

In thiol-terminated polythioether prepolymers of Formula (8a)-(8c) the prepolymers can comprise the reaction product of DMDO, diethylene glycol divinyl ether, and triallyl cyanurate (TAC), wherein $R^1$ is —[(—$CH_2$—)$_p$—X—]$_q$—($CH_2$)$_r$—, wherein p is 2, q is 2, r is 2, and X is —O—; $R^2$ is —($CH_2$)$_2$— and m is 2; and B(—V)$_z$ has the structure of Formula (9):

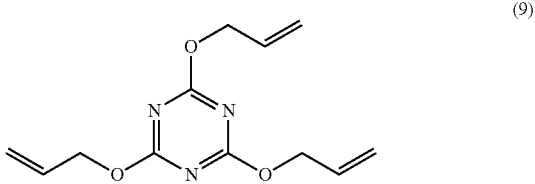 [SMILES: C=CCOc1nc(OCC=C)nc(OCC=C)n1]

(9)

Various methods can be used to prepare thiol-terminated polythioethers of Formula (8), Formula (8a)-(8c). Examples of suitable thiol-terminated polythioethers, and methods for their production, are described in U.S. Pat. No. 6,172,179, which is incorporated by reference in its entirety. Such thiol-terminated polythioethers may be difunctional, that is, linear prepolymers having two terminal thiol groups, or polyfunctional, that is, branched prepolymers having three or more terminal thiol groups. Suitable thiol-terminated polythioethers are commercially available, for example, as Permapol® P3.1e, Permapol® L56086, or a combination of any of the foregoing, available from PPG Aerospace, Sylmar, Calif.

A thiol-terminated polythioether prepolymer may comprise a mixture of different polythioethers and the polythioethers may have the same or different functionality. A thiol-terminated polythioether can have an average functionality from 2 to 6, from 2 to 4, from 2 to 3, from 2.05 to 2.8, from 2.3 to 2.8, or from 2.05 to 2.5. For example, a thiol-terminated polythioether can comprise a difunctional thiol-terminated polythioether, a trifunctional thiol-terminated polythioether, and a combination thereof.

A thiol-terminated polythioether can be prepared by reacting a polythiol and a polyalkenyl such as a divinyl ether, and the amounts of the respective reactants used to prepare the polythioethers are chosen to yield terminal thiol groups. Thus, in some cases, (n or >n, such as n+1) moles of a polythiol, such as a dithiol or a mixture of at least two different dithiols and 0.05 moles to 1 moles, such as 0.1 moles to 0.8 moles, of a thiol-terminated polyfunctionalizing agent may be reacted with (n) moles of a diene, such as a divinyl ether, or a mixture of at least two different dienes, such as at least two divinyl ethers. A thiol-terminated polyfunctionalizing agent can be present in the reaction mixture in an amount sufficient to provide a thiol-terminated polythioether having an average functionality of from 2.05 to 3, such as from 2.1 to 2.8, or from 2.1 to 2.6.

The reaction used to make a thiol-terminated polythioether may be catalyzed by a free radical catalyst. Suitable free radical catalysts include azo compounds, for example azobisnitrile compounds such as azo(bis)isobutyronitrile (AIBN); organic peroxides, such as benzoyl peroxide and tert-butyl peroxide; and inorganic peroxides, such as hydrogen peroxide. The reaction can also be effected by irradiation with ultraviolet light either with or without a radical initiator/photosensitizer. Ionic catalysis methods, using either inorganic or organic bases, e.g., triethylamine, may also be used.

Suitable thiol-terminated polythioethers may be produced by reacting a divinyl ether or mixtures of divinyl ethers with an excess of dithiol or a mixtures of dithiols.

Thus, a thiol-terminated polythioether can comprise the reaction product of reactants comprising:

(a) a dithiol of Formula (1):

wherein,
$R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and —[—($CHR^3$)$_p$—X—]$_q$—($CHR^3$)$_r$—; wherein,
each $R^3$ is selected from hydrogen and methyl;
each X is independently selected from —O—, —S—, —NH—, and —N(—$CH_3$)—;
p is an integer from 2 to 6;
q is an integer from 1 to 5; and
r is an integer from 2 to 10; and (b) a divinyl ether of Formula (3):

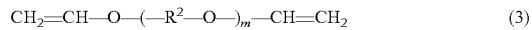

wherein,
m is an integer from 0 to 50;
each $R^2$ is independently selected from $C_{1-10}$ alkanediyl, $C_{6-8}$ cycloalkanediyl, $C_{6-14}$ alkanecycloalkanediyl, and —[—($CHR^3$)$_p$—X—]$_q$—($CHR^3$)$_r$—, wherein p, q, r, $R^3$, and X are as defined for Formula (1).

Furthermore, the reactants may comprise (c) a polyfunctional compound such as a polyfunctional compound B(—V)$_z$, where B comprises a core of a z-valent polyfunctionalizing agent B(—V)$_z$; z is an integer from 3 to 6; and each —V— is independently a moiety comprising a terminal thiol group or a terminal alkenyl group.

Dithiols suitable for use in preparing thiol-terminated polythioethers can include those having the structure of Formula (1), other dithiols disclosed herein, or combinations of any of the dithiols disclosed herein.

In a dithiol of Formula (1), $R^1$ can be —[—($CHR^3$)$_p$—X—]$_q$—($CHR^3$)$_r$—.

In a dithiol of Formula (1), X can be —O— or —S—, and thus —[—($CHR^3$)$_p$—X—]$_q$—($CHR^3$)$_r$— in Formula (1) can be —[—($CHR^3$)$_p$—O—]$_q$—($CHR^3$)$_r$—, —[(—$CHR^3$—)$_p$—S—]$_q$—($CHR^3$)$_r$—, —[(—$CH_2$—)$_p$—O—]$_q$—($CH_2$)$_r$—, or —[—($CH_2$)$_p$—]$_s$—S—]$_q$—($CH_2$)$_r$—. In a dithiol of Formula (1), p and r can be equal, such as where p and r can be both two.

In a dithiol of Formula (1), $R^1$ can be $C_{2-6}$ alkanediyl or —[—($CHR^3$)$_p$—X—]$_q$—($CHR^3$)$_r$—.

In a dithiol of Formula (1), $R^1$ can be —[—($CHR^3$)$_p$—X—]$_q$—($CHR^3$)$_r$—, X can be —O—, or X can be —S—.

In a dithiol of Formula (1), $R^1$ can be —[—($CH_2$)$_p$—X—]$_q$—($CH_2$)$_r$—, X can be —O—, or X can be —S—.

In a dithiol of Formula (1), where $R^1$ can be —[—($CHR^3$)$_p$—X—]$_q$—($CHR^3$)$_r$—, p can be 2, r can be 2, q can be 1, and X can be —S—; p can be 2, q can be 2, r can be 2, and X can be —O—; or p can be 2, r can be 2, q can be 1, and X can be —O—. In a dithiol of Formula (1), where $R^1$ is —[—($CH_2$)$_p$—X—]$_q$—($CH_2$)$_r$—, p can be 2, r can be 2, q can be 1, and X can be —S—; p can be 2, q can be 2, r can be 2, and X can be —O—; or p can be 2, r can be 2, q can be 1, and X can be —O—.

In a dithiol of Formula (1) where $R^1$ is —[—($CHR^3$)$_p$—X—]$_q$—($CHR^3$)$_r$—, each $R^3$ can be hydrogen, or at least one $R^3$ can be methyl.

In dithiols of Formula (1), each $R^1$ can be derived from 1,8-dimercapto-3,6-dioxaoctane (DMDO; 2,2-(ethane-1,2-diylbis(sulfanyl))bis(ethan-1-thiol)), or each $R^1$ can be derived from dimercaptodiethylsulfide (DMDS; 2,2'-thiobis (ethan-1-thiol)), and combinations thereof.

In a dithiol of Formula (1), each p can independently be 2, 3, 4, 5, and 6. Each p can be the same and is 2, 3, 4, 5, or 6.

In dithiols of Formula (1), each r can be 2, 3, 4, 5, 6, 7, or 8.

In dithiols of Formula (1), each q can be 1, 2, 3, 4, or 5.

Examples of suitable dithiols include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing.

Other examples of suitable dithiols include dimercaptodiethylsulfide (DMDS; 2,2'-(ethane-1,2-diylbis(sulfanediyl) bis(ethane-1-thiol)) (in Formula (1), $R^1$ is —[—$(CH_2)_p$—X—]$_q$—$(CH_2)_r$—, wherein p is 2, r is 2, q is 1, and X is —S—); dimercaptodioxaoctane (DMDO; 2,2'-(ethylenedioxy)diethanethiol) (in Formula (1), $R^1$ is —[—$(CH_2)_p$—X—]$_q$—$(CH_2)_r$—, wherein p is 2, q is 2, r is 2, and X is —O—); and 1,5-dimercapto-3-oxapentane (in Formula (1), $R^1$ is —[—$(CH_2)_p$—X—]$_q$—$(CH_2)_r$—, wherein p is 2, r is 2, q is 1, and X is —O—). It is also possible to use dithiols that include both a heteroatom in the carbon backbone and a pendent alkyl group, such as a pendent methyl group. Such compounds include, for example, methyl-substituted DMDS, such as HS—$CH_2CH(CH_3)$—S—$CH_2CH_2$—SH, HS—$CH(CH_3)CH_2$—S—$CH_2CH_2$—SH and dimethyl substituted DMDS, such as HS—$CH_2CH(CH_3)$—S—$CHCH_3CH_2$—SH and HS—$CH(CH_3)CH_2$—S—$CH_2CH(CH_3)$—SH.

Suitable divinyl ethers for preparing thiol-terminated polythioethers include, for example, divinyl ethers of Formula (3):

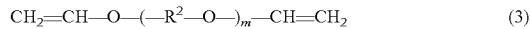

$$CH_2=CH-O-(-R^2-O-)_m-CH=CH_2 \quad (3)$$

where m is 0 to 50 and $R^2$ in Formula (3) is selected from $C_{2-6}$ n-alkanediyl, $C_{3-6}$ branched alkanediyl, $C_{6-8}$ cycloalkanediyl, $C_{6-10}$ alkanecycloalkanediyl, and —[—$(CH_2)_p$—X—]$_q$—$(CH_2)_r$—, where X is O or S, p is an integer from 2 to 6, q is an integer from 1 to 5, and r is an integer from 2 to 10. In a divinyl ether of Formula (3), $R^2$ can be $C_{2-6}$ n-alkanediyl, $C_{3-6}$ branched alkanediyl, $C_{6-8}$ cycloalkanediyl, $C_{6-10}$ alkanecycloalkanediyl, or —[—$(CH_2)_p$—X—]$_q$—$(CH_2)_r$—.

Suitable divinyl ethers include, for example, compounds having at least one oxyalkanediyl group, such as from 1 to 4 oxyalkanediyl groups, i.e., compounds in which m in Formula (3) is an integer ranging from 1 to 4. In Formula (3) m can be an integer ranging from 2 to 4. It is also possible to employ commercially available divinyl ether mixtures that are characterized by a non-integral average value for the number of oxyalkanediyl units per molecule. Thus, m in Formula (3) can also be a rational number values ranging from 0 to 10.0, such as from 1.0 to 10.0, from 1.0 to 4.0, or from 2.0 to 4.0, such as 2.5, which represents an average functionality.

Examples of suitable vinyl ethers include, divinyl ether, ethylene glycol divinyl ether (EG-DVE) ($R^2$ in Formula (3) is ethanediyl and m is 1), butanediol divinyl ether (BD-DVE) ($R^2$ in Formula (3) is butanediyl and m is 1), hexanediol divinyl ether (HD-DVE) ($R^2$ in Formula (3) is hexanediyl and m is 1), diethylene glycol divinyl ether (DEG-DVE) ($R^2$ in Formula (3) is ethanediyl and m is 2), triethylene glycol divinyl ether ($R^2$ in Formula (3) is ethanediyl and m is 3), tetraethylene glycol divinyl ether ($R^2$ in Formula (3) is ethanediyl and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such polyvinyl ether monomers.

Divinyl ethers in which $R^2$ in Formula (3) is $C_{3-6}$ branched alkanediyl may be prepared by reacting a polyhydroxyl compound with acetylene. Examples of branched divinyl ethers include compounds in which $R^2$ in Formula (3) is an alkyl-substituted methanediyl group such as —CH(—$CH_3$)—, for which $R^2$ in Formula (3) is ethanediyl and m is 3 or an alkyl-substituted ethanediyl.

Other useful divinyl ethers include compounds in which $R^2$ in Formula (3) is polytetrahydrofuryl (poly-THF) or polyoxyalkanediyl, such as those having an average of about 3 monomer units.

Two or more types of dithiols and/or polyvinyl ether monomers of Formula (3) may be used. Thus, two dithiols of Formula (1) and one polyvinyl ether monomer of Formula (3), one dithiol of Formula (1) and two polyvinyl ether monomers of Formula (3), two dithiols of Formula (1) and two divinyl ether monomers of Formula (3), and more than two compounds of one or both Formula (1) and Formula (3), may be used to produce a variety of thiol-terminated polythioethers.

A polyvinyl ether monomer can comprise 20 mole percent to less than 50 mole percent of the reactants used to prepare a thiol-terminated polythioether, or 30 mole percent to less than 50 mole percent.

Relative amounts of dithiols and divinyl ethers can be selected to yield polythioethers having terminal thiol groups. Thus, a dithiol of Formula (1) or a mixture of at least two different dithiols of Formula (1), can be reacted with of a divinyl ether of Formula (3) or a mixture of at least two different divinyl ethers of Formula (3) in relative amounts such that the molar ratio of thiol groups to alkenyl groups is greater than 1:1, such as from 1.1:1.0 to 2.0:1.0.

The reaction between dithiols and divinyl ethers and/or polythiols and polyvinyl ethers may be catalyzed by a free radical catalyst. Suitable free radical catalysts include, for example, azo compounds, for example azobisnitriles such as azo(bis)isobutyronitrile (AIBN); organic peroxides such as benzoyl peroxide and t-butyl peroxide; and inorganic peroxides such as hydrogen peroxide. The catalyst may be a free-radical catalyst, an ionic catalyst, or ultraviolet radiation. Examples of free-radical catalysts include azo-type catalyst, such as Vazo®-57 (Du Pont), Vazo®-64 (Du Pont), Vazo®-67 (Du Pont), V-70® (Wako Specialty Chemicals), and V-65B® (Wako Specialty Chemicals). Examples of other free-radical catalysts include alkyl peroxides, such as t-butyl peroxide. The reaction may also be effected by irradiation with ultraviolet light either with or without a cationic photoinitiating moiety.

Thiol-terminated polythioethers provided by the present disclosure may be prepared by combining at least one dithiol of Formula (1) and at least one divinyl ether of Formula (3) followed by addition of an appropriate catalyst, and carrying out the reaction at a temperature, for example, from 30° C. to 120° C., such as 70° C. to 90° C., for a time from 2 hours to 24 hours, such as from 2 hours to 6 hours.

Thiol-terminated polythioether prepolymers may comprise a polyfunctional polythioether prepolymer, i.e., may have an average thiol functionality greater than 2.0. Suitable polyfunctional thiol-terminated polythioether prepolymers include, for example, those having the structure of Formula (8b), the structure of Formula (8c), or a combination thereof:

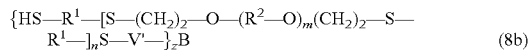

$$\{HS-R^1-[S-(CH_2)_2-O-(R^2-O)_m(CH_2)_2-S-R^1-]_nS-V'-\}_zB \qquad (8b)$$

$$\{R^4-S-R^1-[S-(CH_2)_2-O-(R^2-O)_m(CH_2)_2-S-R^1-]_nS-V'-\}_zB \qquad (8c)$$

wherein z has an average value of greater than 2.0, such as an average value within a range from 2 and 3, an average value within a range from 2.1 to 2.8, an average value within a range from 2 and 4, an average value within a range from 3 and 6, or an average value within a range from 3 to 6.

In prepolymers of Formula (8c), each $R^4$ can independently comprise hydrogen or a bond to $B(-V^1-)_z$. Each of the other-$V^1$ can be bonded to a moiety of Formula (8), which can be bonded to hydrogen or to another $B(-V^1-)_z$. Polyfunctionalizing agents suitable for use in preparing such polyfunctional thiol-terminated polythioethers include trifunctionalizing agents, that is, compounds where z is 3. Suitable trifunctionalizing agents include, for example, triallyl cyanurate (TAC), 1,2,3-propanetrithiol, isocyanurate-containing trithiols, and combinations thereof, as disclosed, for example, in U.S. Application Publication No. 2010/0010133, which is incorporated by reference in its entirety, and isocyanurates as disclosed, for example, in U.S. Application Publication No. 2011/0319559, which is incorporated by reference in its entirety. Other useful polyfunctionalizing agents include trimethylolpropane trivinyl ether, and the polythiols described in U.S. Pat. Nos. 4,366,307; 4,609,762; and 5,225,472, each of which is incorporated by reference in its entirety. Mixtures of polyfunctionalizing agents may also be used. As a result, polythioethers provided by the present disclosure may have a wide range of average functionality. For example, trifunctionalizing agents may afford average functionalities from 2.05 to 3.0, such as from 2.1 to 2.6. Wider ranges of average functionality may be achieved by using tetrafunctional or higher functionality polyfunctionalizing agents. Functionality may also be determined by factors such as stoichiometry, as will be understood by those skilled in the art.

Thiol-terminated polythioether prepolymers provided by the present disclosure can be liquid at room temperature and can have a glass transition temperature $T_g$, for example, less than −20° C., less than −30° C., or less than −40° C., where the glass transition temperature $T_g$ is determined by Dynamic Mechanical Analysis (DMA) using a TA Instruments Q800 apparatus with a frequency of 1 Hz, an amplitude of 20 microns, and a temperature ramp of −80° C. to 25° C., with the $T_g$ identified as the peak of the tan δ curve according to ASTM D7028.

Thiol-terminated polythioether prepolymers can exhibit a viscosity, for example, within a range from 20 poise to 500 poise (2 Pa-sec to 50 Pa-sec), from 20 poise to 200 poise (2 Pa-sec to 20 Pa-sec) or from 40 poise to 120 poise 4 Pa-sec to 12 Pa-sec), measured using a Brookfield CAP 2000 viscometer, with a No. 6 spindle, at speed of 300 rpm, and a temperature of 23° C.

It will be appreciated that polythioethers having a backbone of Formula (8) can be terminated or capped with a reactive functional group to adapt the polythioethers for use with a particular curing chemistries. Polythioethers having a backbone of Formula (8) can be terminated, for example, with thiol, epoxy, amine, hydroxyl, isocyanate, alkenyl, silane, alkoxysilyl, or Michael acceptor groups. These modified polythioehters can be prepared by reacting a thiol-terminated polythioether, such as a thiol-terminated polythioether of Formula (8a)-(8c) with a compound having a group that is reactive with a thiol group, and a suitable terminal functional groups. Examples of groups that are reactive with thiol groups include epoxy, thiol, Michael acceptor, alkenyl, and isocyanate groups. The capping compound can have the structure, for example:

$$R^{20}-R^{21}-R^{22}$$

where $R^{20}$ is selected from an epoxy group, a thiol group, an amine group, a hydroxyl group, an isocyanate group, a Michael acceptor group, a silane group, an alkenyl group, and an alkoxysilyl group; $R^{22}$ is selected from an epoxy group, a thiol group, an isocyanate group, an alkenyl group, and a Michael acceptor group; and $R^{21}$ is selected from $C_{1-10}$ alkanediyl, $C_{5-20}$ cycloalkanediyl, $C_{6-20}$ arenediyl, $C_{6-20}$ alkylcycloalkanediyl, $C_{7-20}$ alkylarenediyl, $C_{1-10}$ heteroalkanediyl, $C_{5-20}$ heterocycloalkanediyl, $C_{6-20}$ heteroarenediyl, $C_{6-20}$ heteroalkylcycloalkanediyl, $C_{7-20}$ heteroalkylarenediyl, substituted $C_{1-10}$ alkanediyl, substituted $C_{5-20}$ cycloalkanediyl, substituted $C_{6-20}$ arenediyl, substituted $C_{6-20}$ alkylcycloalkanediyl, substituted $C_{7-20}$ alkylarenediyl, substituted $C_{1-10}$ heteroalkanediyl, substituted $C_{5-20}$ heterocycloalkanediyl, substituted $C_{6-20}$ heteroarenediyl, substituted $C_{6-20}$ heteroalkylcycloalkanediyl, and substituted $C_{7-20}$ heteroalkylarenediyl. A compound used to modify a polythioether prepolymer such as a thiol-terminated prepolymer can have a low molecular weight compared to that of the polythioether prepolymer backbone. For example, the capping compound can have a molecular weight less than 1,000 Daltons, less than 800 Daltons, less than 600 Daltons, or less than 400 Daltons.

Similar compounds and methods can be used to modify the terminal groups of the other thiol-terminated sulfur-containing prepolymer disclosed herein.

For example, adhesion promoting groups, antioxidants, metal ligands, and/or urethane linkages can be incorporated into the backbone of a polythioether prepolymer to improve one or more performance attributes. Examples of backbone-modified polythioether prepolymers are disclosed, for example, in U.S. Pat. No. 8,138,273 (urethane containing), U.S. Pat. No. 9,540,540 (sulfone-containing), U.S. Pat. No. 8,952,124 (bis(sulfonyl)alkanol-containing), U.S. Pat. No. 9,382,642 (metal-ligand containing), U.S. Application Publication No. 2017/0114208 (antioxidant-containing), U.S. Provisional Application No. 62/417,848 filed on Nov. 4, 2016 (sulfur-containing divinyl ether), and PCT International Application No. PCT/US2017/45871(urethane-containing), each of which is incorporated by reference in its entirety. Incorporating modifying segments into the backbone of the sulfur-containing prepolymer can affect properties of a cured sealant prepared using the prepolymer such as flexibility and adhesion.

A thiol-terminated sulfur-containing prepolymer can comprise a thiol-terminated sulfur-containing polyformal. Sulfur-containing polyformal prepolymers useful in aerospace sealant applications are disclosed, for example, in U.S. Pat. No. 8,729,216 and in U.S. Pat. No. 8,541,513, each of which is incorporated by reference in its entirety.

A thiol-terminated sulfur-containing prepolymer can comprise a thiol-terminated sulfur-containing polyformal comprising a moiety of Formula (9):

$$-R^1-(S)_p-R^1-[O-C(R^2)_2-O-R^1-(S)_p-R^1-]_n- \qquad (9)$$

where n is an integer from 1 to 50; each p is independently 1 or 2; each $R^1$ is $C_{2-6}$ alkanediyl; each $R^2$ is independently selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl.

A thiol-terminated sulfur-containing polyformal prepolymer can have the structure of Formula (9a):

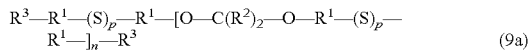
(9a)

where n is an integer from 1 to 50; each p is independently 1 or 2; each $R^1$ is $C_{2-6}$ alkanediyl; each $R^2$ is independently selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl; and each $R^3$ comprises a thiol-terminated group.

In sulfur-containing polyformal prepolymers of Formula (9) and Formula (9a), each $R^1$ can independently be selected from $C_{2-6}$ alkanediyl, $C_{2-4}$ alkanediyl, $C_{2-3}$ alkanediyl, and ethane-1,2-diyl. In sulfur-containing polyformal prepolymers of Formula (9), each $R^1$ can be ethane-1,2-diyl.

In sulfur-containing polyformal prepolymers of Formula (9) and Formula (9a), each $R^2$ can independently be selected from hydrogen, $C_{1-6}$ alkyl, $C_{1-4}$ alkyl, $C_{1-3}$ alkyl, and $C_{1-2}$ alkyl. In sulfur-containing polyformal prepolymers of Formula (9) and Formula (9a), each $R^2$ can be selected from hydrogen, methyl, and ethyl.

In sulfur-containing polyformal prepolymers of Formula (9) and Formula (9a), each $R^1$ is the same and can be $C_{2-3}$ alkanediyl such as ethane-1,2-diyl or propane-1,3-diyl; and each $R^2$ is the same and can be selected from hydrogen and $C_{1-3}$ alkyl such as methyl, ethyl, or propyl. In sulfur-containing polyformal prepolymers of Formula (9) and Formula (9a), each $R^1$ can be ethane-1,2-diyl. In sulfur-containing polyformal prepolymers of Formula (9) and Formula (9a), each $R^2$ can be hydrogen. In sulfur-containing polyformal prepolymers of Formula (9) and Formula (9a), each $R^1$ can be ethane-1,2-diyl and each $R^2$ can be hydrogen.

In sulfur-containing polyformal prepolymers of Formula (9) and Formula (9a), n can be an integer selected from 1 to 50, an integer from 2 to 40, an integer from 4 to 30, or n can be an integer from 7 to 30.

In sulfur-containing polyformal prepolymers of Formula (9) and Formula (9a), each p is the same and can be 1, and each p is the same and can be 2.

In sulfur-containing polyformal prepolymers of Formula (9) and Formula (9a) can have a number average molecular weight from 200 Daltons to 6,000 Daltons, from 500 Daltons to 5,000 Daltons, from 1,000 Daltons to 5,000 Daltons, from 1,500 Daltons to 4000 Daltons, or from 2,000 Daltons to 3,600 Daltons.

In sulfur-containing polyformal prepolymers of Formula (9a), each $R^3$ can be a thiol-terminated group and can comprise, for example, a group of Formula (a), Formula (b), Formula (c), Formula (d), Formula (e), or Formula (f):

(a)

(b)

(c)

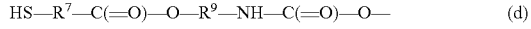
(d)

(e)

(f)

where each $R^6$ comprises a moiety derived from a diisocyanate or a moiety derived from an ethylenically unsaturated monoisocyanate; each $R^7$ is selected from $C_{2-14}$ alkanediyl and $C_{2-14}$ heteroalkanediyl; and each $R^9$ is selected from $C_{2-6}$ alkanediyl, $C_{2-6}$ heteroalkanediyl, $C_{6-12}$ arenediyl, substituted $C_{6-12}$ arenediyl, $C_{6-12}$ heteroarenediyl, substituted $C_{6-12}$ heteroarenediyl, $C_{3-12}$ cycloalkanediyl, substituted $C_{3-12}$ cycloalkanediyl, $C_{3-12}$ heterocycloalkanediyl, substituted $C_{3-12}$ heterocycloalkanediyl, $C_{7-18}$ alkanearenediyl, substituted $C_{7-18}$ heteroalkanearenediyl, $C_{4-18}$ alkanecycloalkanediyl, and substituted $C_{4-18}$ alkanecycloalkanediyl.

Sulfur-containing polyformal prepolymers provided by the present disclosure can have the structure of Formula (9b):

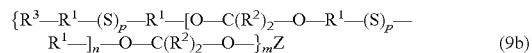
(9b)

where each n is an integer selected from 1 to 50; m is an integer selected from 3 to 6; p is independently selected from 1 and 2; each $R^1$ is independently selected from $C_{2-6}$ alkanediyl; each $R^2$ independently comprises hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl; each $R^3$ comprises a thiol-terminated group; and Z is derived from the core of an m-valent parent polyol $Z(OH)_m$.

In sulfur-containing polyformal prepolymers of Formula (9b), each $R^1$ is independently selected from $C_{2-6}$ alkanediyl, $C_{2-4}$ alkanediyl, $C_{2-3}$ alkanediyl, and ethane-1,2-diyl. In sulfur-containing polyformal prepolymers of Formula (9b), each $R^1$ can be ethane-1,2-diyl.

In sulfur-containing polyformal prepolymers of Formula (9b), each $R^2$ is independently selected from hydrogen, $C_{1-6}$ alkyl, $C_{1-4}$ alkyl, $C_{1-3}$ alkyl, and $C_{1-2}$ alkyl. In sulfur-containing polyformal prepolymers of Formula (9b), each $R^2$ can be selected from hydrogen, methyl, and ethyl.

In sulfur-containing polyformal prepolymers of Formula (9b), each $R^1$ can be the same and can be $C_{2-3}$ alkanediyl such as ethane-1,2-diyl or propane-1,3-diyl; and each $R^2$ is the same and can be selected from hydrogen and $C_{1-3}$ alkyl such as methyl, ethyl, or propyl. In sulfur-containing polyformal prepolymers of Formula (9b), each $R^1$ can be ethane-1,2-diyl. In sulfur-containing polyformal prepolymers of Formula (9b), each $R^2$ can be hydrogen. In sulfur-containing polyformal prepolymers of Formula (9b), each $R^1$ can be ethane-1,2-diyl and each $R^2$ can be hydrogen.

In sulfur-containing polyformal prepolymers of Formula (9b), m can be 1, m can be 2, m can be 3, m can be 4, m can be 5, or m can be 6.

In sulfur-containing polyformal prepolymers of Formula (9b) where m is 3, the parent polyol $Z(OH)_m$ is a triol of Formula (10):

(10)

where each $R^2$ is independently $C_{1-6}$ alkanediyl, or a triol of Formula (11):

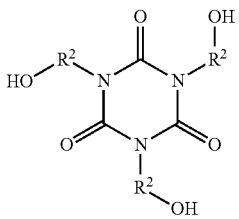

(11)

where each $R^2$ is independently $C_{1-6}$ alkanediyl. Accordingly, in these embodiments Z can have the structure of Formula (12a) or Formula (12b):

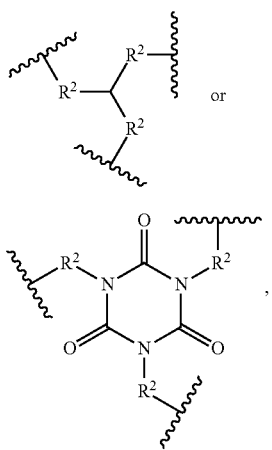

(12a)

(12b)

respectively, where each $R^2$ can independently be $C_{1-6}$ alkanediyl.

In sulfur-containing polyformal prepolymers of Formula (9b), each n is an integer selected from 1 to 50, an integer selected from 2 to 40, an integer selected from 4 to 30, or an integer selected from 7 to 30.

In sulfur-containing polyformal prepolymers of Formula (9b), each p is the same and is 1, and each p is the same and is 2.

In sulfur-containing polyformal prepolymers of Formula (9b) has a number average molecular weight from 200 Daltons to 6,000 Daltons, from 500 Daltons to 5,000 Daltons, from 1,000 Daltons to 5,000 Daltons, from 1,500 Daltons to 4,000 Daltons, or from 2,000 Daltons to 3,600 Daltons.

In sulfur-containing polyformal prepolymers of Formula (9b), $R^3$ can be bonded to a polyfunctionalizing agent $B(—V)_z$ through a moiety of Formula (9).

In sulfur-containing polyformal prepolymers of Formula (9b), each $R^3$ can be the same.

In sulfur-containing polyformal prepolymers of Formula (9b), each $R^3$ can comprise a thiol-terminated group of Formula (a), Formula (b), Formula (c), Formula (d), Formula (e), or Formula (f):

HS—$R^7$—$R^6$—O— (a)

HS—$R^7$—O— (b)

HS—$R^7$—NH—C(=O)—O— (c)

HS—$R^7$—C(=O)—O—$R^9$—NH—C(=O)—O— (d)

HS—$R^7$—C(=O)—NH—$R^9$—NH—C(=O)—O— (e)

HS—$R^7$—C(=O)—O— (f)

where each $R^6$ comprises a moiety derived from a diisocyanate or a moiety derived from an ethylenically unsaturated monoisocyanate; each $R^7$ is selected from $C_{2-14}$ alkanediyl and $C_{2-14}$ heteroalkanediyl; and each $R^9$ is selected from $C_{2-6}$ alkanediyl, $C_{2-6}$ heteroalkanediyl, $C_{6-12}$ arenediyl, substituted $C_{6-12}$ arenediyl, $C_{6-12}$ heteroarenediyl, substituted $C_{6-12}$ heteroarenediyl, $C_{3-12}$ cycloalkanediyl, substituted $C_{3-12}$ cycloalkanediyl, $C_{3-12}$ heterocycloalkanediyl, substituted $C_{3-12}$ heterocycloalkanediyl, $C_{7-18}$ alkanearenediyl, substituted $C_{7-18}$ heteroalkanearenediyl, $C_{4-18}$ alkanecycloalkanediyl, and substituted $C_{4-18}$ alkanecycloalkanediyl.

A thiol-terminated sulfur-containing prepolymer can comprise a thiol-terminated monosulfide.

A thiol-terminated monosulfide prepolymer can comprise a thiol-terminated monosulfide prepolymer comprising a moiety of Formula (13):

$$—S—R^2—[—S—(R—X)_p—(R^1—X)_q—R^2—]_n—$$
$$S—$$ (13)

wherein, each R is independently selected from $C_{2-10}$ alkanediyl, such as $C_{2-6}$ alkanediyl; $C_{2-10}$ branched alkanediyl, such as $C_{3-6}$ branched alkanediyl or a $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkyanediyl, such as $C_{6-10}$ alkylcycloalkanediyl; and $C_{8-10}$ alkylarenediyl;

each $R^1$ is independently selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkanediyl, such as $C_{6-10}$ alkylcycloalkanediyl; and $C_{8-10}$ alkylararenediyl;

each $R^2$ is independently selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkanediyl, such as a $C_{6-10}$ alkylcycloalkanediyl; and $C_{8-10}$ alkylararenediyl;

each X is independently selected from O and S;

p is an integer from 1 to 5;

q is an integer from 0 to 5; and n is an integer from 1 to 60, such as from 2 to 60, from 3 to 60, or from 25 to 35.

In thiol-terminated monosulfide prepolymers of Formula (13), each X is independently selected from S and O; p is an integer from 1 to 5; q is an integer from 0 to 5; n is an integer from 1 to 60; each R is independently selected from $C_{2-10}$ alkanediyl, $C_{6-8}$ cycloalkanediyl, $C_{1-4}$ alkylcycloalkanediyl, and $C_{8-10}$ alkylarenediyl; each $R^1$ is independently selected from $C_{1-10}$ alkanediyl, $C_{6-8}$ cycloalkanediyl, $C_{1-4}$ alkylcycloalkanediyl, and $C_{8-10}$ alkylarenediyl; and each $R^2$ is independently selected from $C_{2-10}$ alkanediyl, $C_{6-8}$ cycloalkanediyl, $C_{1-4}$ alkylcycloalkanediyl, and $C_{8-10}$ alkylarenediyl.

A thiol-terminated monosulfide prepolymer can comprise a thiol-terminated monosulfide prepolymer of Formula (13a), a thiol-terminated monosulfide prepolymer of Formula (13b), a thiol-terminated monosulfide prepolymer of Formula (13c), or a combination of any of the foregoing:

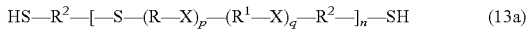
$$HS-R^2-[-S-(R-X)_p-(R^1-X)_q-R^2-]_n-SH \quad (13a)$$

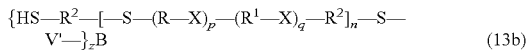
$$\{HS-R^2-[-S-(R-X)_p-(R^1-X)_q-R^2]_n-S-V'-\}_zB \quad (13b)$$

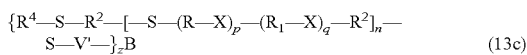
$$\{R^4-S-R^2-[-S-(R-X)_p-(R_1-X)_q-R^2]_n-S-V'-\}_zB \quad (13c)$$

wherein,
each R is independently selected from $C_{2-10}$ alkanediyl, such as $C_{2-6}$ alkanediyl; $C_{2-10}$ branched alkanediyl, such as $C_{3-6}$ branched alkanediyl or a $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkyanediyl, such as $C_{6-10}$ alkylcycloalkanediyl; and $C_{8-10}$ alkylarenediyl;

each $R^1$ is independently selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkanediyl, such as $C_{6-10}$ alkylcycloalkanediyl; and $C_{8-10}$ alkylarenediyl;

each $R^2$ is independently selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl group; $C_{6-14}$ alkylcycloalkanediyl, such as a $C_{6-10}$ alkylcycloalkanediyl; and $C_{8-10}$ alkylararenediyl;

each X is independently selected from O and S;
p is an integer from 1 to 5;
q is an integer from 0 to 5; and
n is an integer from 1 to 60, such as from 2 to 60, from 3 to 60, or from 25 to 35.

In thiol-terminated monosulfide prepolymers of Formula (13)-(13c): each X is independently selected from S and O; p is an integer from 1 to 5; q is an integer from 0 to 5; n is an integer from 1 to 60; each R is independently selected from $C_{2-10}$ alkanediyl, $C_{6-8}$ cycloalkanediyl, $C_{1-4}$ alkylcycloalkanediyl, and $C_{8-10}$ alkylarenediyl; each $R^1$ is independently selected from $C_{1-10}$ alkanediyl, $C_{6-8}$ cycloalkanediyl, $C_{1-4}$ alkylcycloalkanediyl, and $C_{8-10}$ alkylarenediyl; each $R^2$ is independently selected from $C_{2-10}$ alkanediyl, $C_{6-8}$ cycloalkanediyl, $C_{1-4}$ alkylcycloalkanediyl, and $C_{8-10}$ alkylarenediyl; B represents a core of a z-valent polyfunctionalizing agent $B(-V)_z$ wherein: z is an integer from 3 to 6; and each V is a moiety comprising a terminal group reactive with a thiol group; each $-V\leftrightarrows-$ is derived from the reaction of $-V$ with a thiol; each $R^4$ independently comprises hydrogen or a bond to a polyfunctionalizing agent $B(-V)_z$.

In thiol-terminated monosulfide prepolymers of Formula (13)-(13c), each X can independently be S or O, each X can be S, or each X can be O.

In thiol-terminated monosulfide prepolymers of Formula (13)-(13c), p can be an integer from 2 to 6, or p can be 1, 2, 3, 4, 5, or 6.

In thiol-terminated monosulfide prepolymers of Formula (13)-(13c), q can be an integer from 1 to 5, q can be an integer from 2 to 5, or q can be 0, 1, 2, 3, 4, or 5.

In thiol-terminated monosulfide prepolymers of Formula (10)-(13c), n can be an integer from 2 to 60, from 3 to 60, or from 25 to 35.

In thiol-terminated monosulfide prepolymers of Formula (13)-(13c), each R can be independently selected from $C_{2-10}$ alkanediyl and $C_{6-8}$ cycloalkanediyl, each R can be $C_{2-10}$ alkanediyl, or each R can be $C_{6-8}$ cycloalkanediyl.

In thiol-terminated monosulfide prepolymers of Formula (13)-(13c), each R can be selected from $C_{2-6}$ alkanediyl, $C_{2-4}$ alkanediyl, $C_{3-10}$ alkanediyl, and $C_{3-6}$ alkanediyl.

In thiol-terminated monosulfide prepolymers of Formula (13)-(13c), each R can be selected from ethanediyl, 1,3-propanediyl, 1,2-propanediyl, 1,4-butanediyl, and 1,3-butanediyl.

In thiol-terminated monosulfide prepolymers of Formula (13)-(13c), each $R^1$ can independently be selected from $C_{1-10}$ alkanediyl and $C_{6-8}$ cycloalkanediyl, each R can be $C_{1-10}$ alkanediyl, or each $R^1$ can be $C_{6-8}$ cycloalkanediyl.

In thiol-terminated monosulfide prepolymers of Formula (13)-(13c), each $R^1$ can be selected from $C_{1-6}$ alkanediyl, $C_{1-4}$ alkanediyl, $C_{2-10}$ alkanediyl, and $C_{2-6}$ alkanediyl.

In thiol-terminated monosulfide prepolymers of Formula (13)-(13c), each $R^1$ can be selected from methanediyl, ethanediyl, 1,3-propanediyl, 1,2-propanediyl, 1,4-butanediyl, and 1,3-butanediyl.

In thiol-terminated monosulfide prepolymers of Formula (13)-(13c), each $R^2$ can independently be selected from $C_{2-10}$ alkanediyl and $C_{6-8}$ cycloalkanediyl, each $R^2$ can be $C_{2-10}$ alkanediyl, or each $R^2$ can be $C_{6-8}$ cycloalkanediyl.

In thiol-terminated monosulfide prepolymers of Formula (13)-(13c), each $R^2$ can be selected from $C_{2-6}$ alkanediyl, $C_{2-4}$ alkanediyl, $C_{3-10}$ alkanediyl, and $C_{3-6}$ alkanediyl.

In thiol-terminated monosulfide prepolymers of Formula (13)-(13c), each $R^2$ can be selected from ethanediyl, 1,3-propanediyl, 1,2-propanediyl, 1,4-butanediyl, and 1,3-butanediyl.

In thiol-terminated monosulfides of Formula (13)-(13c), p can be 1 or 2, q can be 1 or 2, n can be an integer from 1 to 60 or an integer from 25 to 35, each X can be 0 or S, each R can be $C_{2-4}$ alkanediyl, each $R^1$ can be $C_{1-4}$ alkanediyl, and each $R^2$ can be $C_{2-4}$ alkanediyl.

In thiol-terminated monosulfide prepolymers of Formula (13)-(13c), p can be 1 or 2, q can be 1 or 2, n can be an integer from 1 to 60 or an integer from 25 to 35, each X can be O or S, each R can be $C_2$ alkanediyl, each $R^1$ can be $C_1$ alkanediyl, and each $R^2$ can be $C_2$ alkanediyl.

In thiol-terminated monosulfide prepolymers of Formula (13)-(13c), p can be 1 or 2, q can be 1 or 2, n can be an integer from 1 to 60 or an integer from 25 to 35, each X can be O, each R can be $C_2$ alkanediyl, each $R^1$ can be $C_1$ alkanediyl, and each $R^2$ can be $C_2$ alkanediyl.

In thiol-terminated monosulfide prepolymers of Formula (13)-(13c), $B(-V)_z$ can be selected from 1,2,3-trichloropropane, 1,1,1-tris(chloromethyl)propane, 1,1,1-tris(chloromethyl)ethane, and 1,3,5-tris(chloromethyl)benzene, and a combination of any of the foregoing.

In thiol-terminated monosulfide prepolymers of Formula (13c) each $R^4$ can independently selected from hydrogen and a bond to a polyfunctionalizing agent $(B(V)_z$ through a moiety of Formula (13). In thiol-terminated monosulfide prepolymer can have an average thiol functionality, for example, from 2.05 to 2.9, such as from 2.1 to 2.8, or from 2.2 to 2.6.

Thiol-terminated monosulfide prepolymers of Formula (13)-(13c) can be prepared by reacting an α,ω-dihalo organic compounds, a metal hydrosulfide, a metal hydroxide, and an optional polyfunctionalizing agent. Examples of suitable α,ω-dihalo organic compounds include bis(2-chloroethyl)formal. Examples of suitable metal hydrosulfides and metal hydroxides include sodium hydrosulfide and sodium hydroxide. Examples of suitable polyfunctionalizing agents include 1,2,3-trichloropropane, 1,1,1-tris(chloromethyl)propane, 1,1,1-tris(chloromethyl)ethane, and 1,3,5-tris(chloromethyl)benzene. Methods of synthesizing thiol-terminated monosulfide prepolymers of Formula (13)-(13c) are disclosed, for example, in U.S. Pat. No. 7,875,666, which is incorporated by reference in its entirety.

A thiol-terminated monosulfide prepolymer can comprise a thiol-terminated monosulfide prepolymer comprising a moiety of Formula (14):

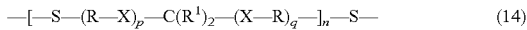   (14)

wherein,
each R is independently selected from $C_{2-10}$ alkanediyl, such as $C_{2-6}$ alkanediyl; $C_{3-10}$ branched alkanediyl, such as a $C_{3-6}$ branched alkanediyl or a $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkyanediyl, such as $C_{6-10}$ alkylcycloalkanediyl; and a $C_{8-10}$ alkylarenediyl;
each $R^1$ is independently selected from hydrogen, $C_{1-10}$ n-alkyl, such as $C_{1-6}$ n-alkyl, $C_{3-10}$ branched alkyl, such as $C_{3-6}$ branched alkyl having one or more pendant groups which can be, for example, alkyl groups, such as methyl or ethyl groups; $C_{6-8}$ cycloalkyl group; $C_{6-14}$ alkylcycloalkyl, such as $C_{6-10}$ alkylcycloalkyl; and $C_{8-10}$ alkylaryl;
each X is independently selected from O and S;
p is an integer from 1 to 5;
q is an integer from 1 to 5; and
n is an integer from 1 to 60, such as from 2 to 60, from 3 to 60, or from 25 to 35.

A thiol-terminated monosulfide prepolymer can comprise a thiol-terminated monosulfide prepolymer of Formula (14a), a thiol-terminated monosulfide prepolymer of Formula (14b), a thiol-terminated monosulfide prepolymer of Formula (14c), or a combination thereof:

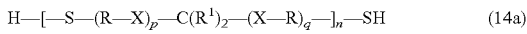   (14a)

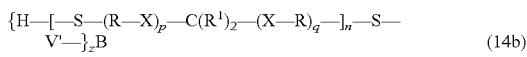   (14b)

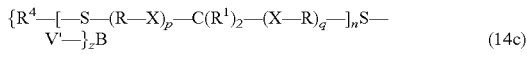   (14c)

where,
each R is independently selected from $C_{2-10}$ alkanediyl, such as $C_{2-6}$ alkanediyl; a $C_{3-10}$ branched alkanediyl, such as a $C_{3-6}$ branched alkanediyl or a $C_{3-6}$ branched alkanediyl having one or more pendant groups which can be, for example, alkyl groups, such as methyl or ethyl groups; a $C_{6-8}$ cycloalkanediyl; a $C_{6-14}$ alkylcycloalkyanediyl, such as a $C_{6-10}$ alkylcycloalkanediyl; and a $C_{8-10}$ alkylarenediyl;
each $R^1$ is independently selected from hydrogen, $C_{1-10}$ n-alkyl, such as a $C_{1-6}$ n-alkyl, $C_{3-10}$ branched alkyl, such as a $C_{3-6}$ branched alkyl having one or more pendant groups which can be, for example, alkyl groups, such as methyl or ethyl groups; a $C_{6-8}$ cycloalkyl group; a $C_{6-14}$ alkylcycloalkyl, such as a $C_{6-10}$ alkylcycloalkyl; and a $C_{8-10}$ alkylaryl;
each X is independently selected from O and S;
p is an integer from 1 to 5;
q is an integer from 1 to 5;
n is an integer from 1 to 60, such as from 2 to 60, from 3 to 60, or from 25 to 35;

B represents a core of a z-valent polyfunctionalizing agent $B(—V)_z$ wherein:
z is an integer from 3 to 6; and
each V is a moiety comprising a terminal group reactive with a thiol group;
each —V'— is derived from the reaction of —V with a thiol; and
each $R^4$ independently comprises hydrogen or a bond to a polyfunctionalizing agent $B(—V)_z$.

In thiol-terminated monosulfide prepolymers of Formula (14)-(14c) each X can independently be S or O; p is an integer from 1 to 5; q is an integer from 1 to 5; n is an integer from 1 to 60; each R independently comprises $C_{2-10}$ alkanediyl; each $R^1$ is independently selected from hydrogen and $C_{1-10}$ alkyl; B represents a core of a z-valent polyfunctionalizing agent $B(—V)_z$ wherein: z is an integer from 3 to 6; and each V is a moiety comprising a terminal group reactive with a thiol group; each —V'— is derived from the reaction of —V with a thiol; and each $R^4$ is independently hydrogen or is bonded to a polyfunctionalizing agent $B(—V)_z$.

In thiol-terminated monosulfide prepolymers of Formula (14)-(14c), each X can be S, or each X can be O.

In thiol-terminated monosulfide prepolymers of Formula (14)-(14c), p can be an integer from 2 to 5, or q can be 1, 2, 3, 4, or 5.

In thiol-terminated monosulfide prepolymers of Formula (14)-(14c), p can be an integer from 2 to 5, or q can be 1, 2, 3, 4, or 5.

In thiol-terminated monosulfide prepolymers of Formula (14)-(14c), n can be an integer from 2 to 60, from 3 to 60, or from 25 to 35.

In thiol-terminated monosulfide prepolymers of Formula (14)-(14c), each R can be independently selected from $C_{2-6}$ alkanediyl and $C_{2-4}$ alkanediyl.

In thiol-terminated monosulfide prepolymers of Formula (14)-(14c), each R can be selected from ethanediyl, 1,3-propanediyl, 1,2-propanediyl, 1,4-butanediyl, and 1,3-butanediyl.

In thiol-terminated monosulfide prepolymers of Formula (14)-(14c), each R can be selected from $C_{2-10}$ n-alkanediyl, $C_{2-10}$ branched alkanediyl, and a combination thereof.

In thiol-terminated monosulfide prepolymers of Formula (14)-(14c), each $R^1$ can be independently selected from hydrogen and $C_{2-6}$ alkyl.

In thiol-terminated monosulfide prepolymers of Formula (14)-(14c), each $R^1$ can be independently selected from hydrogen, ethyl, n-propyl, iso-propyl, n-butanyl, and iso-butyl.

In thiol-terminated monosulfide prepolymers of Formula (14)-(14c), each $R^1$ can be selected from $C_{1-10}$ n-alkyl, $C_{1-10}$ branched alkyl, and a combination thereof.

In thiol-terminated monosulfide prepolymers of Formula (14)-(14c), each X is O, p is 1 or 2, q is 1 or 2, n is 1 to 60 such as 2 to 60, each R is $C_{2-4}$ alkanediyl such as ethanediyl, and each $R^1$ is hydrogen.

In thiol-terminated monosulfide prepolymers of Formula (14)-(14c), each X is O, p is 1, q is 1, n is 1 to 60 such as 2 to 60, each R is $C_{2-4}$ alkanediyl such as ethanediyl, and each $R^1$ is hydrogen.

In thiol-terminated monosulfide prepolymers of Formula (14)-(14c), each X is O, p is 2, q is 2, n is 1 to 60 such as 2 to 60, each R is $C_{2-4}$ alkanediyl such as ethanediyl, and each $R^1$ is hydrogen.

In thiol-terminated monosulfide prepolymers of Formula (14)-(14c), $B(—V)_z$ can be selected from 1,2,3-trichloropropane, 1,1,1-tris(chloromethyl)propane, 1,1,1-tris(chloromethyl)ethane, and 1,3,5-tris(chloromethyl)benzene, and a combination of any of the foregoing.

Thiol-terminated monosulfide prepolymers of Formula (14a) and (14b) can be prepared by reacting an α,ω-dihalo organic compounds, a metal hydrosulfide, a metal hydroxide, and an optional polyfunctionalizing agent. Examples of suitable α,ω-dihalo organic compounds include bis(2-chloroethyl)formal. Examples of suitable metal hydrosulfides and metal hydroxides include sodium hydrosulfide and sodium hydroxide. Examples of suitable polyfunctionalizing agents include 1,2,3-trichloropropane, 1,1,1-tris(chloromethyl)propane, 1,1,1-tris(chloromethyl)ethane, and 1,3,5-tris(chloromethyl)benzene. Methods of synthesizing thiol-terminated monosulfides of Formula (11)-(11c) are disclosed, for example, in U.S. Pat. No. 8,466,220, which is incorporated by reference in its entirety.

Thiol-terminated monosulfide prepolymers can have a number average molecular weight within a range from 300 Daltons to 10,000 Daltons, such as within a range 1,000 Daltons to 8,000 Daltons, where the molecular weight is determined by gel-permeation chromatography using a polystyrene standard. Thiol-terminated monosulfide prepolymers can have a glass transition temperature $T_g$ less than −40° C., less than −55° C., or less than −60° C. The glass transition temperature $T_g$ is determined by Dynamic Mechanical Analysis (DMA) using a TA Instruments Q800 apparatus with a frequency of 1 Hz, an amplitude of 20 microns, and a temperature ramp of −80° C. to 23° C., with the $T_g$ identified as the peak of the tan δ curve according to ASTM D7028.

A thiol-terminated sulfur-containing prepolymer can comprise a thiol-terminated polysulfide prepolymer. A polysulfide prepolymer refers to a prepolymer that contains one or more polysulfide linkages, i.e., $-S_x-$ linkages, where x is from 2 to 4, in the prepolymer backbone and/or in pendant positions on the prepolymer chain. A polysulfide prepolymer can have two or more sulfur-sulfur linkages. Suitable polysulfides are commercially available, for example, from AkzoNobel and Toray Industries, Inc. under the names Thioplast® and from Thiokol-LP®, respectively.

Examples of suitable polysulfide prepolymers are disclosed, for example, in U.S. Pat. Nos. 4,623,711; 6,172,179; 6,509,418; 7,009,032; and 7,879,955, each of which is incorporated by reference in its entirety.

Examples of suitable thiol-terminated polysulfides include Thioplast™ G polysulfides such as Thioplast™ Gi, Thioplast™ G4, Thioplast™ G10, Thioplast™ G12, Thioplast™ G21, Thioplast™ G22, Thioplast™ G44, Thioplast™ G122, and Thioplast™ G131, which are commercially available from AkzoNobel. Thioplast™ G resins are liquid polysulfide polymers that are blends of di- and tri-functional molecules where the difunctional polysulfide polymers have the structure of Formula (15):

SH—(—R—S—S—)$_n$—R—SH     (15)

and the trifunctional polysulfide polymers have the structure of Formula (16):

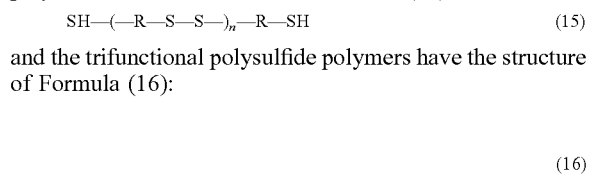
(16)

where each R is —(CH$_2$)$_2$—O—CH$_2$—O—(CH$_2$)$_2$—, and n=a+b+c, where the value for n may be from 7 to 38 depending on the amount of the trifunctional cross-linking agent (1,2,3-trichloropropane; TCP) used during synthesis of the polysulfide polymer. Thioplast™ G polysulfides can have a number average molecular weight from less than 1,000 Daltons to 6,500 Daltons, a SH content from 1% to greater than 5.5%, and a cross-linking density from 0% to 2.0%.

Examples of suitable thiol-terminated polysulfide prepolymers also include Thiokol™ LP polysulfides available from Toray Industries, Inc. such as Thiokol™ LP2, Thiokol™ LP3, Thiokol™ LP12, Thiokol™ LP23, Thiokol™ LP33, and Thiokol™ LP55. Thiokol™ LP polysulfides have a number average molecular weight from 1,000 Daltons to 7,500 Daltons, a SH content from 0.8% to 7.7%, and a cross-linking density from 0% to 2%. Thiokol LP polysulfides have the general structure of Formula (17):

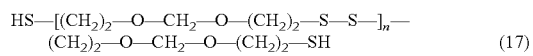
(17)

where n can be such that the number average molecular weight from 1,000 Daltons to 7,500 Daltons, such a, for example an integer from 8 to 80.

A thiol-terminated sulfur-containing prepolymer can comprise a Thiokol-LP® polysulfide, a Thioplast® G polysulfide, or a combination thereof.

A thiol-terminated polysulfide prepolymer can comprise a thiol-terminated polysulfide prepolymer of Formula (18):

(18)

where,
t is an integer from 1 to 60;
q is an integer from 1 to 8;
p is an integer from 1 to 10;
r is an integer from 1 to 10;
each y is independently selected from 1 and 2;
y has a mean value within a range from greater than 1.0 to 1.5;
each R is independently selected from branched alkanediyl, branched arenediyl, and a moiety having the structure —(CH$_2$)$_p$—O—(CH$_2$)$_q$—O—(CH$_2$)$_r$—;
B represents a core of a z-valent polyfunctionalizing agent B(—V)$_z$ wherein:
z is an integer from 3 to 6; and
each V is a moiety comprising a terminal group reactive with a thiol group; and
each —V'— is derived from the reaction of —V with a thiol.

In thiol-terminated polysulfide prepolymers of Formula (18), t can be, for example, an integer from 2 to 60, from 1 to 40, or from 1 to 20.

In thiol-terminated polysulfide prepolymers of Formula (18), q can be, for example, an integer from 1 to 6, or an integer from 1 to 4. For example, q can be 1, 2, 3, 4, 5 or 6.

In thiol-terminated polysulfide prepolymers of Formula (18), each p can be, for example, an integer from 1 to 6 or from 1 to 4. For example, each p can be 1, 2, 3, 4, 5, 6, 7, 8, 9, or 10.

In thiol-terminated polysulfide prepolymers of Formula (18), each r can be, for example, an integer from 1 to 6 or from 1 to 4. For example, each p can be 1, 2, 3, 4, 5, 6, 7, 8, 9, or 10.

In thiol-terminated polysulfide prepolymers of Formula (18), y can have a value of 1.

In thiol-terminated polysulfide prepolymers of Formula (18), y can have a mean value, for example, of greater than 1, such as from 1.05 to 2, or from 1.1 to 1.8.

In thiol-terminated polysulfide prepolymers of Formula (18), R can be —(CH$_2$)$_p$—O—(CH$_2$)$_q$—O—(CH$_2$)$_r$—.

In thiol-terminated polysulfide prepolymers of Formula (18), R can be —(CH$_2$)$_p$—O—(CH$_2$)$_q$—O—(CH$_2$)$_r$—, each q can be 1, 2, 3, or 4, and each p and r can be 1 or 2.

In thiol-terminated polysulfide prepolymers of Formula (18), 0% to 20% of the R groups can be selected from branched alkanediyl and branched arenediyl, and 80% to 100% of the R groups can be —(CH$_2$)$_p$—O—(CH$_2$)$_q$—O—(CH$_2$)$_r$—.

In thiol-terminated polysulfide prepolymers of Formula (18), a branched alkanediyl or a branched arenediyl can be —R$^1$(-A)$_n$- where R$^1$ is a hydrocarbon group, n is 1 or 2, and A is a branching point. A branched alkanediyl can have the structure —CH$_2$—CH(—CH$_2$—)—.

Thiol-terminated polysulfide prepolymers of Formula (18) can be prepared by reacting an α,ω-dihalo organic compounds, a metal hydrosulfide, a metal hydroxide, and an optional polyfunctionalizing agent. Examples of suitable α,ω-dihalo organic compounds include bis(2-chloroethyl) formal. Examples of suitable metal hydrosulfides and metal hydroxides include sodium hydrosulfide and sodium hydroxide. Examples of suitable polyfunctionalizing agents include 1,2,3-trichloropropane, 1,1,1-tris(chloromethyl)propane, 1,1,1-tris(chloromethyl)ethane, and 1,3,5-tris(chloromethyl)benzene.

Examples of thiol-terminated polysulfide prepolymers of Formula (18) are disclosed, for example, in U.S. Application Publication No. 2016/0152775, in U.S. Pat. No. 9,079,833, and in U.S. Pat. No. 9,663,619.

A thiol-terminated polysulfide prepolymer can comprise a thiol-terminated polysulfide prepolymer of Formula (19):

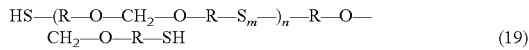
(19)

where R is C$_{2-4}$ alkanediyl, each m is independently an integer from 2 to 8, and n is an integer from 1 to 370.

In thiol-terminated polysulfide prepolymers of Formula (19), m can have a mean value, for example, greater than 1, such as from 1.05 to 2, or from 1.1 to 1.8.

In thiol-terminated polysulfide prepolymers of Formula (19), each m can independently be, for example, an integer from 2 to 6, an integer from 2 to 4, or the integer 2, 3, 4, 5, 6, 7, or 8.

In thiol-terminated polysulfide prepolymers of Formula (19), n can be, for example, an integer from 2 to 200 or an integer from 2 to 100.

In thiol-terminated polysulfide prepolymers of Formula (19), each R can independently be selected from ethanediyl, 1,3-propanediyl, 1,1-propanediyl, 1,2-propanediyl, 1,4-butanediyl, 1,1-butanediyl, 1,2-butanediyl, and 1,3-butanediyl.

Examples of thiol-terminated polysulfide prepolymers of Formula (19) are disclosed, for example, in JP 62-53354.

Thiol-terminated polysulfide prepolymers can be liquid at room temperature. Thiol-terminated monosulfide prepolymers can have a viscosity, at 100% solids, of no more than 1,500 poise (150 Pa-sec), such as 40 poise to 500 poise (4 Pa-sec to 50 Pa-sec), at a temperature of 23° C. and a pressure of about 760 mm Hg (101 kPa) determined according to ASTM D-2849 § 79-90 using a Brookfield CAP 2000 viscometer.

Sulfur-containing prepolymers provided by the present disclosure include reactive functional groups suitable for a particular curing chemistry. For example, the sulfur-containing prepolymers may be thiol-, polyalkoxysilyl-, epoxy-, isocyanate-, epoxy-, vinyl ether-, or Michael acceptor-terminated.

Terminal-modified sulfur-containing prepolymers may be adapted for use with certain curing chemistries by modifying a thiol-terminated sulfur-containing prepolymer with suitable reactive functional groups. Examples of suitable reactive terminal groups include polyalkoxysilyl groups, epoxy groups, isocyanate groups, vinyl ether groups, and Michael acceptor groups, and such prepolymers are referred to as terminal-modified sulfur-containing prepolymers.

Terminal-modified sulfur-containing prepolymers may be prepared by reacting a thiol-terminated sulfur-containing prepolymer with a compound having a group that is reactive with a thiol group and a reactive group such as a polyalkoxysilyl group, an epoxy group, an isocyanate group, a vinyl ether group, or a Michael acceptor group.

Methods of preparing terminal-modified sulfur-containing polyformal prepolymers are disclosed, for example, in U.S. Application Publication Nos. 2012/0238707 and 2012/0234255, each of which is incorporated by reference in its entirety. The methods for synthesizing terminal-modified sulfur-containing polyformal prepolymers from a corresponding thiol-terminated, sulfur-containing polyformal prepolymer described in these applications can be adapted to prepare terminal-modified polythioethers, polysulfides, and other terminal-modified sulfur-containing prepolymer.

A terminal-modified sulfur-containing prepolymer can be derived from a sulfur-containing prepolymer having a backbone of Formula (8), Formula (9), Formula (13), or Formula (14). A terminal-modified sulfur-containing prepolymer can be derived from any of the thiol-terminated sulfur-containing prepolymers or combinations thereof disclosed herein.

The preparation of terminal-modified sulfur-containing polythioethers is known in the art. For example, isocyanate-terminated polythioethers are disclosed in U.S. Application Publication No. 2015/0252230, polyalkoxysilyl-terminated polythioethers are disclosed in U.S. Application Publication No. 2015/0252230, alkenyl-terminated polythioethers are disclosed in U.S. Application Publication No. 2006/0270796; and epoxy-terminated polythioethers are disclosed in U.S. Application Publication No. 2005/0010003, each of which is incorporated by reference in its entirety.

Compositions provided by the present disclosure may comprise one or more different types of filler. Suitable fillers include those commonly known in the art, including inorganic fillers, such as carbon black and calcium carbonate (CaCO$_3$), silica such as fumed silica, precipitated silica, and silica gel, polymer particles, and lightweight fillers. Suitable lightweight fillers include, for example, those described in U.S. Pat. No. 6,525,168.

Compositions of the present disclosure can comprise at least one inorganic filler in addition to the sulfur-containing polymeric particles provided by the present disclosure. An inorganic filler can be included to provide mechanical reinforcement and to control the rheological properties of the sealant composition. Inorganic fillers may be added to compositions to impart desirable physical properties such as, for example, to increase the impact strength, to control the viscosity, or to modify the electrical properties of a cured composition. Inorganic fillers useful in compositions provided by the present disclosure and useful for aviation and aerospace applications include carbon black, calcium carbonate, precipitated calcium carbonate, calcium hydroxide, hydrated alumina (aluminum hydroxide), fumed silica, silica, and combinations of any of the foregoing. Inorganic filler can comprise a combination precipitated calcium carbonate, hydrated alumina, fumed silica, calcium hydroxide, and carbon black. Inorganic filler can improve the tensile strength of a cured composition. Compositions provided by the present disclosure can comprise from 1 wt % to 25 wt % of an inorganic filler or combination of inorganic fillers, from 5 wt % to 20 wt %, from 10 wt % to 25 wt %, from 10 wt % to 20 wt %, or from 5 wt % to 15 wt %, where wt % is based on the total weight of the composition.

Sulfur-containing polymeric particles provided by the present disclosure can be used in compositions that comprise a high loading of sulfur-containing polymeric particles such as coating and sealant compositions having a low specific gravity. A low-density coating or sealant composition can have a low specific gravity, for example, less than 2.0, less than 1.8, less than 1.6, less than 1.4, or less than 1.2. A low-density sealant composition can be characterized by a specific gravity, for example, within a range from 1.0 to 2.0, within a range from 1.0 to 1.6, or within a range from 1.0 to 1.4, where the specific gravity is determined according to ASTM D792.

Sulfur-containing polymeric particles can be the only filler in a composition or can be combined with other filler particles. Inorganic filler is often added to a composition to enhance the tensile strength and elongation. Some or all of an inorganic filler can be replaced with sulfur-containing polymeric particles provided by the present disclosure with the benefit that the composition can have a lower density and maintain high tensile strength and % elongation.

Use of sulfur-containing polymeric particles can be particularly useful in compositions having a high filler content such as a filler content greater than 20 wt %. In such compositions, a higher filler content can be used to enhance the physical properties of the cured composition, or in the case of low density filler, can be used to provide low density cured compositions. Because sulfur-containing polymeric particles provided by the present disclosure have a density less than that of typical inorganic fillers, when used to replace some or all of the inorganic filler, the density of the cured composition can be reduced. Low-density sealant compositions such as sealant compositions having specific gravity less than 1 can have in addition to low density filler characterized, for example, by a specific gravity less than 0.9, a certain amount of inorganic filler such as, for example, from 5 wt % to 25 wt % of inorganic filler can be included in the composition to impart desired physical properties. In such compositions, all or some of the inorganic filler can be replaced with sulfur-containing polymeric particles provided by the present disclosure. The density of such low-density sealant compositions can thereby be further reduced without degrading the physical properties and solvent resistance of the cured composition.

Examples of sealant compositions having a high filler content include non-chromate corrosion inhibiting sealants such as disclosed in U.S. Application Publication No. 2017/014259, which is incorporated by reference in its entirety. Sulfur-containing polymeric particles provided by the present disclosure can be used in a composition comprising a thiol-terminated polythioether prepolymer, a polyepoxide curing agent, and a non-chromate corrosion inhibitor. In such compositions a polyepoxide curing agent can comprise an epoxy novolac resin, a bisphenol A/epichlorohydrin epoxy resin, or a combination thereof. In such compositions, a non-chromate corrosion inhibitor can comprise zinc borate, 2-benzothiazolylthiobutanedioic acid, zinc orthophosphate, sodium titanate, tricalcium phosphate, or a combination of any of the foregoing. In such compositions, a non-chromate corrosion inhibitor can comprise zinc borate, 2-benzothiazolylthiobutanedioic acid, zinc orthophosphate, sodium titanate, tricalcium phosphate. In such compositions, a non-chromate corrosion inhibitor can comprise from 2 wt % to 6 wt % of zinc borate; from 1 wt % to 5 wt % of 2-benzothiazolylthiobutanedioic acid; from 35 wt % to 70 wt % of zinc orthophosphate; from 20 wt % to 50 wt % of sodium titanate; and from 3 wt % to 8 wt % of tricalcium phosphate, where wt % is based on the total weight of the non-chromate corrosion inhibitor.

Sulfur-containing polymeric particles provided by the present disclosure may be used, for example, in compositions comprising a high loading of filler particles. For example, sulfur-containing polymeric particles may be used in compositions having a vol % loading of filler greater than 20 vol %, greater than 25 vol %, greater than 30 vol %, greater than 35 vol %, greater than 40 vol %, or greater than 45 vol % %, where vol % is based on the total volume of the composition. For example, sulfur-containing polymeric particles may be used in compositions having a vol % loading within a range from 20 vol % to 50 vol %, within a range from 20 vol % to 45 vol %, within a range from 25 vol % to 45 vol %, or within a range from 25 vol % to 40 vol %, where vol % is based on the total volume of the composition.

A composition comprising sulfur-containing polymeric particles provided by the present disclosure may also comprise inorganic filler particles such as silica, fumed silica, precipitated silica, silica gel, calcium carbonate, precipitated calcium carbonate, calcium hydroxide, hydrated alumina, or a combination of any of the foregoing.

A composition comprising sulfur-containing polymeric particles provided by the present disclosure may also comprise organic filler particles. Suitable organic fillers can comprise thermoplastics, thermosets, or a combination thereof. Examples of suitable organic fillers include epoxies, epoxy-amides, ETFE copolymers, polyethylenes, polypropylenes, polyvinylidene chlorides, polyvinylfluorides, TFE, polyamides, polyimides, ethylene propylenes, perfluorohydrocarbons, fluoroethylenes, polycarbonates, polyetheretherketones, polyetherketones, polyphenylene oxides, polyphenylene sulfides, polystyrenes, polyvinyl chlorides, melamines, polyesters, phenolics, epichlorohydrins, fluorinated hydrocarbons, polycyclics, polybutadienes, polychloroprenes, polyisoprenes, polysulfides, polyurethanes, isobutylene isoprenes, silicones, styrene butadienes, liquid crystal polymers, and combinations of any of the foregoing. Examples of suitable organic fillers include polyamides such as polyamide 6 and polyamide 12, polyimides, polyethylene, polyphenylene sulfides, and combinations of any of the foregoing.

Use of polyphenylene sulfide resin particles are disclosed, for example, in U.S. Pat. No. 9,422,451, which is incorporated by reference in its entirety.

An organic filler can include a low-density filler such as an expanded thermoplastic microcapsule and/or a modified expanded thermoplastic microcapsule. Suitable modified expanded thermoplastic microcapsules can include an exterior coating of a melamine or urea/formaldehyde resin.

A thermally expandable microcapsule refers to a hollow shell comprising a volatile material that expands at a predetermined temperature. Thermally expandable thermoplastic microcapsules can have a mean initial particle size of 5 μm to 70 μm, in some cases 10 μm to 24 m, or from 10 μm to 17 μm. The term "mean initial particle size" refers to the mean particle size (numerical weighted mean of the particle size distribution) of the microcapsules prior to any expansion. The particle size distribution can be determined using a Fischer Sub-Sieve Sizer or by optical inspection.

A thermally expandable thermoplastic microcapsule can comprise a volatile hydrocarbon or volatile halogenated hydrocarbon within a wall of a thermoplastic resin. Examples of hydrocarbons suitable for use in such microcapsules are include methyl chloride, methyl bromide, trichloroethane, dichloroethane, n-butane, n-heptane, n-propane, n-hexane, n-pentane, isobutane, isopentane, iso-octane, neopentane, petroleum ether, and aliphatic hydrocarbons containing fluorine, such as Freon™, and combinations of any of the foregoing.

Examples of suitable thermoplastic microcapsules include Expancel™ microcapsules such as Expancel™DE microspheres available from AkzoNobel. Examples of suitable Expancel™ DE microspheres include Expancel™ 920 DE 40 and Expancel™ 920 DE 80. Suitable low density microcapsules are also available from Kureha Corporation.

Low density microcapsules can be characterized by a specific gravity within a range from 0.01 to 0.09, from 0.04 to 0.09, within a range from 0.04 to 0.08, within a range from 0.01 to 0.07, within a range from 0.02 to 0.06, within a range from 0.03 to 0.05, within a range from 0.05 to 0.09, from 0.06 to 0.09, or within a range from 0.07 to 0.09, wherein the specific gravity is determined according to ISO 787 (Part 10). Low density microcapsules can be characterized by a specific gravity less than 0.1, less than 0.09, less than 0.08, less than 0.07, less than 0.06, less than 0.05, less than 0.04, less than 0.03, or less than 0.02, wherein the specific gravity is determined according to ISO 787 (Part 10).

Low-density microcapsules can be characterized by a mean particle diameter from 1 μm to 100 μm and can have a substantially spherical shape. Low-density microcapsules can be characterized, for example, by a mean particle diameter from 10 μm to 100 m, from 10 μm to 60 m, from 10 μm to 40 μm, or from 10 μm to 30 μm, as determined according to ASTN D422.

Low-density filler can comprise uncoated microcapsules, coated microcapsules, or combinations thereof.

Low-density filler such as low density microcapsules can comprise expanded microcapsules or microballoons having a coating of an aminoplast resin such as a melamine resin. Aminoplast resin-coated particles are described, for example, in U.S. Pat. No. 8,993,691, which is incorporated by reference in its entirety. Such microcapsules can be formed by heating a microcapsule comprising a blowing agent surrounded by a thermoplastic shell. Uncoated low-density microcapsules can be reacted with an aminoplast resin such as a urea/formaldehyde resin to provide a coating of a thermoset resin on the outer surface of the particle.

Low-density filler such as low density microcapsules can comprise thermally expandable thermoplastic microcapsules having an exterior coating of an aminoplast resin, such as a melamine resin. The coated low density microcapsules can have an exterior coating of a melamine resin, where the coating can have a thickness, for example, less than 2 μm, less than 1 μm, or less than 0.5 μm. The melamine coating on the light weight microcapsules is believed to render the microcapsules reactive with the thiol-terminated polythioether prepolymer and/or the polyepoxide curing agent, which can enhance the fuel resistance, and render the microcapsules resistant to pressure.

An aminoplast resin can comprise a melamine resin. Examples of suitable melamine resins include methylated melamine resins (hexamethoxymethylmelamine), mixed ether melamine resins, butylated melamine resins, urea resins, butylated urea resins, benzoguanamine and glycoluril resins, and formaldehyde free resins. Such resins are available, for example, from Allnex Group and Hexion. Examples of suitable melamine resins include methylated melamine resins such as Cymel™ 300, Cymel™ 301, Cymel™ 303LF, Cymel™ 303ULF, Cymel™ 304, Cymel™ 350, Cymel™ 3745, Cymel™ XW-3106, Cymel™ MM-100, Cymel™ 370, Cymel™ 373, Cymel™ 380, ASTRO MEL™601, ASTRO MEL™ 601ULF, ASTRO MEL™400, ASTRO MEL™ NVV-3A, Aricel PC-6A, ASTRO MEL™ CR-1, and ASTRO SET™ 90. A suitable aminoplast resin can comprise a urea-formaldehyde resin.

Suitable low-density filler particles are also disclosed, for example, in U.S. Pat. No. 8,993,691, and in U.S. application Ser. No. 15/420,138, filed on Jan. 31, 2017, entitled Low Density Aerospace Compositions and Sealants to Virnelson, each of which is incorporated in its entirety.

A composition may also include any number of additional additives as appropriate for a certain application. Examples of suitable additives include plasticizers, pigments, surfactants, adhesion promoters, thixotropic agents, fire retardants, masking agents, and accelerators (such as amines, including 1,4-diaza-bicyclo[2.2.2]octane, DABCO®), and combinations of any of the foregoing. When used, the additives may be present in a composition in an amount ranging, for example, from 0 wt % to 60 wt %. Additives may be present in a composition in an amount ranging from 25 wt % to 60 wt %.

Coatings and sealant formulations may be provided as a one-part or a two-part composition depending on the curing chemistry. For example, a one-part system may be appropriate for an ultraviolet (UV) curable system in which all components are combined and stored prior to use and subsequently activated upon exposure to UV. In other formulations, such as appropriate in thiol-epoxy curing chemistries, two-part systems may be used. In a two-part system a base component can contain a thiol-terminated sulfur-containing prepolymer and an accelerator component can include a polyepoxide curing agent. Either or both the base component and the accelerator component may include a plurality of sulfur-containing polymeric particles provided by the present disclosure.

For example, a base component can contain a sulfur-containing polymeric particles provided by the present disclosure. In addition to sulfur-containing polymeric fillers, a base component can contain other filler such as inorganic fillers including, for example, calcium carbonate, calcium hydroxide, and/or silica. In addition to the sulfur-containing prepolymer and sulfur-containing polymeric filler particles, the base component may also contain a suitable curing agent. In addition to a curing agent, the accelerator component may also contain one or more additional components such as catalysts, pigment, adhesion promoters, and plasticizers.

A coating or sealant formulation can contain, for example, from 75 wt % to 95 wt % of the base component, from 80 wt % to 90 wt % of the base component, or from 82 wt % to 88 wt % of the base component, where wt % is based on the total weight of the formulation.

A base component can contain, for example, from 50 wt % to 80 wt % of a sulfur-containing prepolymer, from 55 wt % to 75 wt %, or from 55 wt % to 70 wt % of a sulfur-containing prepolymer, where wt % is based on the total weight of the base component.

A base component can contain, for example, from 0.5 wt % to 50 wt % of sulfur-containing polymeric particles, from 0.5 wt % to 20 wt %, or from 0.5 wt % to 10 wt % of the sulfur-containing polymeric particles, where wt % is based on the total weight of the base component. In formulations in which the only filler in the base component is the sulfur-containing polymeric particles, the base components can contain, for example, from 0.5 wt % to 50 wt % of sulfur-containing polymeric particles, from 0.5 wt % to 20 wt %, or from 0.5 wt % to 10 wt % of the sulfur-containing polymeric particles, where wt % is based on the total weight of the base component.

A base component may contain sulfur-containing polymeric particles and an inorganic filler. In such formulations, the total amount of filler in the base component can range, for example, from 30 wt % to 45 wt %, from 35 wt % to 45 wt %, or from 35 wt % to 40 wt %. The wt % of sulfur-containing polymeric particles and inorganic filler can be about the same such as from 15 wt % to 20 wt %.

An accelerator component may or may not contain a filler. An accelerator component can contain, for example, from 0.5 wt % to 50 wt % of sulfur-containing polymeric particles or from 0.5 wt % to 10 wt % of sulfur-containing polymeric particles, where wt % is based on the total weight of the accelerator component.

When combined to provide a coating or sealant formulation, the formulation may comprise, for example, from 45 wt % to 70 wt % of a sulfur-containing prepolymer or from 50 wt % to 65 wt % of a sulfur-containing prepolymer, where wt % is based on the total weight of the formulation.

A formulation can contain, for example, from 1 wt % to 50 wt %, from 2 wt % to 40 wt %, from 2 wt % to 30 wt %, from 2 wt % to 20 wt %, from 5 wt % to 15 wt %, from 10 wt % to 15 wt %, from 25 wt % to 45 wt % filler, from 25 wt % to 35 wt %, or from 30 wt % to 40 wt % filler where wt % is based on the total weight of the formulation. The filler may be sulfur-containing polymeric filler particles or may be a combination of sulfur-containing polymeric filler particles and an inorganic filler such as calcium carbonate, calcium hydroxide, hydrated alumina, and/or silica. In addition to the sulfur-containing polymeric particles, a formulation may contain, for example, from 1 wt % to 30 wt % of an inorganic filler, from 5 wt % to 25 wt %, from 1 wt % to 10 wt %, from 1 wt % to 5 wt %, from 0 wt % to 10 wt %, or from 15 wt % to 25 wt % of an inorganic filler, where wt % is based on the total weight of the formulation. The inorganic filler may be a light weight filler characterized by a specific gravity less than 1.

Compositions and formulations provided by the present disclosure may include a suitable curing agent. The suitability of a particular curing agent can depend in part on the curing chemistry employed.

Compositions and sealants provided by the present disclosure can comprise a curing agent, i.e., crosslinking agent, comprising a compound reactive with thiol groups. Examples of suitable thiol-reactive curing agents include polyepoxides, Michael acceptors, and polyalkenyls. Suitable curing agents can comprise two or more groups reactive with thiol groups.

A suitable curing agent can comprise a polyepoxide curing agent or may comprise a polyalkenyl curing agent.

Compositions provided by the present disclosure can comprise a polyepoxide curing agent. A polyepoxide refers to a compound having two or more reactive epoxy groups. A polyepoxide may include a combination of polyepoxides. A polyepoxide can be liquid at room temperature (23° C.).

Examples of suitable polyepoxides include polyepoxides such as hydantoin diepoxide, diglycidyl ethers of bisphenol-A, diglycidyl ether of bisphenol-F, novolac type epoxides such as DEN™ 438 (phenol novolac polyepoxide comprising the reaction product of epichlorohydrin and phenol-formaldehyde novolac) and DEN™ 431 (phenol novolac polyepoxide comprising the reaction product of epichlorohydrin and phenol-formaldehyde novolac), available from Dow Chemical Co., certain epoxidized unsaturated, and combinations of any of the foregoing.

A polyepoxide curing agent can comprise a phenol novolac polyepoxide such as DEN® 431, a bisphenol A/epichlorohydrin derived polyepoxide such as EPON® 828, or a combination thereof. A polyepoxide curing agent can comprise a combination of a phenol novolac polyepoxide and a bisphenol A/epichlorohydrin derived polyepoxide (a bisphenol A type polyepoxide).

Other examples of suitable polyepoxide curing agents include bisphenol A type polyepoxides, brominated bisphenol A type polyepoxides, bisphenol F type polyepoxides, biphenyl type polyepoxides, novolac type polyepoxides, an alicyclic polyepoxides, naphthalene type polyepoxides, ether series or polyether series polyepoxides, oxirane ring-containing polybutadienes, silicone polyepoxide copolymers, and a combination of any of the foregoing.

Additional examples of suitable bisphenol A/epichlorohydrin derived polyepoxide include a bisphenol A type polyepoxide having a weight average molecular weight of 400 or less; a branched polyfunctional bisphenol A type polyepoxide such as p-glycidyloxyphenyl dimethyltolyl bisphenol A diglycidyl ether, a bisphenol F type polyepoxide; a phenol novolac type polyepoxide having a weight average molecular weight of 570 or less, an alicyclic polyepoxide such as vinyl(3,4-cyclohexene)dioxide, methyl 3,4-epoxycyclohexylcarboxylate(3,4-epoxycyclohexyl), bis(3,4-epoxy-6-methylcyclohexylmethyl) adipate and 2-(3,4-epoxycyclohexyl)-5,1-spiro(3,4-epoxycyclohexyl)-m-dioxane, a biphenyl type epoxy such as 3,3',5,5'-tetrametramethyl-4,4'-diglycidyloxybiphenyl; a glycidyl ester type epoxy such as diglycidyl hexahydrophthalate, diglycidyl 3-methylhexahydrophthalate and diglycidyl hexahydroterephthalate; a glycidylanmine type polyepoxide such as diglycidylaniline, diglycidyltoluidine, triglycidyl-p-aminophenol, tetraglycidyl-m-xylene diamine, tetraglycidylbis(aminomethyl)cyclohexane; a hydantoin type polyepoxide such as 1,3-diglycidyl-5-methyl-5-ethylhydantoin; and a naphthalene ring-containing polyepoxide. Also, a polyepoxide having silicone such as 1,3-bis(3-glycidoxy-propyl)-1,1,3,3-tetramethydisiloxane may be used. Other examples of suitable polyepoxides include (poly)ethylene glycol diglycidyl ether, (poly)propylene glycol diglycidyl ether, butanediol diglycidyl ether and neopentyl glycol diglycidyl ether; and tri-epoxides such as trimethylolpropane triglycidyl ether and glycerin triglycidyl ether.

Examples of commercially available polyepoxides suitable for use in compositions provided by the present disclosure include polyglycidyl derivatives of phenolic compounds, such as those available under the trade names Epon® 828, Epon® 1001, Epon® 1009, and Epon® 1031, from Resolution Performance Products LLC; and DER® 331, DER® 332, DER® 334, and DER® 542 from Dow Chemical Co. Other suitable polyepoxides include polyepoxides prepared from polyols and the like and polyglycidyl derivatives of phenol-formaldehyde novolacs, the latter of which are commercially available under the trade names DEN®431, DEN® 438, and DEN® 439 from Dow Chemical Company. Cresol analogs are also available commercially ECN® 1235, ECN® 1273, and ECN® 1299 from Ciba Specialty Chemicals, Inc. SU-8 is a bisphenol A-type polyepoxide novolac available from Resolution Performance Products LLC. Polyglycidyl adducts of amines, anminoalcohols and polycarboxylic acids are also useful polyepoxides, including Glyamine® 135, Glyamine® 125, and Glyamine® 115 from F.I.C. Corporation; Araldite® MY-720, Araldite® MY-721, Araldite® 0500, and Araldite® 0510 from Ciba Specialty Chemicals.

A polyepoxide curing agent can comprise an epoxy-functional prepolymer. Examples of suitable epoxy-functional prepolymers include the epoxy-functional sulfur-containing polyformal prepolymers disclosed in U.S. Application Publication No. 2012/0238707 and epoxy-functional polythioether prepolymers disclosed in U.S. Pat. No. 7,671,145. In general, when used as a curing agent, an epoxy-functional prepolymer can have a molecular weight less than 2,000 Daltons, less than 1,500 Daltons, less than 1,000 Daltons, or less than 500 Daltons. Epoxy-functional sulfur-containing prepolymers may be formed, for example, by reacting a thiol-functional sulfur-containing prepolymer with a diepoxide or with an epoxy olefin.

In such compositions, a composition can comprise, for example, from 0.5 wt % to 20 wt % of a polyepoxide curing agent, from 1 wt % to 10 wt %, from 2 wt % to 8 wt %, from 2 wt % to 6 wt %, or from 3 wt % to 5 wt %, where wt % is based on the total weight of the composition.

Thiol-terminated polythioethers or combinations of thiol-terminated polythioethers can be reacted with an alkenyl-terminated compound or mixture of alkenyl-terminated compounds in the presence of a UV-initiated free radical catalyst to provide a cured, cross-linked polymer. Polythioether sealant compositions curable by actinic radiation such as UV radiation are described in U.S. Application Publication No. 2012/0040104, which is incorporated by reference in its entirety. Using H-bulb UV or LED UV light sources at a dosage, for example, from 500 mJ to 1,500 mJ, such compositions having a thickness up to several inches can be cured in less than 2 minutes.

UV curable sealant compositions may also include cross-linkers such as divinyl ethers including, for example, triethylene glycol divinyl ether. A crosslinker may comprise a difunctional compound, a trifunctional compound, or a combination thereof. A trifunctional crosslinker may be prepared by reacting a divinyl ether with a trifunctionalizing agent such as TAC. A crosslinker can comprise a combination of difunctional and trifunctional crosslinkers in a ratio of 80/20 (wt %/wt %) or from 90/10 (wt %/wt %). In certain of such embodiments, the difunctional crosslinker is divinyl ether and the trifunctional crosslinker comprises the reaction product of divinyl ether and TAC.

UV-curable sealants can also include a photoinitiator that is matched to UV radiation source. In general, it is desirable to use a radiation source having a longer wavelength, such as, for example, from 280 nm to 290 nm to give a better depth of cure. In general, it can be desirable to cure a UV-curable sealant in less than 30 seconds. A UV-curable composition may comprise a photoinitiator. A photoinitiator absorbs ultraviolet radiation and is transformed into a radical that initiates polymerization. Any suitable photoinitiator may be used.

Compositions provided by the present disclosure may include one or more suitable catalysts. A catalyst can be selected as appropriate for the curing chemistry employed. For example, when curing thiol-terminated sulfur-containing prepolymer and polyepoxides, the catalyst can be an amine catalyst. A cure catalyst may be present, for example, in an amount from 0.1 wt % to 5 wt %, based on the total weight of the composition. Examples of suitable amine catalysts include 1,4-diazabicyclo[2.2.2]octane (DABCO®, commercially available from Air Products) and DMP-30® (an accelerant composition including 2,4,6-tris(dimethylaminomethyl)phenol. Other examples of suitable amine catalysts include, dimethylcyclohexylamine (DMCHA), dimethylethanolamine (DMEA), bis-(2-dimethylaminoethyl) ether, N-ethylmorpholine, triethylamine, 1,8-diazabicyclo [5.4.0]undecene-7 (DBU), pentamethyldiethylenetriamine (PMDETA), benzyldimethylamine (BDMA), N,N,N'-trimethyl-N'-hydroxyethyl-bis(aminoethyl)ether, and N'-(3-(dimethylamino)propyl)-N,N-dimethyl-1,3-propanediamine.

Compositions provided by the present disclosure may comprise one or more additional components suitable for use in aerospace sealants and the selection of suitable additional components can depend at least in part on the desired performance characteristics of the cured sealant under conditions of use.

A composition provided by the present disclosure can comprise an ethylenically unsaturated silane, such as, for example, a sulfur-containing ethylenically unsaturated silane, which can improve the adhesion of a cured sealant to a metal substrate. As used herein, the term sulfur-containing ethylenically unsaturated silane refers to a molecular compound that comprises, within the molecule, (i) at least one sulfur (S) atom, (ii) at least one, in some cases at least two, ethylenically unsaturated carbon-carbon bonds, such as a carbon-carbon double bonds (C=C); and (iii) at least one silane group, $-Si(-R)_m(-OR)_{3-m}$, where each R independently comprises hydrogen, alkyl, cycloalkyl, or aryl, and m is 0, 1, or 2. Examples of ethylenically unsaturated silanes are disclosed in U.S. Application Publication No. 2012/0040104, which is incorporated by reference in its entirety.

Compositions provided by the present disclosure can comprise an adhesion promoter or combination of adhesion promoters. An adhesion promoter can include a phenolic resin, a combination of phenolic resins, an organo-functional silane, a combination of organo-functional silanes, or a combination of any of the foregoing. An organosilane can be an amine-functional silane. A one or more additional adhesion promoter may be present, for example, in amount from 0.1 wt % to 15 wt % of a composition, less than 5 wt %, less than 2 wt %, or less than 1 wt %, based on the total weight of the composition. Examples of adhesion promoters include phenolics, such as Methylon® phenolic resin, and organosilanes, such as epoxy-, mercapto- or amino-functional silanes, such as Silquest® A-187 and Silquest® A-1100. Other useful adhesion promoters are known in the art. An adhesion promoter can include a phenolic resin adhesion promoter such as T-1601, available from PRC-DeSoto International. Suitable adhesion promoters are available, for example, from Gelest and from Momentive.

Compositions and sealants provided by the present disclosure may also contain an adhesion promoter such as sulfur-containing adhesion promoter. Useful sulfur-containing adhesion promoters are disclosed in U.S. Pat. No. 8,513,339. Such adhesion promoters comprise the reaction product of a sulfur-containing compound such as DMDO and a trifunctionalizing agent such as TAC and having at least some terminal thiol groups and some terminal mercaptosilane groups.

Compositions and sealants provided by the present disclosure can comprise a phenolic resin, an organosilane, or a combination thereof. A phenolic resin can comprise a cooked phenolic resin, an un-cooked phenolic resin, or a combination thereof. Examples of suitable adhesion promoters include phenolic resins such as Methylon® phenolic resin, and organosilanes, such as epoxy-, mercapto- or amine-functional silanes, such as Silquest® organosilanes. Suitable phenolic resins include cooked phenolic resins.

Uncured sealant compositions provided by the present disclosure can be formulated as suitable for a particular aerospace sealant application. For example, sealant compositions can be formulated as Class A, Class B, or as Class C fuel resistant aerospace sealants.

A Class A sealant can be formulated for use at service temperatures from −65° F. (−54° C.) to 250° F. (121° C.) with intermittent excursions to 275° F. (135° F.). A Class A sealant is intended to be applied by brushing and can be used, for example, for as brush sealing fasteners in fuel tanks and other aircraft fuselage sealing applications. A Class A sealant can have an initial viscosity from 1 poise to 500 poise 0.1 Pa-sec to 50 Pa-sec).

A Class B sealant can be formulated for use at service temperatures from −65° F. to 250° F. (−54° C. to 121° C.) and is intended for fillet sealing and other aircraft fuselage sealing applications. A Class B sealant can have an initial viscosity from 4,500 poise to 20,000 poise (450 Pa-sec to 1,000 Pa-sec). A Class B sealant can be applied by extrusion, injection gun, or spatula.

A Class C sealant can be formulated for use at service temperatures from −65° F. to 250° F. (−54° C. to 121° C.) and is intended for brush and fay sealing of fuel tanks and other aircraft fuselage sealing applications. A Class C sealant can have an initial viscosity from 500 poise to 4,500 poise (50 Pa-sec to 450 Pa-sec). A Class C sealant can be applied by brush, roller, spatula, or extrusion.

Compositions provided by the present disclosure may be used, for example, in sealants, coatings, encapsulants, and potting compositions. A sealant includes a composition capable of producing a film that has the ability to resist operational conditions, such as moisture and temperature, and at least partially block the transmission of materials, such as water, fuel, and other liquid and gases. A coating composition includes a covering that is applied to the surface of a substrate to, for example, improve the properties of the substrate such as the appearance, adhesion, wettability, corrosion resistance, wear resistance, fuel resistance, and/or abrasion resistance. A potting composition includes a material useful in an electronic assembly to provide resistance to shock and vibration and to exclude moisture and corrosive agents. Sealant compositions provided by the present disclosure can be useful, e.g., as aerospace sealants including as linings for fuel tanks.

Compositions containing thiol-terminated polythioether prepolymers can be formulated as sealants.

Compositions, such as sealants, may be provided as multi-pack compositions, such as two-pack compositions, wherein one package comprises one or more thiol-terminated sulfur-containing prepolymers provided by the present disclosure and a second package comprises one or more polyepoxide curing agents. Additives and/or other materials may be added to either package as desired or necessary. The two packages may be combined and mixed prior to use.

The pot life of the one or more mixed thiol-terminated sulfur-containing prepolymers and polyepoxides can be at least 30 minutes, at least 1 hour, at least 2 hours, or more than 2 hours, where pot life refers to the period of time the mixed composition remains suitable for use as a sealant after mixing.

Compositions, including sealants, provided by the present disclosure may be applied to any of a variety of substrates. Examples of substrates to which a composition may be applied include metals such as titanium, stainless steel, and aluminum, any of which may be anodized, primed, organic-coated or chromate-coated; epoxy; urethane; graphite; fiberglass composite; Kevlar®; acrylics; and polycarbonates. The substrate may be cleaned and/or treated with a primer such as a corrosion resistant primer or with an adhesion promoting composition prior to application of the sealant.

Compositions provided by the present disclosure may be applied to a coating on a substrate, such as a polyurethane coating.

Compositions provided by the present disclosure may be applied directly onto the surface of a substrate or over an underlayer by any suitable coating process.

Furthermore, methods are provided for sealing aperture surface utilizing a composition provided by the present disclosure. These methods comprise, for example, applying a sealant provided by the present disclosure to a surface to seal a surface, and curing the sealant. A method for sealing a surface can comprise applying a sealant composition provided by the present disclosure to surfaces defining a surface and curing the sealant, to provide a sealed surface.

A composition may be cured under ambient conditions, where an ambient condition refers to a temperature from 20° C. to 25° C., and atmospheric humidity. A composition may be cured under conditions encompassing a temperature from a 0° C. to 100° C. and humidity from 0% relative humidity to 100% relative humidity. A composition may be cured at a higher temperature such as at least 30° C., at least 40° C., or, at least 50° C. A composition may be cured at room temperature, e.g., 25° C. A composition may be cured upon exposure to actinic radiation, such as ultraviolet radiation.

A sealant achieves a tack-free cure in less than 2 hours, less than 4 hours, less than 6 hours, less than 8 hours, or less than 10 hours, at a temperature of less than 200° F. (93° C.).

The time to form a viable seal using curable compositions of the present disclosure can depend on several factors as can be appreciated by those skilled in the art, and as defined by the requirements of applicable standards and specifications. In general, curable compositions of the present disclosure develop adhesion strength within 24 hours to 30 hours, and 90% of full adhesion strength develops from 2 days to 3 days, following mixing and application to a surface. In general, full adhesion strength as well as other properties of cured sealants of the present disclosure becomes fully developed within 7 days following mixing and application of a curable composition to a surface.

Curable compositions provided by the present disclosure can be used as sealants, and in particular, as sealants where low temperature flexibility and resistance to fuel are desirable attributes. For example, curable compositions can be used as aviation and aerospace sealants. A sealant refers to a curable composition that has the ability when cured to resist atmospheric conditions such as moisture and temperature and at least partially block the transmission of materials such as water, water vapor, fuel, solvents, and/or liquids and gases.

Curing a composition provided by the present disclosure can include the application of external energy such as thermal energy or ultraviolet radiation, or a composition can cure at ambient temperature and humidity.

Compositions provided by the present disclosure can have a working time greater than 12 hours, and can cure to a Shore A hardness of 25A in from 150 hours to 250 hours, where hardness is determined according to ASTM D2240.

A thickness of an applied composition can range, for example, from 20 mils (0.02 inches) to 0.75 inches (0.05 cm to 1.9 cm), from 0.05 inches to 0.6 inches (0.13 cm to 1.54 cm), from 0.1 inches to 0.5 inches (0.25 cm to 1.3 cm), from 0.15 inches to 0.4 inches (0.38 cm to 1.02 cm), or from 0.2 inches to 0.3 inches (0.51 cm to 0.76 cm).

Compositions containing a thiol-terminated sulfur-containing prepolymer provided by the present disclosure and an polyepoxide curing agent can cure, for example, in from 0.5 hours to 3 hours, from 1 hour to 2.5 hours, or from 1 hour to 2 hours, where time to cure refers the time after mixing the prepolymer and curing agent to the time at which the composition exhibits a hardness Shore 30A. The curing time to exhibit a hardness Shore 30A can range, for example, from 1 hour to 4 hours, from 1.5 hour to 3.5 hour, or from 2 hours to 3 hours. Shore A hardness is determined according to ASTM D2240.

Cured compositions provided by the present disclosure, such as cured sealants, exhibit properties acceptable for use in aerospace sealant applications. In general, it is desirable that sealants used in aviation and aerospace applications exhibit the following properties: peel strength greater than 20 pounds per linear inch (pli) determined according to AS 5127 § 7.4/7.5 in Aerospace Material Specification (AMS) 3265B substrates determined under dry conditions, following immersion in JRF Type I for 7 days, and following immersion in a solution of 3% NaCl according to AMS 3265B test specifications; tensile strength between 300 pounds per square inch (psi) and 400 psi (2.06 MPa to 2.76 MPa); tear strength greater than 50 pounds per linear inch (pli) (8.75 N/mm); elongation between 250% and 300%; and hardness greater than 40 Durometer A. Tensile strength and % elongation are determined according to ASTM D412, tear strength according to AS 5127 § 8, and hardness is determined according to ASTM D2240. These and other cured sealant properties appropriate for aviation and aerospace applications are disclosed in AMS 3265B, the entirety of which is incorporated by reference. It is also desirable that, when cured, compositions of the present disclosure used in aviation and aircraft applications exhibit a percent volume swell not greater than 25% following immersion for one week at 140° F. (60° C.) and ambient pressure in Jet Reference Fluid (JRF) Type I. Other properties, ranges, and/or thresholds may be appropriate for other sealant applications. Percent volume swell is determined according to AS 5127 § 7.4/7.5.

Cured compositions provided by the present disclosure can be fuel-resistant. The term "fuel resistant" means that a composition, when applied to a substrate and cured, can provide a cured product, such as a sealant, that exhibits a percent volume swell of not greater than 40%, in some cases not greater than 25%, in some cases not greater than 20%, and in other cases not more than 10%, after immersion for one week at 140° F. (60° C.) and ambient pressure in JRF Type I according to methods similar to those described in ASTM D792 (American Society for Testing and Materials) or AMS 3269 (Aerospace Material Specification). JRF Type I, as employed for determination of fuel resistance, has the following composition: toluene: 28±1% by volume; cyclohexane (technical): 34±1% by volume; isooctane: 38±1% by volume; and tertiary dibutyl disulfide: 1±0.005% by volume (see AMS 2629, issued Jul. 1, 1989, § 3.1.1 etc., available from SAE (Society of Automotive Engineers)).

Compositions provided by the present disclosure can provide a cured product, such as a sealant, exhibiting a tensile elongation of at least 200% and a tensile strength of at least 200 psi (1.38 MPa) when measured in accordance with the procedure described in ASTM D412. In general, for a Class A sealant there is no tensile and elongation requirement. For a Class B sealant, as a general requirement, tensile strength is equal to or greater than 200 psi (1.38 MPa) and elongation is equal to or greater than 200%, determined according to ASTM D412. Acceptable elongation and tensile strength can be different depending on the application.

Compositions provide a cured product, such as a sealant, that exhibits a lap shear strength of greater than 200 psi (1.38 MPa), such as at least 220 psi (1.53 MPa), at least 250 psi (1.72 MPa), and, in some cases, at least 400 psi (2.76 MPa), when measured according to the procedure described in AS 5127 § 8.

A cured sealant prepared from a composition provided by the present disclosure can meet or exceed the requirements for aerospace sealants as set forth in AMS 3277.

Apertures, surfaces, joints, fillets, fay surfaces including apertures, surfaces, fillets, joints, and fay surfaces of aerospace vehicles, sealed with compositions provided by the present disclosure are also disclosed. For example, compositions comprising a sulfur-containing polymeric particles may be used to seal a surface of a part.

Cured sealants comprising sulfur-containing polymeric particles provided by the present disclosure can exhibit increased peel strength without decreasing the tensile strength, % elongation or % swell compared to a sealant without the sulfur-containing polymeric particles.

Aspects of the Invention

Aspect 1. A sulfur-containing polymeric particle characterized by: a density less than 2 g/cm$^3$, wherein density is determined according to ISO 787 (Part 10); a mean particle diameter no more than 10 µm, wherein number mean particle diameter is determined according to ASTM D422; a sulfur content greater than 5 wt %, wherein wt % is based on the total weight of the sulfur-containing polymeric particle; and a glass transition temperature less than −20° C., wherein glass transition temperature is determined using dynamic mechanical analysis according to ASTM D7028.

Aspect 2. The sulfur-containing polymeric particle of aspect 1, wherein the density is less than 1.5 g/cm$^3$, and the sulfur content is greater than 10 wt %.

Aspect 3. The sulfur-containing polymeric particle of any one of aspects 1 to 2, wherein the mean particle diameter is within a range from 2 µm to 10 µm.

Aspect 4. The sulfur-containing polymeric particle of any one of aspects 1 to 3, wherein the mean particle diameter is less than 20 µm, less than 15 µm, less than 10 µm, or less than 5 µm.

Aspect 5. The sulfur-containing polymeric particle of any one of aspects 1 to 4, wherein the density is 1.5 g/cm$^3$ or less.

Aspect 6. The sulfur-containing polymeric particle of any one of aspects 1 to 5, wherein the sulfur content is 15 wt % or greater.

Aspect 7. The sulfur-containing polymeric particle of any one of aspects 1 to 6, wherein the glass transition temperature $T_g$ is −30° C. or less.

Aspect 8. The sulfur-containing polymeric particle of any one of aspects 1 to 7, wherein the sulfur-containing polymeric particle is solid.

Aspect 9. The sulfur-containing polymeric particle of any one of aspects 1 to 8, wherein the sulfur-containing polymeric particle is prepared by emulsion polymerization.

Aspect 10. The sulfur-containing polymeric particle of any one of aspects 1 to 9, wherein an exterior surface of the sulfur-containing polymeric particle comprises reactive thiol groups, reactive alkenyl groups, or a combination thereof.

Aspect 11. A sulfur-containing polymeric particle comprising reaction products of reactants of an emulsion polymerization reaction, wherein the reactants comprise: a polythiol; and a polyalkenyl compound.

Aspect 12. The sulfur-containing polymeric particle of aspect 11, wherein the density is less than 1.5 g/cm$^3$, and the sulfur content is greater than 10 wt %.

Aspect 13. The sulfur-containing polymeric particle of any one of aspects 11 to 12, wherein the mean particle diameter is within a range from 2 μm to 10 μm.

Aspect 14. The sulfur-containing polymeric particle of any one of aspects 11 to 13, wherein the mean particle diameter is less than 20 μm, less than 15 μm, less than 10 μm, or less than 5 m.

Aspect 15. The sulfur-containing polymeric particle of any one of aspects 11 to 14, wherein the density is 1.5 g/cm$^3$ or less.

Aspect 16. The sulfur-containing polymeric particle of any one of aspects 11 to 15, wherein the sulfur content is 15 wt % or greater.

Aspect 17. The sulfur-containing polymeric particle of any one of aspects 11 to 16, wherein the glass transition temperature $T_g$ is −30° C. or less.

Aspect 18. The sulfur-containing polymeric particle of any one of aspects 11 to 17, wherein the sulfur-containing polymeric particle is solid.

Aspect 19. The sulfur-containing polymeric particle of any one of aspects 11 to 18, wherein the sulfur-containing polymeric particle is prepared by emulsion polymerization.

Aspect 20. The sulfur-containing polymeric particle of any one of aspects 11 to 19, wherein an exterior surface of the sulfur-containing polymeric particle comprises reactive thiol groups, reactive alkenyl groups, or a combination thereof.

Aspect 21. The sulfur-containing polymeric particle of any one of aspects 11 to 20, wherein the reactants comprise a ratio of thiol groups to alkenyl groups from 0.9:1 to 1.1:1.

Aspect 22. The sulfur-containing polymeric particle of any one of aspects 11 to 21, wherein, the polythiol is characterized by a molecular weight within a range from 400 Daltons to 2,000 Daltons; and the polyalkenyl compound is characterized by a weight average molecular weight within a range from 400 Daltons to 2,000 Daltons.

Aspect 23. The sulfur-containing polymeric particle of any one of aspects 11 to 22, wherein the sulfur-containing polymeric particle is characterized by density within a range from 1.1 g/cm$^3$ to 1.9 g/cm$^3$.

Aspect 24. The sulfur-containing polymeric particle of any one of aspects 11 to 23, wherein the polythiol comprises pentaerythritol tetrakis(3-mercapto-propionate) (PETMP), trimethylol-propane tri(3-mercaptopropionate) (TMPMP), glycol di(3-mercaptopropionate) (GDMP), tris[2-(3-mercapto-propionyloxy)ethyl]isocyanurate (TEMPIC), di-pentaerythritol hexa(3-mercaptopropionate) (di-PETMP), dimercaptodiethylsulfide (DMDS), or a combination of any of the foregoing.

Aspect 25. The sulfur-containing polymeric particle of any one of aspects 11 to 24, wherein the polythiol comprises a trifunctional polythiol, a tetrafunctional polythiol, or a combination thereof; and the polyalkenyl compound comprises a divinyl ether, a sulfur-containing di(alkenyl) ether, or a combination thereof.

Aspect 26. The sulfur-containing polymeric particle of any one of aspects 11 to 25, wherein the polythiol comprises:
a polythiol of Formula (1):

wherein,
each $R^1$ is selected from $C_{2-10}$ alkanediyl, $C_{6-8}$ cycloalkanediyl, $C_{6-10}$ alkanecycloalkanediyl, $C_{5-8}$ heterocycloalkanediyl, and $-[(CHR^3)_p-X]_q-(CHR^3)_r-$, wherein:
each p is independently an integer from 2 to 6;
q is an integer from 1 to 5;
r is an integer from 2 to 10;
each $R^3$ is independently selected from hydrogen and methyl; and
each X is independently selected from O, S, S—S, and NR, wherein R is selected from hydrogen and methyl;
a polythiol of Formula (2):

wherein,
B represents a core of a z-valent polyfunctionalizing agent $B(-V)_z$;
z is an integer from 3 to 6; and
each —V is a moiety comprising terminal thiol group; or
a combination of a polythiol of Formula (1) and a polythiol of Formula (2).

Aspect 27. The sulfur-containing polymeric particle of any one of aspects 11 to 26, wherein the polyalkenyl compound comprises:
a divinyl ether of Formula (3):

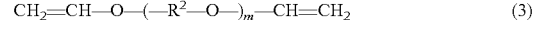

wherein,
m is an integer from 0 to 50; and
each $R^2$ is independently selected from $C_{2-6}$ n-alkanediyl, $C_{3-6}$ branched alkanediyl, $C_{6-8}$ cycloalkanediyl, $C_{6-10}$ alkanecycloalkanediyl, and $-[(CH_2)-X]_q-(CH_2)_r$, wherein,
each p is independently an integer ranging from 2 to 6;
q is an integer from 1 to 5;
r is an integer from 2 to 10;
each X is independently selected from 0, and S,
a polyalkenyl compound of Formula (2a):

wherein,
B represents a core of a z-valent polyfunctionalizing agent $B(-V)_z$;
z is an integer from 3 to 6; and
each —V is a moiety comprising a terminal alkenyl group; or
a combination of a polyalkenyl of Formula (2) and a polyalkenyl of Formula (2a).

Aspect 28. The sulfur-containing polymeric particle of any one of aspects 11 to 27, wherein the polyalkenyl compound comprises:
a sulfur-containing bis(alkenyl) ether of Formula (4):

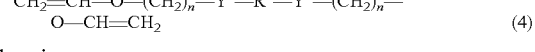

wherein,
each n is independently an integer from 1 to 6;
each $Y^1$ is independently selected form O and S; and
$R^4$ is selected from $C_{2-6}$ n-alkanediyl, $C_{3-6}$ branched alkanediyl, $C_{6-8}$ cycloalkanediyl, $C_{6-10}$ alkanecycloalkanediyl, and $-[(CH_2)_p-X]_q-(CH_2)_r$, wherein,
each X is independently selected from O, S, and S—S;
p is an integer from 2 to 6;
q is an integer from 1 to 5; and
r is an integer from 2 to 6; and
at least one $Y^1$ is S, or $R^4$ is $-[(CH_2)_p-X]_q-(CH_2)_r-$ and at least one X is S or S—S;
a sulfur-containing multifunctional(alkenyl) ether of Formula (7):

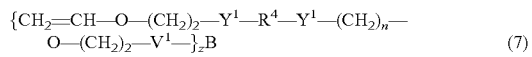

$$\{CH_2=CH-O-(CH_2)_2-Y^1-R^4-Y^1-(CH_2)_n- \\ O-(CH_2)_2-V^1-\}_z B \quad (7)$$

wherein, n, $Y^1$, and $R^4$ are defined as in Formula (4);

B represents a core of a z-valent polyfunctionalizing agent $B(-V)_z$, wherein, z is an integer from 3 to 6; and each —V is a moiety comprising terminal group reactive with an alkenyl group; and $V^1$ is derived from the reaction of —V with an alkenyl group; or a combination of a sulfur-containing bis(alkenyl) ether of Formula (4) and a sulfur-containing multifunctional(alkenyl) ether of Formula (7).

Aspect 29. The sulfur-containing polymeric particle of any one of aspects 11 to 28, wherein the emulsion polymerization reaction is carried out in an emulsion comprising a stabilizer, wherein the stabilizer comprises polyvinyl alcohol, a urea-modified polyurethane, or a combination thereof.

Aspect 30. The sulfur-containing polymeric particle of any one of aspects 11 to 29, wherein the emulsion comprises an initiator, wherein the initiator comprises a ferrous salt.

Aspect 31. The sulfur-containing polymeric particle of any one of aspects 11 to 30, wherein the reactants comprise pentaerythritol tetrakis(3-mercapto-propionate) and di(ethylene glycol divinyl ether).

Aspect 32. A composition comprising: a plurality of the sulfur-containing polymeric particles of any one of aspects 1 to 31; and a sulfur-containing prepolymer.

Aspect 33. The composition of aspect 30, wherein the composition is characterized by a specific gravity less than 2, wherein the specific gravity is determined according to ASTM D792.

Aspect 34. The composition of any one of aspects 32 to 33, wherein the composition comprises from 1 wt % to 10 wt % of the plurality of sulfur-containing polymeric particles, wherein wt % is based on the total weight of the composition.

Aspect 35. The composition of any one of aspects 32 to 33, wherein the composition comprises less than 10 wt %, less than 5 wt %, less than 2 wt %, or less than 1 wt % of the plurality of sulfur-containing polymeric particles, wherein wt % is based on the total weight of the composition.

Aspect 36. The composition of any one of aspects 32 to 33, wherein the composition comprises from 0.1 wt % to 2 wt %, from 0.1 wt % to 1.5 wt %, from 0.1 wt % to 1 wt %, from 0.1 wt % to 0.6 wt % or from 0.1 wt % to 0.3 wt % of the plurality of sulfur-containing polymeric particles, wherein wt % is based on the total weight of the composition.

Aspect 37. The composition of any one of aspects 32 to 36, wherein the composition comprises and inorganic filler Aspect 38. The composition of any one of aspects 32 to 36, wherein the sulfur-containing prepolymer comprises a thiol-terminated sulfur-containing prepolymer, an alkenyl-terminated sulfur-containing prepolymer, or a combination thereof.

Aspect 39. The composition of aspects 32 to 38, wherein the sulfur-containing prepolymer comprises a thiol-terminated sulfur-containing prepolymer.

Aspect 40. The composition of aspect 39, wherein the thiol-terminated sulfur-containing prepolymer comprises a thiol-terminated polythioether prepolymer.

Aspect 41. The composition of any one of aspects 32 to 40, wherein the sulfur-containing prepolymer comprises a thiol-terminated sulfur-containing prepolymer, wherein the thiol-terminated sulfur-containing prepolymer comprises a thiol-terminated polythioether prepolymer, a thiol-terminated polysulfide prepolymer, a thiol-terminated sulfur-containing polyformal prepolymer, a thiol-terminated monosulfide prepolymer, or a combination of any of the foregoing.

Aspect 42. The composition of any one of aspects 32 to 41, wherein the sulfur-containing prepolymer comprises a thiol-terminated polythioether prepolymer comprising at least one moiety having the structure of Formula (8):

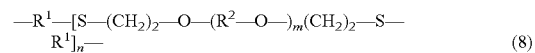

$$-R^1-[S-(CH_2)_2-O-(R^2-O-)_m(CH_2)_2-S- \\ R^1]_n- \quad (8)$$

wherein, each $R^1$ is independently selected from $C_{2-10}$ n-alkanediyl, $C_{3-6}$ branched alkanediyl, $C_{6-8}$ cycloalkanediyl, $C_{6-10}$ alkanecycloalkanediyl, and —[—$(CHR^3)_p$—X—$]_q$—$(CHR^3)_r$, wherein each $R^3$ is selected from hydrogen and methyl;

each $R^2$ is selected from $C_{2-10}$ n-alkanediyl, $C_{3-6}$ branched alkanediyl, $C_{6-8}$ cycloalkanediyl, $C_{6-14}$ alkanecycloalkanediyl, and —[—$(CH_2)$—X—$]_q$—$(CH_2)_r$; and each X is independently selected from O, S, and —NR—, wherein R is selected from hydrogen and methyl;

m is an integer from 0 to 50;

n is an integer from 1 to 60;

p is an integer from 2 to 6;

q is an integer from 1 to 5; and r is an integer from 2 to 10.

Aspect 43. The composition of any one of aspects 38 to 42, wherein the thiol-terminated sulfur-containing prepolymer comprises a thiol-terminated polythioether prepolymer of Formula (8a), a thiol-terminated polythioether prepolymer of Formula (8b), a thiol-terminated polythioether of Formula (8c), or a combination of any of the foregoing:

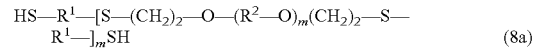

$$HS-R^1-[S-(CH_2)_2-O-(R^2-O)_m(CH_2)_2-S- \\ R^1-]_m SH \quad (8a)$$

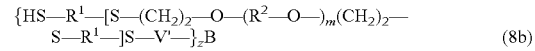

$$\{HS-R^1-[S-(CH_2)_2-O-(R^2-O-)_m(CH_2)_2- \\ S-R^1-]S-V'-\}_z B \quad (8b)$$

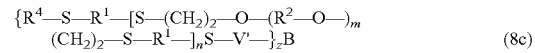

$$\{R^4-S-R^1-[S-(CH_2)_2-O-(R^2-O-)_m \\ (CH_2)_2-S-R^1-]_n S-V'-\}_z B \quad (8c)$$

wherein, each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and —$[(CHR^3)_p$—X$]_q$—$(CHR^3)_r$, wherein, p is an integer from 2 to 6;

q is an integer from 1 to 5;

r is an integer from 2 to 10;

each $R^3$ is independently is selected from hydrogen and methyl; and each X is independently selected from O, S, and NR, where R is selected from hydrogen and methyl;

each $R^2$ is independently selected from $C_{1-10}$ alkanediyl, $C_{6-8}$ cycloalkanediyl, $C_{6-14}$ alkanecycloalkanediyl, and —$[(CH_2)_p$—X$]_q$—$(CH_2)_r$—, wherein p, q, r, and X are as defined as for Formula (8);

m is an integer from 0 to 50;

n is an integer from 1 to 60;

B represents a core of a z-valent, polyfunctionalizing agent $B(-V)_z$ wherein, z is an integer from 3 to 6; and each V is a moiety comprising a terminal group reactive with a thiol;

each $V^1$ is derived from the reaction of —V with a thiol; and each $R^4$ is independently selected from hydrogen and a bond to $B(-V^1-)_z$.

Aspect 44. The composition of aspect 43, wherein each $R^1$ is $-[(CH_2)_p-O-]_q(CH_2)_r-$; each $R^2$ is $C_{1-6}$ alkanediyl; m is an integer from 0 to 3; each p is 2; q is 1 or 2; r is 2; and z is 3.

Aspect 45. The composition of aspect 43, wherein each $R^1$ is $-[(CH_2)_p-O-]_q(CH_2)_r-$; each $R^2$ is ethanediyl; m is an integer from 1 to 3; each p is 2; q is 1 or 2; r is 2; and z is 3.

Aspect 46. The composition of any one of aspects 32 to 45, wherein the sulfur-containing prepolymer comprises a thiol-terminated sulfur-containing polyformal comprising a moiety of Formula (9):

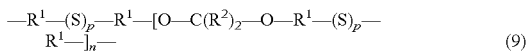

(9)

wherein n is an integer from 1 to 50; each p is selected from 1 or 2; each $R^1$ is $C_{2-6}$ alkanediyl; each $R^2$ is independently selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl.

Aspect 47. The composition of any one of aspect 46, wherein the sulfur-containing prepolymer comprises a thiol-terminated sulfur-containing polyformal prepolymer of Formula (9a), a thiol-terminated sulfur-containing polyformal prepolymer of Formula (9b), or a combination thereof:

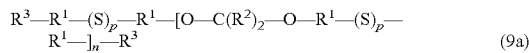

(9a)

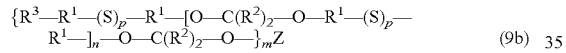

(9b)

wherein, n is an integer selected from 1 to 50;

each p is independently selected from 1 and 2;

each $R^1$ is independently $C_{2-6}$ alkanediyl;

each $R^2$ is independently selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl; and each $R^3$ comprises a thiol-terminated group; and Z is derived from the core of an m-valent parent polyol $Z(OH)_m$.

Aspect 48. The composition of any one of aspects 32 to 47, wherein the sulfur-containing prepolymer comprises a thiol-terminated monosulfide prepolymer comprising a moiety of Formula (13):

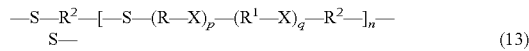

(13)

wherein, each R is independently selected from $C_{2-10}$ alkanediyl, $C_{2-10}$ branched alkanediyl, $C_{6-8}$ cycloalkanediyl, $C_{6-14}$ alkylcycloalkyanediyl, and $C_{8-10}$ alkylarenediyl;

each $R^1$ is independently selected from, $C_{1-10}$ n-alkanediyl, $C_{2-10}$ branched alkanediyl, $C_{6-8}$ cycloalkanediyl, $C_{6-14}$ alkylcycloalkanediyl, and $C_8$-$C_{10}$ alkylarenediyl;

each $R^2$ is independently selected from, $C_{1-10}$ n-alkanediyl, $C_{2-10}$ branched alkanediyl, $C_{6-8}$ cycloalkanediyl; $C_{6-14}$ alkylcycloalkanediyl, and $C_8$-$C_{10}$ alkylarenediyl;

each X is independently selected from O and S;

p is an integer from 1 to 5;

q is an integer from 0 to 5; and n is an integer from 1 to 60.

Aspect 49. The composition of aspect 48, wherein the sulfur-containing prepolymer comprises a thiol-terminated monosulfide prepolymer of Formula (13a), a thiol-terminated monosulfide prepolymer of Formula (13b), a thiol-terminated monosulfide prepolymer of Formula (13c), or a combination of any of the foregoing:

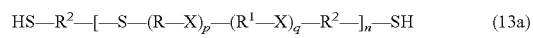

(13a)

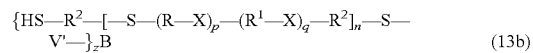

(13b)

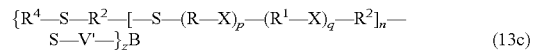

(13c)

wherein, each R is independently selected from $C_{2-10}$ alkanediyl, $C_{2-10}$ branched alkanediyl, $C_{6-8}$ cycloalkanediyl, $C_{6-14}$ alkylcycloalkyanediyl, and $C_{8-10}$ alkylarenediyl;

each $R^1$ is independently selected from, $C_{1-10}$ n-alkanediyl, $C_{2-10}$ branched alkanediyl, $C_{6-8}$ cycloalkanediyl, $C_{6-14}$ alkylcycloalkanediyl, and $C_{8-10}$ alkylarenediyl;

each $R^2$ is independently selected from, $C_{1-10}$ n-alkanediyl, $C_{2-10}$ branched alkanediyl, $C_{6-8}$ cycloalkanediyl, $C_{6-14}$ alkylcycloalkanediyl, and $C_{8-10}$ alkylarenediyl;

each X is independently selected from O and S;

p is an integer from 1 to 5;

q is an integer from 0 to 5;

n is an integer from 1 to 60;

B represents a core of a z-valent polyfunctionalizing agent $B(-V)_z$ wherein:

z is an integer from 3 to 6; and each V is a moiety comprising a terminal group reactive with a thiol group;

each V' is derived from the reaction of —V with a thiol; and each $R^4$ is independently selected from hydrogen and a bond to $B(-V^1-)_z$.

Aspect 50. The composition of any one of aspects 32 to 49, wherein the sulfur-containing prepolymer comprises a thiol-terminated monosulfide prepolymer comprising a moiety of Formula (14):

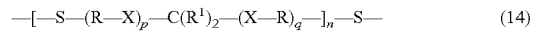

(14)

wherein, each R is independently selected from $C_{2-10}$ alkanediyl, a $C_{3-10}$ branched alkanediyl, $C_{6-8}$ cycloalkanediyl, $C_{6-14}$ alkylcycloalkyanediyl, and $C_{8-10}$ alkylarenediyl;

each $R^1$ is independently selected from hydrogen, $C_{1-10}$ n-alkyl, $C_{3-10}$ branched alkyl, $C_{6-8}$ cycloalkyl, $C_{6-14}$ alkylcycloalkyl, and $C_{8-10}$ alkylaryl;

each X is independently selected from O and S;

p is an integer from 1 to 5;

q is an integer from 1 to 5; and n is an integer from 1 to 60.

Aspect 51. The composition of aspect 50, wherein the thiol-terminated sulfur-containing prepolymer comprises a thiol-terminated monosulfide prepolymer of Formula (14a), a thiol-terminated monosulfide prepolymer of Formula (14b), a thiol-terminated monosulfide prepolymer of Formula (14c), or a combination of any of the foregoing:

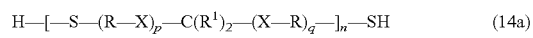

(14a)

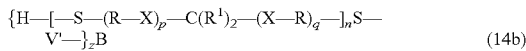

$$\{H-[-S-(R-X)_p-C(R^1)_2-(X-R)_q-]_nS-V'-\}_zB \tag{14b}$$

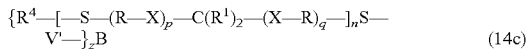

$$\{R^4-[-S-(R-X)_p-C(R^1)_2-(X-R)_q-]_nS-V'-\}_zB \tag{14c}$$

wherein,
each R is independently selected from $C_{2-10}$ alkanediyl, a $C_{3-10}$ branched alkanediyl, $C_{6-8}$ cycloalkanediyl, $C_{6-14}$ alkylcycloalkyanediyl, and $C_{8-10}$ alkylarenediyl;
each $R^1$ is independently selected from hydrogen, $C_{1-10}$ n-alkyl, $C_{3-10}$ branched alkyl, and $C_{6-8}$ cycloalkyl;
each X is independently selected from O and S;
p is an integer from 1 to 5;
q is an integer from 1 to 5; and
n is an integer from 1 to 60;
B represents a core of a z-valent polyfunctionalizing agent $B(—V)_z$ wherein:
  z is an integer from 3 to 6; and
  each V is a moiety comprising a terminal group reactive with a thiol group;
each —V'— is derived from the reaction of —V with a thiol; and
each $R^4$ is independently selected from hydrogen and a bond to $B(—V^1—)_z$.

Aspect 52. The composition of any one of aspects 32 to 51, wherein the thiol-terminated sulfur-containing prepolymer comprises a thiol-terminated polysulfide prepolymer of Formula (15), a thiol-terminated polysulfide prepolymer of Formula (16), or a combination thereof:

$$SH-(-R-S-S-)_n-R-SH \tag{15}$$

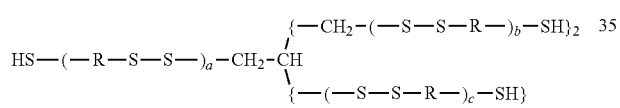

$$HS-(-R-S-S-)_a-CH_2-CH\begin{Bmatrix} -CH_2-(-S-S-R-)_b-SH\}_2 \\ -(-S-S-R-)_c-SH\} \end{Bmatrix} \tag{16}$$

wherein each R is $—(CH_2)_2—O—CH_2—O—(CH_2)_2—$, and n=a+b+c, where n is within a range from 7 to 38.

Aspect 53. The composition of any one of aspects 32 to 52, wherein the thiol-terminated sulfur-containing prepolymer comprises a thiol-terminated polysulfide of Formula (17):

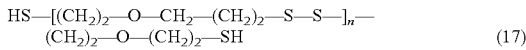

$$HS-[(CH_2)_2-O-CH_2-(CH_2)_2-S-S-]_n-(CH_2)_2-O-(CH_2)_2-SH \tag{17}$$

wherein n is selected such that the number average molecular weight of the thiol-terminated polysulfide is within a range from 1,000 Daltons to 7,500 Daltons.

Aspect 54. The composition of any one of aspects 32 to 53, wherein the sulfur-containing prepolymer comprises a thiol-terminated polysulfide prepolymer of Formula (18):

$$HS-R-(S_y-R)_t-SH \tag{18}$$

wherein,
each R is independently selected from branched alkanediyl, branched arenediyl, and a moiety having the structure $—(CH_2)_p—O—(CH_2)_q—O—(CH_2)_r—$;
t is an integer from 1 to 60;
q is an integer from 1 to 8;
p is an integer from 1 to 10;
r is an integer from 1 to 10;
each y is independently selected from 1 and 2; and
the mean value of y is within a range from greater than 1.0 to 1.5;

Aspect 55. The composition of any one of aspects 30 to 49, wherein the sulfur-containing prepolymer comprises a thiol-terminated polysulfide prepolymer of Formula (19):

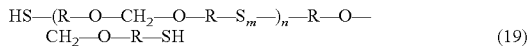

$$HS-(R-O-CH_2-O-R-S_m-)_n-R-O-CH_2-O-R-SH \tag{19}$$

wherein R is $C_{2-4}$ alkanediyl, each m is independently an integer from 2 to 8, and n is an integer from 1 to 370.

Aspect 56. The composition of any one of aspects 32 to 55, further comprising a curing agent.

Aspect 57. The composition of aspect 56, wherein the curing agent comprises a polyepoxide.

Aspect 58. A cured composition prepared from the composition of any one of aspects 32 to 46.

Aspect 59. The cured composition of aspect 58, wherein, the cured composition exhibits a tensile strength greater than 100 psi (689 kPa); a tear strength greater than 80; and a % elongation greater than 200%, where tensile strength and % elongation are determined according to ASTM D412, tear strength is determined according to SAE AS 5127, § 8; and the composition comprises from 1 wt % to 10 wt % of the sulfur-containing polymeric particles of any one of claims 1 to 9, wherein wt % is based on the total weight of the cured composition.

Aspect 60. A part comprising the cured composition of any one of aspects 58 to 59.

Aspect 61. A method of sealing a part, comprising: applying the composition of any one of aspects 32 to 56 to a surface of a part; and curing the applied composition to seal the part.

Aspect 62. A cured composition prepared from the composition of any one of aspects 32 to 57.

Aspect 63. A part comprising the cured composition of aspect 62.

Aspect 64. A method of sealing a part, comprising: applying the composition of any one of aspects 32 to 57 to a surface of a part; and curing the applied composition to seal the part.

EXAMPLES

Embodiments provided by the present disclosure are further illustrated by reference to the following examples, which describe sulfur-containing polymeric particles, methods of synthesizing sulfur-containing polymeric particles, compositions comprising sulfur-containing polymeric particles and properties of cured sealants prepared using the compositions provided by the present disclosure. It will be apparent to those skilled in the art that many modifications, both to materials, and methods, may be practiced without departing from the scope of the disclosure.

Example 1

Synthesis of Sulfur-Containing Polymeric Particles

The components for each of the charges referred to in the synthesis of the sulfur-containing polymeric particles of Example 1 are provided in Table 1.

TABLE 1

Charges used to prepare sulfur-containing polymeric particles of Example 1.

| Charge | Component | Amount (g) |
|---|---|---|
| A | De-ionized water | 225.0 |
|  | BYK ®-425[1] | 0.71 |
|  | Polyvinyl alcohol, 88% hydrolysis, 30,000-51,000 Daltons | 2.33 |

TABLE 1-continued

Charges used to prepare sulfur-containing polymeric particles of Example 1.

| Charge | Component | Amount (g) |
|---|---|---|
| B | Thiocure ® PETMP[2] | 17.10 |
|  | Di(ethylene glycol) divinyl ether | 11.07 |
| C | Ferrous ammonium sulfate | 0.003 |
|  | De-ionized water | 30.0 |

[1]Urea-modified polyurethane rheology control additive available from BYK USA, Inc.
[2]Pentaerythritol tetra(3-mercaptopropionate) available from Bruno Bock Thiochemicals.

The components of Charge A were combined in a 600 mL beaker and mixed until the emulsion stabilizers (BYK®-425 and polyvinyl alcohol) were totally dissolved. Charges B and C were combined and mixed. The beaker containing mixed Charge A was placed under a high shear mixer (IKA® T25 Ultra Turrax®) and the components mixed at 9,000 rpm. (If a foam formed, a small amount of a de-foamer was added.) Charge B was pipetted into Charge A over one minute, and the shear rate was increased to 11,000 rpm and held for three minutes. Three drops of Charge C were added into the emulsion and the emulsion mixed at high shear for an additional five minutes. The beaker was then moved to a stir plate and the emulsion mixed briskly with a stir bar overnight. After reacting overnight, the resulting particles were allowed to settle to the bottom of the beaker for from 5 hours to 12 hours. The solution was decanted to provide a paste containing the sulfur-containing polymeric particles.

The sulfur-containing polymeric particles were characterized by a mean particle diameter within the range from 2 microns to 10 microns (according to ASTM D422), a $T_g$ of −30° C. (according to ASTM D7028), a density of 1.3 g/cm$^3$ (according to ISO 787 (Part 10)), and a sulfur content (theoretical) of 15 wt %.

Example 2

Synthesis of Sulfur-Containing Polymeric Particles

The components for each of the charges referred to in the synthesis of the sulfur-containing polymeric particles of Example 2 are provided in Table 2.

TABLE 2

Charges used to prepare sulfur-containing polymeric particles.

| Charge | Component | Amount (g) |
|---|---|---|
| A | De-ionized water | 225.0 |
|  | Nanosilicon dioxide | 4.50 |
| B | Thiocure ® PETMP | 10.49 |
|  | Di(ethylene glycol) divinyl ether | 6.79 |
| C | Ferrous ammonium sulfate | 0.003 |
|  | De-ionized water | 30.0 |

The components for Charge A were combined in a 600 mL beaker and Charges B and C were premixed. Charge A was placed under a high shear mixer (IKA® T25 Ultra Turrax®) and mixed at 6,000 rpm for five min. (If foam formed, a small amount of a de-foamer was added.) Charge B was pipetted into charge A over one minute and the shear rate increased to 11,000 rpm and held for 3 min. Three drops of Charge C were added into the emulsion and the shear rate held for an additional 5 min. The beaker containing the emulsion was then moved to a stir plate and mixed briskly with a stir bar overnight. The particles were then allowed to settle to the bottom of the beaker for from 5 hours to 12 hours. The solution was decanted to provide a paste containing the sulfur-containing polymeric particles.

The sulfur-containing polymeric particles were characterized by a mean particle diameter within the range from 2 microns to 10 microns (according to ASTM D422), a $T_g$ of −30° C. (according to ASTM D7028), a density of 1.3 g/cm$^3$ (according to ISO 787 (Part 10)), and a sulfur content (theoretical) of 15 wt %.

Example 3

Sealant Composition

Sealant compositions were prepared using the sulfur-containing polymeric particles of Example 1 and precipitated calcium carbonate. The filler or combination of fillers was combined with a thiol-containing resin and a polyepoxide curing agent (PR 2001 B2, a two-part sealant available from PPG Aerospace comprising a polyepoxide curing agent and ian inorganic filler content within a range from 30 wt % to 50 wt % (based on the total weight of the sealant) and Permapol® 3.1e polythioether) and cured from 7 days at room temperature. The cured composition was exposed to either 3% salt water according to AS 5127 or to JRF Type I according to AS 5127 and the % swell determined according to AS 5127 § 7.4/7.5. The results are presented in Table 3.

TABLE 3

Percent swell of cured sealant compositions.

| Filler | Fluid Type | % Swell |
|---|---|---|
| unfilled resin control | 3% salt water | 4.6 |
| 4 wt % polythioether (PTE) particles[1] | 3% salt water | 3.8 |
| 6 wt % PTE particles | 3% salt water | 4.4 |
| 28 wt % Winnofil ® SPM[2] control | 3% salt water | 3.7 |
| 4 wt % PTE particles and Winnofil ® SPM | 3% salt water | 4.2 |
| 10 wt % PTE particles and Winnofil ® SPM | 3% salt water | 4.7 |
| unfilled resin control | JRF Type I | 24.4 |
| 4 wt % PTE particles | JRF Type I | 23.5 |
| 6 wt % PTE particles | JRF Type I | 22.5 |
| 28 wt % Winnofil ® SPM control | JRF Type I | 24.6 |
| 4 wt % PTE particles and Winnofil ® SPM | JRF Type I | 24.4 |
| 10 wt % PTE and Winnofil ® SPM | JRF Type I | 24.5 |

[1]Sulfur-containing polymeric particles of Example 1.
[2]Coated precipitated calcium carbonate; 60 nm particle diameter, density 2.93 g/cm$^3$; Solvay Chemicals.

Example 4

Effect of Sulfur-Containing Polymeric Particle Loading on Solvent Resistance

Sealant compositions containing from 0 wt % to 10 wt % (based on the total weight of the composition) of the sulfur-containing polymeric particles of Example 1 were prepared.

The sulfur-containing polymeric particles of Example 1 were combined with a thiol-terminated sulfur-containing prepolymer resin and a polyepoxide curing agent (PR 2001 B2, a two-part polyepoxide-cured Permapol® 3.1 e polythioether with an inorganic filler content within a range from 30 wt % to 50 wt %, available from PPG Aerospace, Inc.) and cured from 7 days at room temperature. The cured composition was exposed to either 3% salt water according to AS5127 or to JRF Type I according to AS 5127 for 7 days at 140° F. (60° C.) and the % swell determined according to AS 5127 § 7.4/7.5. The results showing the % swell for different loading of sulfur-containing polymeric particles are shown in FIG. 1. The results indicate that the polythioether particles exhibit excellent solvent resistance and can be added to a sealant composition up to at least 10 wt % (based on the total weight of the sealant) without compromising the resistance to JRF Type I and 3% salt water. The control represents a 10 wt % loading of Winnofil® SPM.

Example 5

Comparison of Physical Properties

Sealant compositions were prepared as in Example 4 with different loadings (1 wt %, 5 wt %, or 10 wt %) of either the sulfur-containing polymeric particles of Example 1 (3 µm mean particle size) or different loadings of Winnofil® SPM (particle diameter <100 nm, d 50 nanoparticles 60 nm $CaCO_3$, 2.93 g/cm³ density; Solvay Chemicals), or Martinal® OL-104 (density 2.4 g/cm³, d50 1.3-2.3 µm, platelet, pseudo-hexagonal, $Al(OH)_3$; Albemarle). The compositions were cured for 7 days at room temperature and the tensile strength, % elongation, and tear strength were determined according to ASTM D412. The results are presented in FIG. 2. The physical properties of the unfilled resin are also shown.

Figure 2:
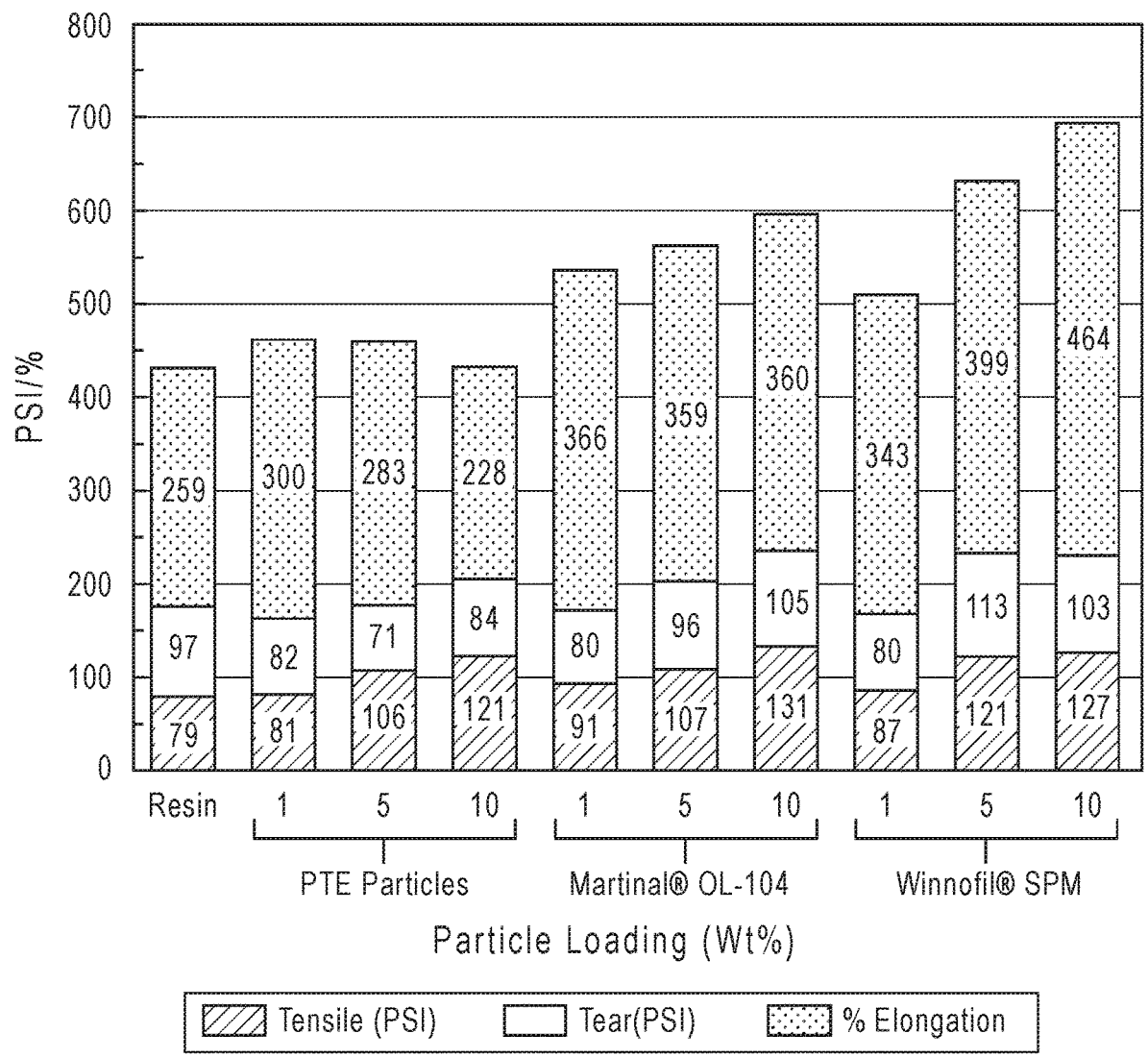
FIG. 2 is a graph showing the tensile strength (psi), tear strength (psi) and % elongation (determined according to ASTM D412) of cured sealants having different wt % loadings of sulfur-containing polymeric particles (PTE), precipitated calcium carbonate particles (Winnofil® SPM), or aluminum hydroxide particles (Martinal® OL-104).

The results presented in FIG. 2 demonstrate that the tensile strength of the sealant with sulfur-containing polymeric particles increases as the loading is increased from 1 wt % to 10 wt %, and the tear strength and % elongation remain about the same. This indicates that the sulfur-containing polymeric particles reinforce the sealant. The tensile strength with 10 wt % loading of sulfur-containing polymeric particles is comparable to that of sealants with either a 5 wt % or 10 wt % loading of Winnofil® SPM, or a 10% loading of Martinal® OL-104. Use of sulfur-containing polymeric particles can reduce the density of a sealant while maintaining acceptable physical properties including tensile strength.

Example 6

Effects of Sulfur-Containing Polymeric Particle Diameter on Physical Properties

Figure 3:
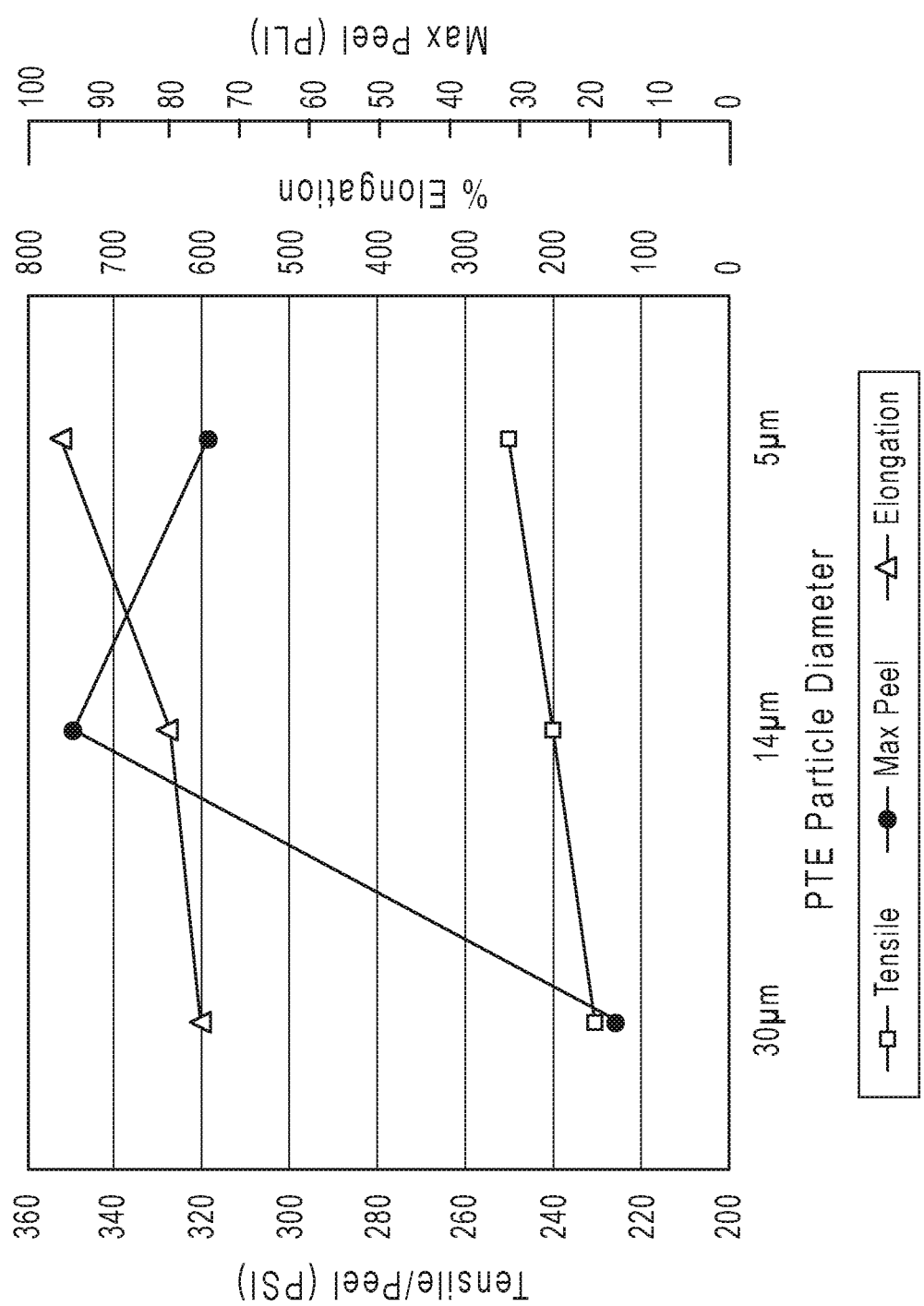
FIG. 3 is a graph showing the effect of the diameter of sulfur-containing polymeric particles on the tensile strength (psi), peel strength (pli), and % elongation of cured sealants.

The physical properties of cured sealant compositions prepared using sulfur-containing polymeric particles having different mean particle diameters are shown in FIG. 3.

Sealant compositions were prepared as in Example 3 with a 1 wt % loading of the sulfur-containing polymeric particles of Example 1 characterized by a mean particle diameter of 5 µm, 14 µm, or 30 µm. The compositions were cured for 7 days at room temperature and the tensile strength, % elongation, and tear strength were determined according to ASTM D412.

The sealant system was PR 2001 B2 with 0.6 wt % DABCO®. For the 5 µm sample, the sulfur-containing polymeric particles were added to the formulation as a paste, and in the 14 µm and 30 µm samples, the sulfur-containing polymeric particles were added to the formulation as an emulsion.

In this study, the use of sulfur-containing particles generally resulted in increased tensile strength, % elongation and peel strength as the particles diameter decreased from 30 µm to 5 µm.

Example 6

Effect of Particle Loading on Physical Properties

Figure 4:
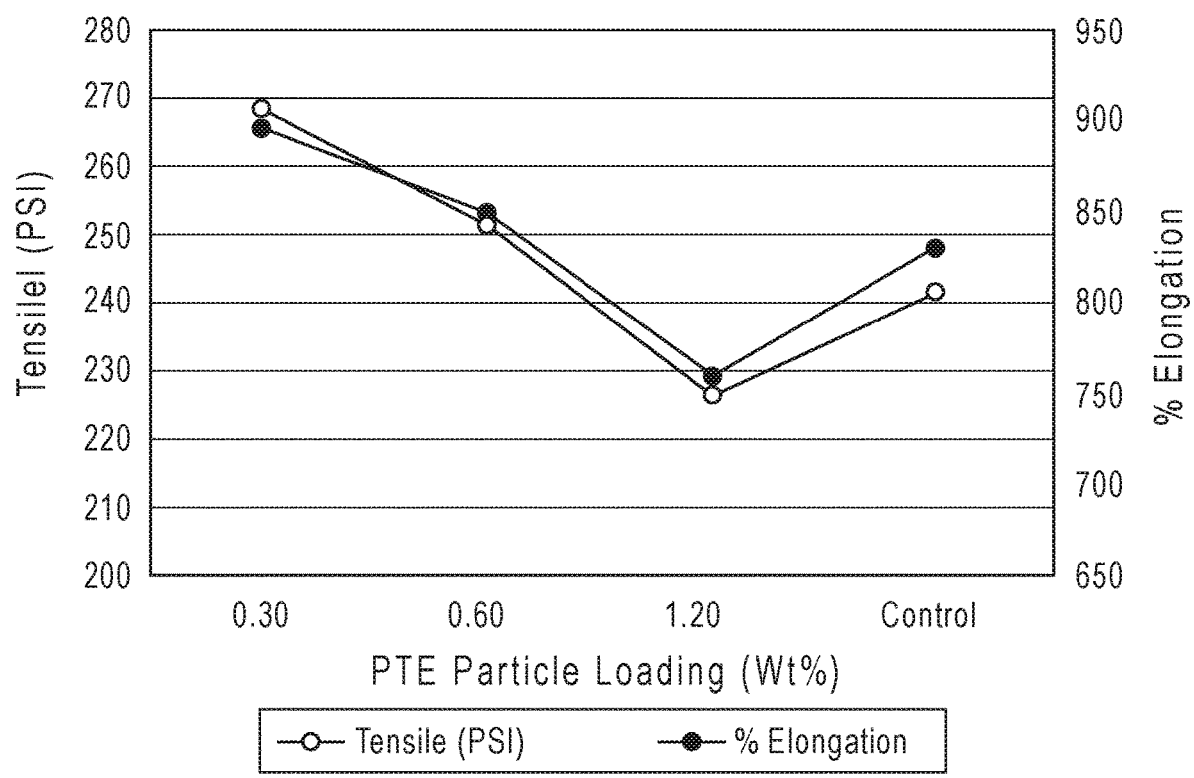
FIG. 4 is a graph showing the tensile strength (psi) and % elongation of cured sealants having different wt % loadings of sulfur-containing polymeric particles.

The tensile strength and % elongation (determined according to ASTM D412) of a cured sealant having different loadings of the sulfur-containing polymeric particles of Example 1 (mean particle diameter of 4 µm) are shown in FIG. 4. The control represents the sealant without the sulfur-containing polymeric particles.

Different loadings of the sulfur-containing polymeric particles of Example 1 were added to Part A (13.00 g, PR 2001 B2, a thiol-terminated prepolymer available from PPG Aerospace) and cured with Part B (70 g). In this study, a loading of sulfur-containing polymeric particles of less than 1 wt % maintained or increased the tensile strength and elongation of the cured sealant. The results indicate that low loadings of sulfur-containing polymeric particles to a composition comprising inorganic filler, such as from 30 wt % to 50 wt %, can increase the tensile strength and % elongation of a cured sealant.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:
1. A sulfur-containing polymeric particle, wherein,
the sulfur-containing polymeric particle comprises an exterior surface comprising a cross-linked sulfur-containing polymer, wherein,
the sulfur-containing polymeric particle is characterized by a specific gravity less than 2, wherein the specific gravity is determined according to ISO 787 (Part 10); and
the sulfur-containing polymeric particle has a sulfur content greater than 5 wt %, wherein wt % is based on the total weight of the sulfur-containing polymeric particle.
2. The sulfur-containing polymeric particle of claim 1, wherein the sulfur-containing polymeric particle has a glass transition temperature less than −10° C., wherein the glass transition temperature is determined using dynamic mechanical analysis according to ASTM D7028.
3. The sulfur-containing polymeric particle of claim 1, wherein the sulfur-containing polymeric particle has a mean particle diameter of less than 100 µm, wherein the mean particle diameter is determined according to ASTM D422.
4. The sulfur-containing polymeric particle of claim 1, wherein the sulfur-containing polymeric particle comprises an outer surface having unreacted thiol groups, unreacted alkenyl groups, or a combination thereof.
5. The sulfur-containing polymeric particle of claim 1, wherein the sulfur content is from 5 wt % to 50 wt %, wherein wt % is based on the total weight of the sulfur-containing polymer.
6. The sulfur-containing polymeric particle of claim 1, wherein the specific gravity is less than 1.4.
7. A plurality of the sulfur-containing polymeric particles of claim 1, wherein the plurality of the sulfur-containing polymeric particles comprises a dry powder having a solids content of 100 wt %, is based on the total weight of the plurality of the sulfur-containing polymeric particles.
8. An emulsion comprising a plurality of the sulfur-containing polymeric particles of claim 1; and solvents, wherein the emulsion has a solids content from 5 wt % to 25 wt %, wherein wt % is based on the total weight of the emulsion.

9. A paste comprising a plurality of the sulfur-containing polymeric particles of claim 1, wherein the paste has a solids content from 55 wt % to 75 wt %, wherein wt % is based on the total weight of the paste.

10. The sulfur-containing polymeric particle of claim 1, wherein the sulfur-containing polymeric particle comprises reaction products of an emulsion polymerization reaction, wherein the reactants comprise:
  a polythiol; and
  a polyalkenyl, wherein the polyalkenyl has an alkenyl functionality from 3 to 6, or a Michael acceptor.

11. The sulfur-containing polymeric particle of claim 10, wherein the polythiol comprises a polythiol having a thiol functionality from 2 to 6.

12. The sulfur-containing polymeric particle of claim 10, wherein the polythiol comprises a trifunctional polythiol, a tetrafunctional polythiol, a pentafunctional polythiol, a hexafunctional polythiol, or a combination of any of the foregoing.

13. The sulfur-containing polymeric particle of claim 10, wherein the polythiol comprises a dithiol.

14. The sulfur-containing polymeric particle of claim 10, wherein the polythiol comprises pentaerythritol tetra(3-mercapto-propionate) (PETMP), trimethylol-propane tri(3-mercaptopropionate) (TMPMP), tris[2-(3-mercapto-propionyloxy)ethyl]isocyanurate (TEMPIC), di-pentaerythritol hexa(3-mercaptopropionate) (di-PETMP), or a combination of any of the foregoing.

15. The sulfur-containing polymeric particle of claim 10, wherein the Michael acceptor comprises an acrylate group, a vinyl ketone group, a vinyl sulfone group, a quinone group, an enamine group, a ketimine group, an aldimine group, an oxazolidine group, or a combination of any of the foregoing.

16. A plurality of the sulfur-containing polymeric particles of claim 10, wherein the plurality of the sulfur-containing polymeric particles comprises a dry powder having a solids content of 100 wt %%, wherein wt % is based on the total weight of the plurality of the sulfur-containing polymeric particles.

17. An emulsion comprising a plurality of the sulfur-containing polymeric particles of claim 10; and solvents, wherein the emulsion has a solids content from 5 wt % to 25 wt %, wherein wt % is based on the total weight of the emulsion.

18. A paste comprising a plurality of the sulfur-containing polymeric particles of claim 10, wherein the paste has a solids content from 55 wt % to 75 wt %, wherein wt % is based on the total weight of the paste.

19. A composition comprising a plurality of the sulfur-containing polymeric particles of claim 1.

20. The composition of claim 19, wherein the composition comprises from 0.5 wt % to 40 wt % of the plurality of sulfur-containing polymeric particles, wherein wt % is based on the total weight of the composition.

21. The composition of claim 19, wherein the composition comprises less than 40 wt % of the sulfur-containing polymeric particles, wherein wt % is based on the total weight of the composition.

22. A cured composition prepared from the composition of claim 19.

23. A part comprising the cured composition of claim 22.

24. The part of claim 23, wherein the part comprises a surface of an aerospace vehicle.

25. The part of claim 24, wherein the part comprises a surface of an aerospace vehicle.

26. A method of forming a cured polymeric composition, comprising:
  applying the composition of claim 19 to a surface; and
  curing the applied composition to provide a cured polymeric composition.

27. A composition comprising a plurality of the sulfur-containing polymeric particles of claim 10.

28. The composition of claim 27, wherein the composition comprises from 0.5 wt % to 40 wt % of the plurality of sulfur-containing polymeric particles, wherein wt % is based on the total weight of the composition.

29. The composition of claim 27, wherein the composition comprises less than 40 wt % of the sulfur-containing polymeric particles, wherein wt % is based on the total weight of the composition.

30. A cured composition prepared from the composition of claim 27.

31. A part comprising the cured composition of claim 30.

32. The part of claim 31, wherein the part comprises a surface of an aerospace vehicle.

33. The part of claim 32, wherein the part comprises a surface of an aerospace vehicle.

34. A method of forming a cured polymeric composition, comprising:
  applying the composition of claim 27 to a surface; and
  curing the applied composition to provide a cured polymeric composition.

* * * * *